United States Patent
Hamada

(10) Patent No.: US 8,890,998 B2
(45) Date of Patent: Nov. 18, 2014

(54) FOCUSING APPARATUS, FOCUSING METHOD AND MEDIUM FOR RECORDING THE FOCUSING METHOD

(75) Inventor: Masataka Hamada, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 319 days.

(21) Appl. No.: 13/198,935

(22) Filed: Aug. 5, 2011

(65) Prior Publication Data

US 2012/0038818 A1    Feb. 16, 2012

(30) Foreign Application Priority Data

Aug. 11, 2010    (KR) .................. 10-2010-0077497

(51) Int. Cl.
  *G03B 13/00*    (2006.01)
  *H04N 5/232*    (2006.01)

(52) U.S. Cl.
  CPC ....... *H04N 5/23212* (2013.01); *H04N 5/23209* (2013.01)
  USPC .......................................... 348/353; 348/346

(58) Field of Classification Search
  CPC .................................................. H04N 5/23212
  USPC .................. 348/345, 346, 349, 353
  See application file for complete search history.

(56) References Cited

U.S. PATENT DOCUMENTS

| | | | | |
|---|---|---|---|---|
| 7,545,432 B2 * | 6/2009 | Lee | ............... | 348/349 |
| 7,561,790 B2 * | 7/2009 | Yata | ............... | 396/124 |
| 7,973,852 B2 * | 7/2011 | Ito et al. | ............... | 348/349 |
| 8,139,137 B2 * | 3/2012 | Chiang et al. | ............... | 348/345 |
| 8,289,439 B2 * | 10/2012 | Yasuda | ............... | 348/349 |
| 2003/0048373 A1 * | 3/2003 | Okisu et al. | ............... | 348/350 |
| 2005/0253955 A1 * | 11/2005 | Sato | ............... | 348/345 |
| 2011/0115939 A1 * | 5/2011 | Hamada | ............... | 348/222.1 |

FOREIGN PATENT DOCUMENTS

| | | |
|---|---|---|
| JP | 05-137046 A | 6/1993 |
| JP | 2006-195023 A | 7/2006 |
| JP | 2006-237764 A | 9/2006 |
| JP | 2008-193683 A | 8/2008 |

* cited by examiner

*Primary Examiner* — Daniel M Pasiewicz

(74) *Attorney, Agent, or Firm* — Drinker Biddle & Reath LLP

(57) ABSTRACT

Provided are a focusing apparatus for generating an image signal by converting image light incident through a focus lens to an electrical signal by an image pickup device, storing the image signal un a memory, calculating an AF evaluation value for an image signal read from the memory in a direction different from a reading direction of the image pickup device, and driving the focus lens by deriving a focus lens position corresponding to the calculated AF evaluation value, a focusing method thereof, and a recording medium for recording the focusing method. Accordingly, a focus can be correctly adjusted for various subject images, and a focus can be effectively adjusted for the images even in a high speed capturing mode.

33 Claims, 35 Drawing Sheets

AFareaL8[1]    AFareaL8[b]

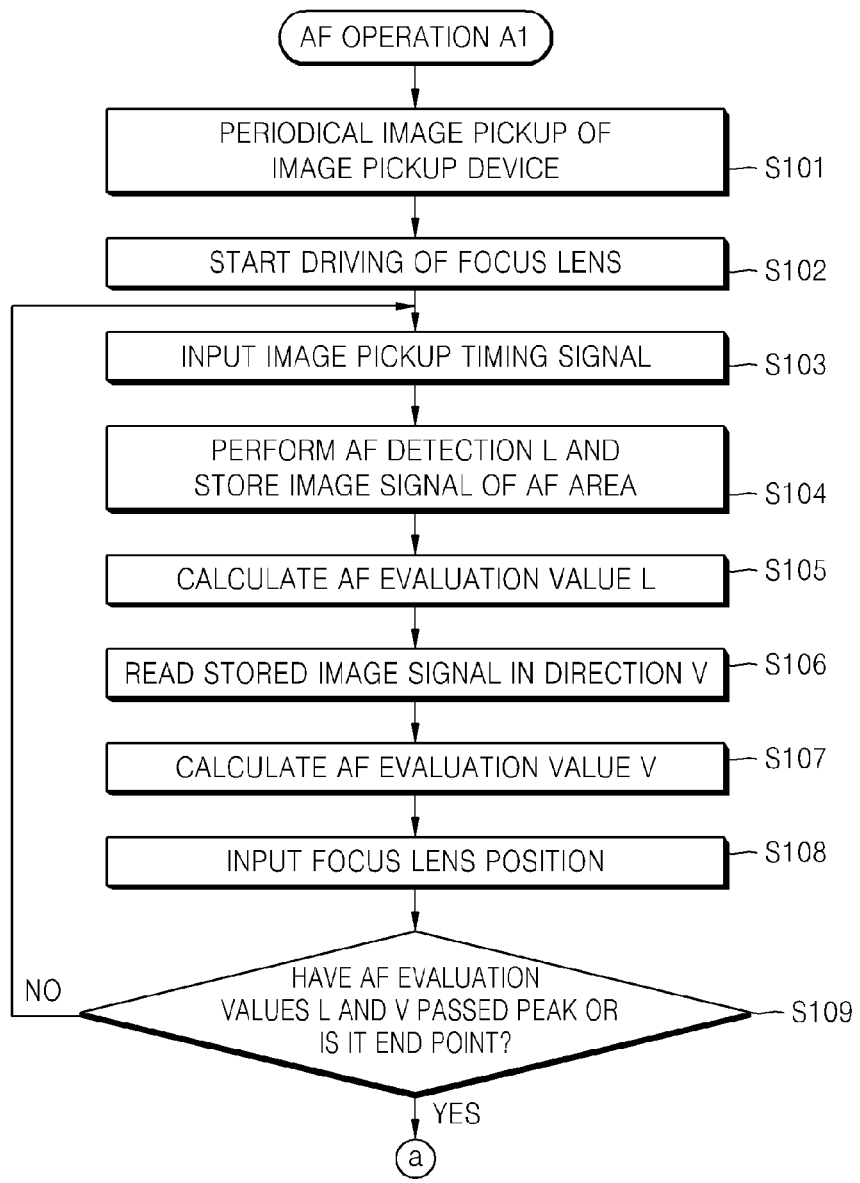

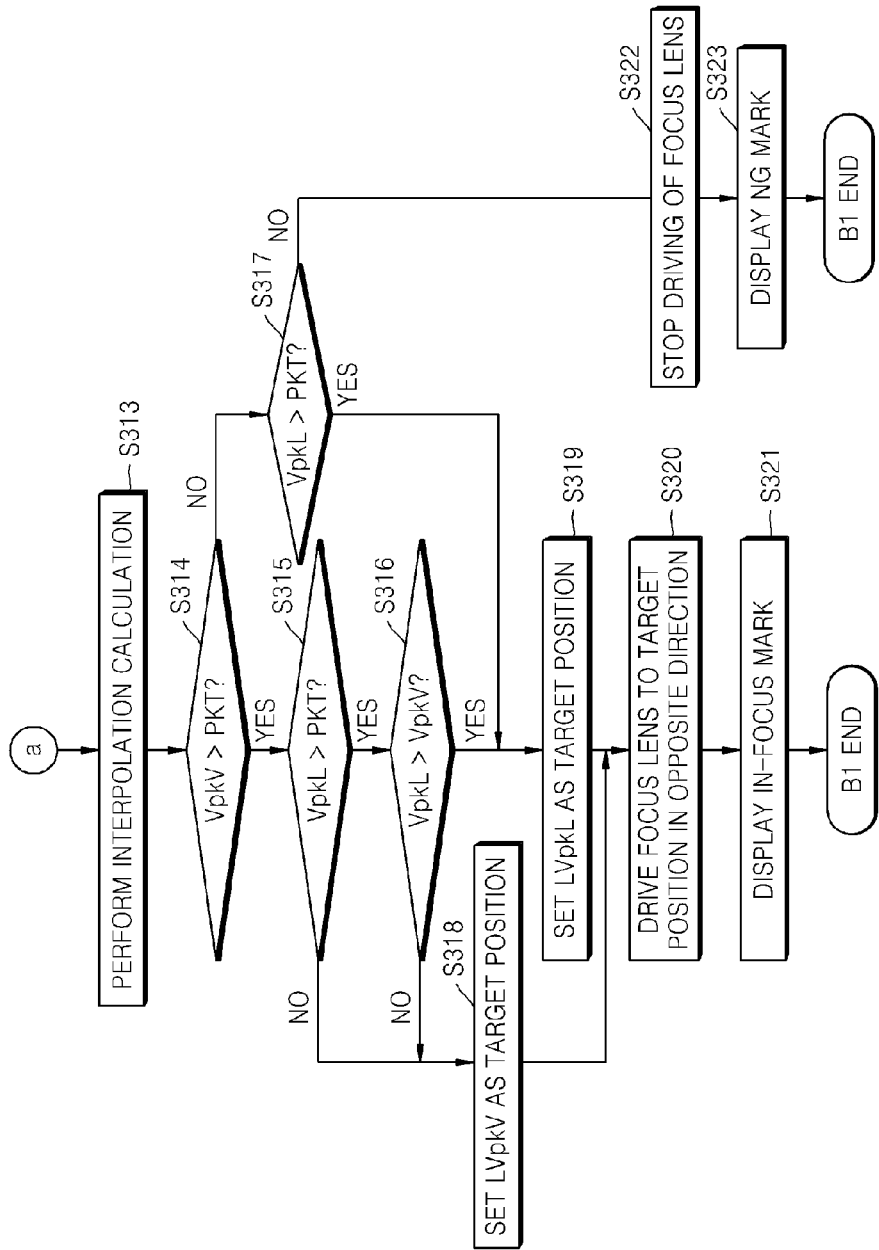

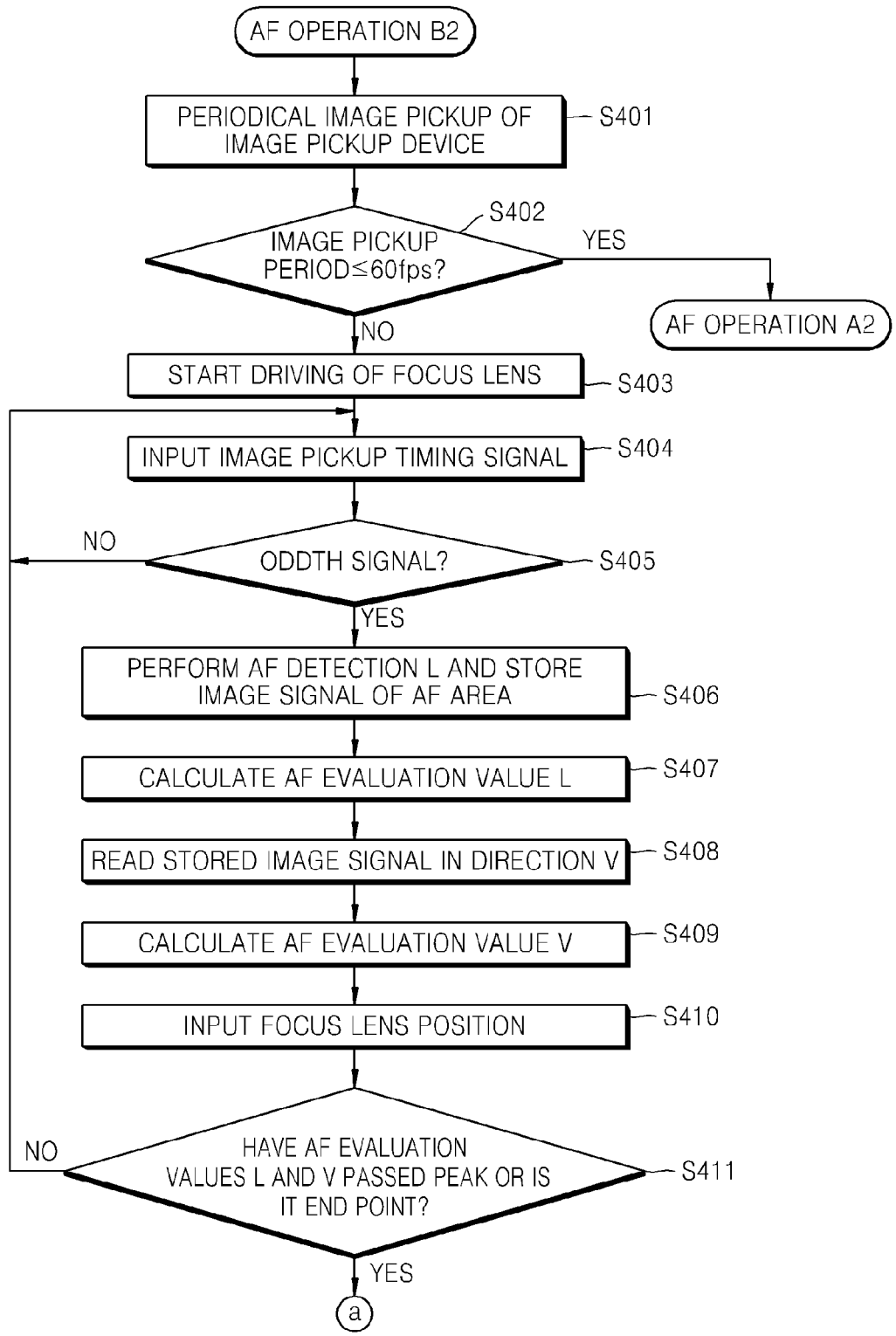

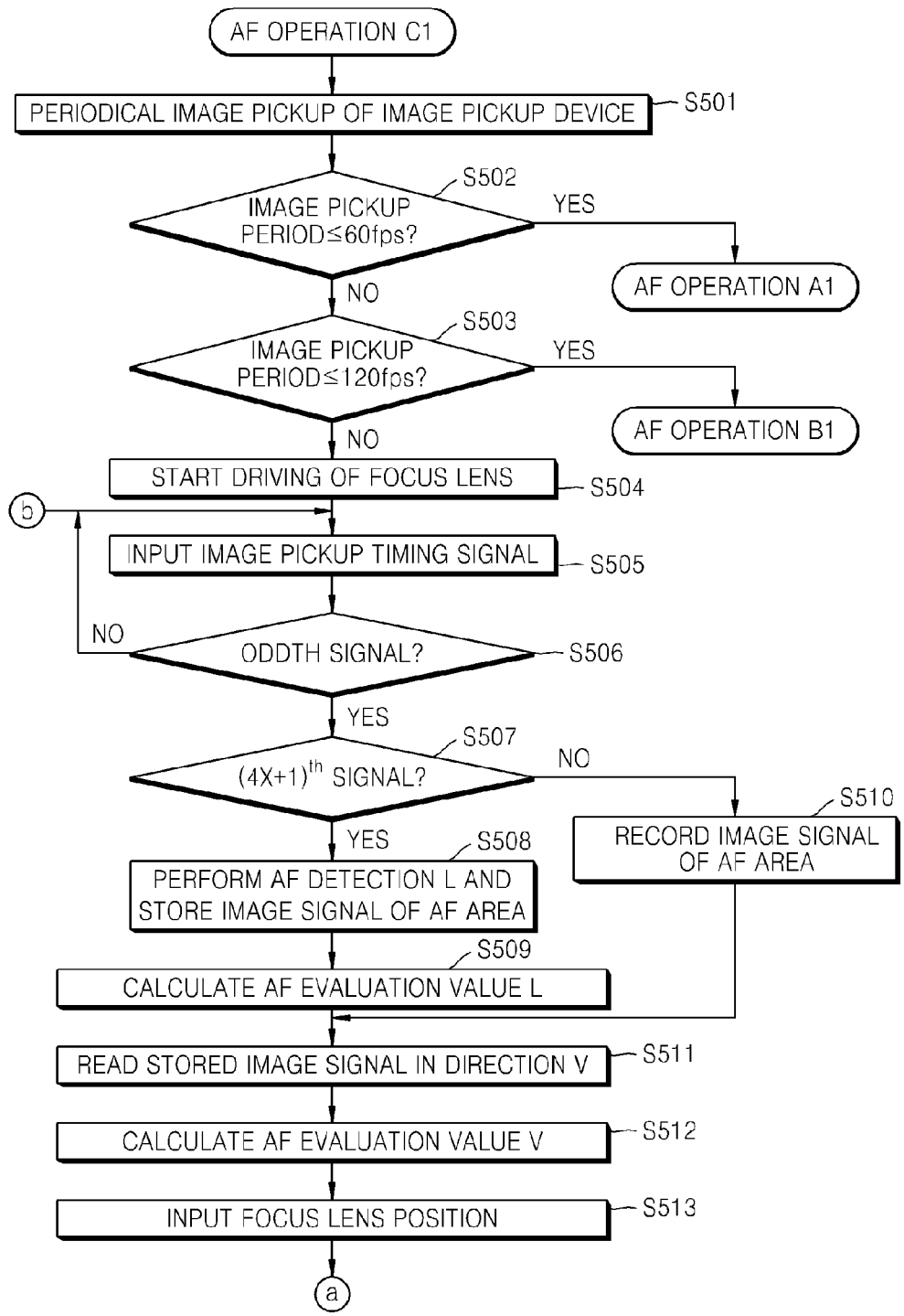

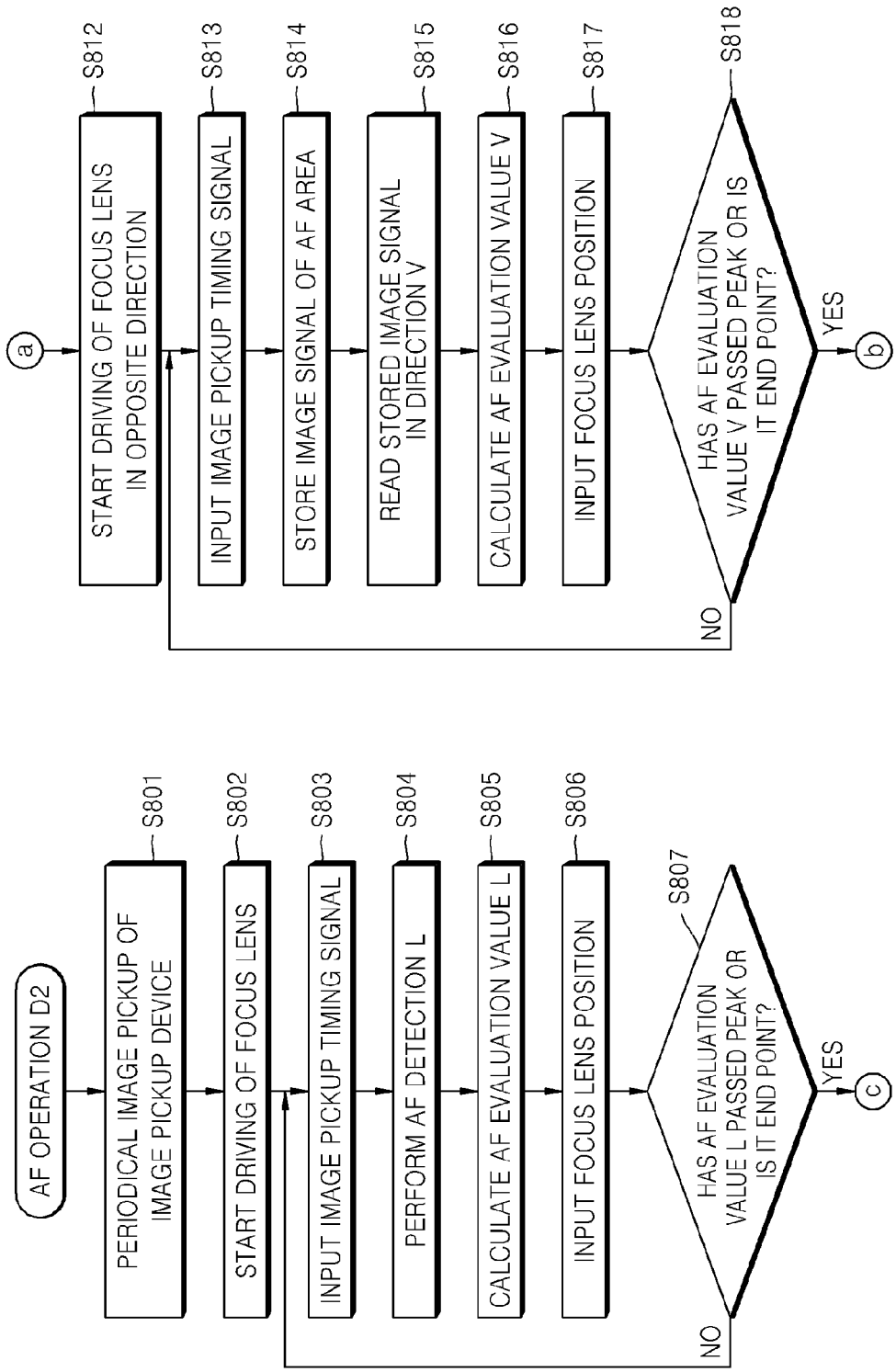

FOCUSING APPARATUS, FOCUSING METHOD AND MEDIUM FOR RECORDING THE FOCUSING METHOD

CROSS-REFERENCE TO RELATED PATENT APPLICATION

This application claims the benefit of Korean Patent Application No. 10-2010-0077497, filed on Aug. 11, 2010, in the Korean Intellectual Property Office, the entire disclosure of which is incorporated herein by reference.

BACKGROUND

1. Field of the Invention

The invention generally relates to a focusing apparatus, a focusing method, and a medium for recording the focusing method.

2. Description of the Related Art

According to a conventional focusing method using a contrast scheme, focusing is performed by calculating a focus evaluation value of an image signal generated by an image pickup device while changing a position of a focus lens. A peak value of the focus evaluation value is derived, and a position of the focus lens corresponding to the peak value is set as a target position. However, an image obtained by capturing a subject may have a small change in a horizontal direction but have a big change in a vertical direction. For such an image, a correct peak value of a focus evaluation value is often not derived by using the conventional focusing method.

SUMMARY

Therefore, there is a need in the art for a focusing apparatus including: a focus lens; a focus lens driver for driving the focus lens in an optical axis direction; an image pickup device for generating an image signal by converting image light incident through the focus lens to an electrical signal; a memory for storing the image signal provided by the image pickup device; a focus evaluation value deriver for deriving a focus evaluation value for an image signal read from the memory in a direction different from a reading direction of the image pickup device; a peak value deriver for deriving a peak value of the focus evaluation value; and a focus lens position deriver for deriving a position of the focus lens in correspondence to the peak value.

The focusing apparatus may further include a determiner for comparing the peak value with a reference peak value, and the focus lens position deriver may derive a focus lens position corresponding to the peak value if the peak value is greater than the reference peak value.

The focus evaluation value deriver may derive a first focus evaluation value for an image signal read in a first direction from the image pickup device and derive a second focus evaluation value for an image signal read in a second direction from the memory, the peak value deriver may derive a peak value of at least one of the first focus evaluation value and the second focus evaluation value, and the focus lens position deriver may derive a focus lens position corresponding to the peak value.

The peak value deriver may derive a first peak value of the first focus evaluation value and a second peak value of the second focus evaluation value.

The focusing apparatus may further include a peak value magnitude determiner for comparing the magnitude of the first peak value to the magnitude of the second peak value, and the focus lens position deriver may derive a focus lens position corresponding to one of the first peak value and the second peak value according to the determination result of the peak value magnitude determiner.

The focusing apparatus may further include: an element number determiner for determining whether the numbers of elements for deriving the focus evaluation values according to the respective directions of the image signal are different from each other; and a standardizer for standardizing the first peak value and the second peak value to be peak values according to the same number of elements if it is determined that they are different from each other, and the peak value magnitude determiner may compare the magnitude of the standardized first peak value to the magnitude of the standardized second peak value.

The focusing apparatus may further include: a first determiner for comparing the first peak value to a first reference peak value; and a second determiner for comparing the second peak value to a second reference peak value, and the focus lens position deriver may derive a first focus lens position corresponding to the first peak value if the first peak value is greater than the first reference peak value and the second peak value is less than the second reference peak value and derive a second focus lens position corresponding to the second peak value if the first peak value is less than the first reference peak value and the second peak value is greater than the second reference peak value.

The focus lens position deriver may derive a first focus lens position corresponding to the first peak value and a second focus lens position corresponding to the second peak value, the focusing apparatus may further include a focus lens position determiner for comparing the first focus lens position to the second focus lens position, and the focus lens driver may drive the focus lens to a focus lens position corresponding to the closer to a subject distance according to the comparison result.

The focusing apparatus may further include a third determiner for comparing a difference between the first focus lens position and the second focus lens position to a reference difference, and the focus lens driver may drive the focus lens to the center of the first focus lens position and the second focus lens position if the difference is less than the reference difference.

The focusing apparatus may further include an image pickup period determiner for comparing an image pickup period of the image pickup device to a reference period, and the memory may store an image signal provided by the image pickup device in a predetermined period unit by which at least one image signal is skipped if the image pickup period is greater than the reference period.

The focus evaluation value deriver may derive a first focus evaluation value for an image signal of the predetermined period unit, which has been read in the first direction from the image pickup device, and derive a second focus evaluation value for an image signal of the predetermined period unit, which has been read in the second direction different form the first direction from the memory, the peak value deriver may derive a peak value of at least one of the first focus evaluation value and the second focus evaluation value, and the focus lens position deriver may derive a focus lens position corresponding to the peak value.

The image signal of the predetermined period unit may be an image signal of a (2n−1) period from among image signals generated by the image pickup device.

The focus evaluation value deriver may derive a first focus evaluation value for an image signal of the predetermined period unit, which has been read in the first direction from the image pickup device, and derive a second focus evaluation value for an image signal of another period unit, which has been read in the second direction different form the first direction from the memory, the peak value deriver may derive a peak value of at least one of the first focus evaluation value and the second focus evaluation value, and the focus lens position deriver may derive a focus lens position corresponding to the peak value.

The image signal of the predetermined period unit may be an image signal of a (2n−1) period from among image signals generated by the image pickup device, and the image signal of another period unit may be an image signal of a (4n−1) period from among the image signals generated by the image pickup device.

The focus evaluation value deriver may derive a first focus evaluation value by reading a first image signal generated by the image pickup device in the first direction while moving the focus lens in one direction and derive a second focus evaluation value by storing a second image signal, which has been generated by the image pickup device while moving the focus lens in the other direction, in the memory and reading the second image signal in the second direction different from the first direction from the memory.

The focus evaluation value deriver may derive the second focus evaluation value after deriving the first focus evaluation value.

The peak value deriver may derive a peak value of one of the first focus evaluation value and the second focus evaluation value, and the focusing apparatus may further include a first peak value deriving information setup unit for, if a first peak value of the first focus evaluation value has been derived, setting information that the first peak value has been derived.

The focusing apparatus may further include a peak value magnitude determiner for comparing the magnitude of the first peak value to the magnitude of a second peak value of the second focus evaluation value when the first peak value has been derived according to the information, and the focus lens position deriver may derive a focus lens position corresponding to one of the first peak value and the second peak value according to the determination result of the peak value magnitude determiner.

The focus lens position deriver may derive a first focus lens position corresponding to the first peak value and a second focus lens position corresponding to the second peak value when the first peak value has been derived according to the information and the focusing apparatus may further include a focus lens position determiner for comparing the first focus lens position to the second focus lens position.

According to another aspect of the invention, there is provided a focusing method including: generating an image signal; storing the image signal; deriving a focus evaluation value by reading the stored image signal a direction different from a reading direction of an image pickup device; deriving a peak value of the focus evaluation value; and deriving a position of a focus lens in correspondence to the peak value.

The focusing method may further include comparing the peak value with a reference peak value, wherein if the peak value is greater than the reference peak value, a focus lens position corresponding to the peak value is derived.

The focusing method may further include: deriving a first focus evaluation value for an image signal read in a first direction from the image pickup device; deriving a second focus evaluation value for an image signal read in a second direction different from the first direction from the stored image signal; deriving a peak value of at least one of the first focus evaluation value and the second focus evaluation value; and deriving a focus lens position corresponding to the peak value.

The focusing method may further include deriving a first peak value of the first focus evaluation value and a second peak value of the second focus evaluation value.

The focusing method may further include comparing the magnitude of the first peak value of the first focus evaluation value to the magnitude of the second peak value of the second focus evaluation value, wherein a focus lens position corresponding to one of the first peak value and the second peak value is derived according to the comparison result.

The focusing method may further include: determining whether the numbers of elements for deriving the focus evaluation values according to the respective directions of the image signal are different from each other; and standardizing the first peak value and the second peak value to be peak values according to the same number of elements if it is determined that they are different from each other, wherein the magnitude of the standardized first peak value is compared to the magnitude of the standardized second peak value.

The focusing method may further include: comparing the first peak value to a first reference peak value; and comparing the second peak value to a second reference peak value, wherein if the first peak value is greater than the first reference peak value and the second peak value is less than the second reference peak value, a first focus lens position corresponding to the first peak value is derived, and if the first peak value is less than the first reference peak value and the second peak value is greater than the second reference peak value, a second focus lens position corresponding to the second peak value is derived.

The focusing method may further include: deriving a first focus lens position corresponding to the first peak value; deriving a second focus lens position corresponding to the second peak value; and comparing the first focus lens position to the second focus lens position, wherein the focus lens is driven to a focus lens position corresponding to the closer to a subject distance according to the comparison result.

The focusing method may further include comparing a difference between the first focus lens position and the second focus lens position to a reference difference, wherein if the difference is less than the reference difference, the focus lens is driven to the center of the first focus lens position and the second focus lens position.

The focusing method may further include comparing an image pickup period of the image pickup device to a reference period, wherein if the image pickup period is greater than the reference period, an image signal provided by the image pickup device is stored in a predetermined period unit by which at least one image signal is skipped.

The focusing method may further include: deriving a first focus evaluation value for an image signal of the predetermined period unit, which has been read in the first direction from the image pickup device; deriving a second focus evaluation value by reading the stored image signal of the predetermined period unit in the second direction different form the first direction; deriving a peak value of at least one of the first focus evaluation value and the second focus evaluation value; and deriving a focus lens position corresponding to the peak value.

The image signal of the predetermined period unit may be an image signal of a (2n−1) period from among image signals generated by the image pickup device.

The focusing method may further include: deriving a first focus evaluation value for an image signal of the predetermined period unit, which has been read in the first direction from the image pickup device; deriving a second focus evaluation value by reading the stored image signal of another period unit in the second direction different form the first direction; deriving a peak value of at least one of the first focus evaluation value and the second focus evaluation value; and deriving a focus lens position corresponding to the peak value.

The image signal of the predetermined period unit may be an image signal of a (2n−1) period from among image signals generated by the image pickup device, and the image signal of another period unit may be an image signal of a (4n−1) period from among the image signals generated by the image pickup device.

The focusing method may further include deriving a first focus evaluation value by reading a first image signal generated by the image pickup device in the first direction while moving the focus lens in one direction, wherein a second focus evaluation value is derived by storing a second image signal, which has been generated by the image pickup device while moving the focus lens in the other direction, and reading the stored second image signal in the second direction different from the first direction.

The second focus evaluation value may be derived after deriving the first focus evaluation value.

The focusing method may further include: deriving a peak value of one of the first focus evaluation value and the second focus evaluation value; and if a first peak value of the first focus evaluation value has been derived, setting information that the first peak value has been derived.

The focusing method may further include comparing the magnitude of the first peak value to the magnitude of a second peak value of the second focus evaluation value when the first peak value has been derived according to the information, wherein a focus lens position corresponding to one of the first peak value and the second peak value is derived according to the comparison result.

The focusing method may further include, if it is determined that the first peak value has been derived according to the information, deriving a first focus lens position corresponding to the first peak value and a second focus lens position corresponding to the second peak value and comparing the first focus lens position to the second focus lens position.

According to another aspect of the invention, there is provided a computer readable recording medium storing a computer readable program for executing the focusing method.

According to the invention, when focusing is performed in a contrast scheme, even though a subject image has any pattern, for example, even when a change of contrast is small in a horizontal direction but big in a vertical direction, focusing can be correctly performed. Furthermore, focusing can be easily performed even in a high-speed capturing mode.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The invention will now be described more fully with reference to the accompanying drawings, in which exemplary embodiments of the invention are shown.

Figure 1:
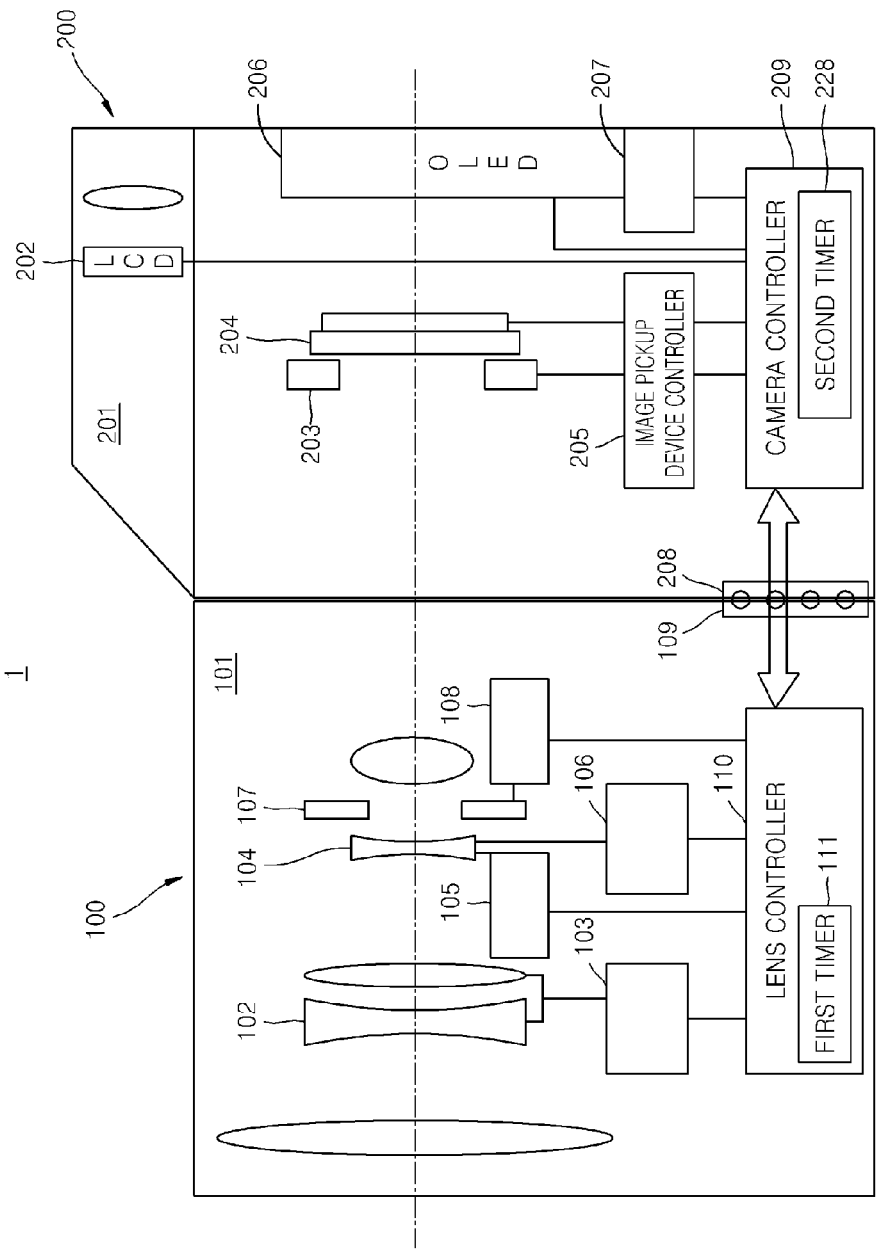
FIG. 1 is a diagram of an interchangeable-lens digital capturing device as an illustration of a focusing apparatus according to an exemplary embodiment of the invention.

FIG. 1 is a diagram of an interchangeable-lens digital capturing device 1 as an illustration of a focusing apparatus according to an exemplary embodiment of the invention. Although the digital capturing device 1 is illustrated as the focusing apparatus in the current embodiment, the invention is not limited to this and can be applied to various digital devices equipped with the focusing apparatus, such as a Personal Digital Assistant (PDA) and a cellular phone.

Referring to FIG. 1, an interchangeable lens (hereinafter, lens) 100 includes an image forming optical system 101, a zoom lens position sensing unit 103, a lens driver 105, a focus lens position sensing unit 106, an iris driver 108, a lens controller 110, and a lens mount 109.

The image forming optical system 101 includes a zoom lens 102 for zooming, a focus lens 104 for changing a focal position, and an iris 107. The zoom lens 102 and the focus lens 104 may be a lens group in which a plurality of lenses are combined.

The zoom lens position sensing unit 103 and the focus lens position sensing unit 106 sense positions of the zoom lens 102 and the focus lens 104, respectively. A timing of sensing a position of the focus lens 104 may be set by the lens controller 110 or a camera controller 209, which will be described later. For example, the timing of sensing a position of the focus lens 104 may be a timing of performing auto-focusing (AF) detection from an image signal.

The lens driver 105 and the iris driver 108 drive the focus lens 104 and the iris 107 under a control of the lens controller 110, respectively. Specifically, the lens driver 105 drives the focus lens 104 in an optical axis direction.

The lens controller 110 includes a first timer 111 for time measurement. The lens controller 110 transmits the sensed position information of the focus lens 104 to a main body 200. When a position of the focus lens 104 varies, or when the camera controller 209 requests for the position information of the focus lens 104, the lens controller 110 can transmit the sensed position information of the focus lens 104 to the main body 200. The first timer 111 may be reset by a reset signal received from the main body 200, thereby synchronizing the time of the lens 100 and the time of the main body 200.

The lens mount 109 includes lens-side communication pins engaged with camera-side communication pins, which are described later, to be used for a communication path of a control signal, etc.

The main body 200 may include a view finder (EVF) 201, a shutter 203, an image pickup device 204, an image pickup device controller 205, a display unit 206, an operating unit 207, the camera controller 209, and a camera mount 208.

The view finder 201 includes a Liquid Crystal Display (LCD) 202, thereby displaying an image during image pickup in real time.

The shutter 203 determines a time for exposing the image pickup device 204 to light, i.e., an exposure time.

The image pickup device 204 generates an image signal by picking up image light which has passed through the image forming optical system 101 of the lens 100. The image pickup device 204 may include a plurality of optoelectronic converters arranged in a matrix form and a vertical or/and horizontal transmission line for reading an image signal by moving electric charges from the plurality of optoelectronic converters. For the image pickup device 204, a Charge Coupled Device (CCD) sensor, a Complementary Metal Oxide Semiconductor (CMOS) sensor, or the like may be used.

The image pickup device controller 205 generates a timing signal and controls the image pickup device 204 to pick up an image by synchronizing the timing signal. In addition, the image pickup device controller 205 sequentially reads a horizontal image signal as electric charge accumulation to scanning lines ends. In the reading, the horizontal image signal is used for AF detection by the camera controller 209.

The display unit 206 displays various kinds of images and information. For the display unit 206, an Organic Light Emitting Diode (OLED) or the like may be used.

The operating unit 207 is a part for inputting from a user various kinds of instructions for an operation of the digital capturing device 1. The operating unit 207 may include various buttons such as a shutter release button, a main switch, a mode dial, and a menu button.

The camera controller 209 calculates an AF evaluation value by performing AF detection for an image signal generated by the image pickup device 204. In addition, the camera controller 209 records an AF evaluation value at every AF detection time in response to the timing signal generated by the image pickup device controller 205 and calculates a focal position using the focus lens position information received from the lens 100 and the recorded AF evaluation values. A calculation result of the focal position is transmitted to the lens 100. The camera controller 209 may include a second timer 228 for time measurement, the second timer 228 being simultaneously reset with the first timer 111 for the lens 100 and the main body 200 to be able to measure the same time.

The camera mount 208 includes the camera-side communication pins.

A schematic operation of the lens 100 and the main body 200 will now be described.

When a subject is captured, an operation of the digital capturing device 1 starts by operating the main switch of the operating unit 207. The digital capturing device 1 performs a live view display as described below.

Image light of the subject, which has passed through the image forming optical system 101, is incident to the image pickup device 204. At this time, the shutter 203 is open. The incident image light is converted to an electrical signal by the image pickup device 204, thereby generating an image signal. The image pickup device 204 operates by a timing signal generated by the image pickup device controller 205. The generated image signal of the subject is converted to displayable data by the camera controller 209 and is output to the view finder 201 and the display unit 206. This operation is the live view display, and live view images displayed by the live view display may be continuously displayed as a moving picture.

After the live view display is performed, if the shutter release button, one component of the operating unit 207, is pressed halfway, the digital capturing device 1 starts an AF operation. The AF operation is performed using the image signal generated by the image pickup device 204. In a contrast AF method, a focal position is calculated from an AF evaluation value associated with a contrast value, and the lens 100 is driven based on the calculation result. The AF evaluation value is calculated by the camera controller 209. The camera controller 209 calculates information for a control of the focus lens 104 from the AF evaluation value and transmits the information to the lens controller 110 via the lens-side and the camera-side communication pins included in the lens mount 109 and the camera mount 208, respectively.

The lens controller 110 performs AF by driving the focus lens 104 in an optical axis direction by controlling the lens driver 105 based on the received information. A position of the focus lens 104 is monitored by the focus lens position sensing unit 106, thereby establishing a feedback control.

When the zoom lens 102 zooms by a user's operation, the zoom lens position sensing unit 103 senses a position of the zoom lens 102, and the lens controller 110 performs AF again by modifying AF control parameters of the focus lens 104.

If an image of the subject is in complete focus by the operation described above, the digital capturing device 1 performs light exposure in a fully-pressed state S2 of the shutter release button. At this time, the camera controller 209 fully closes the shutter 203 and transmits measured light information acquired till that time to the lens controller 110 as iris control information. The lens controller 110 controls the iris driver 108 based on the iris control information to operate the iris 107 to a proper iris opening gap. The camera controller 209 controls the shutter 203 based on the measured light information to capture an image of the subject by opening the shutter 203 during a proper exposure time.

Figure 3:
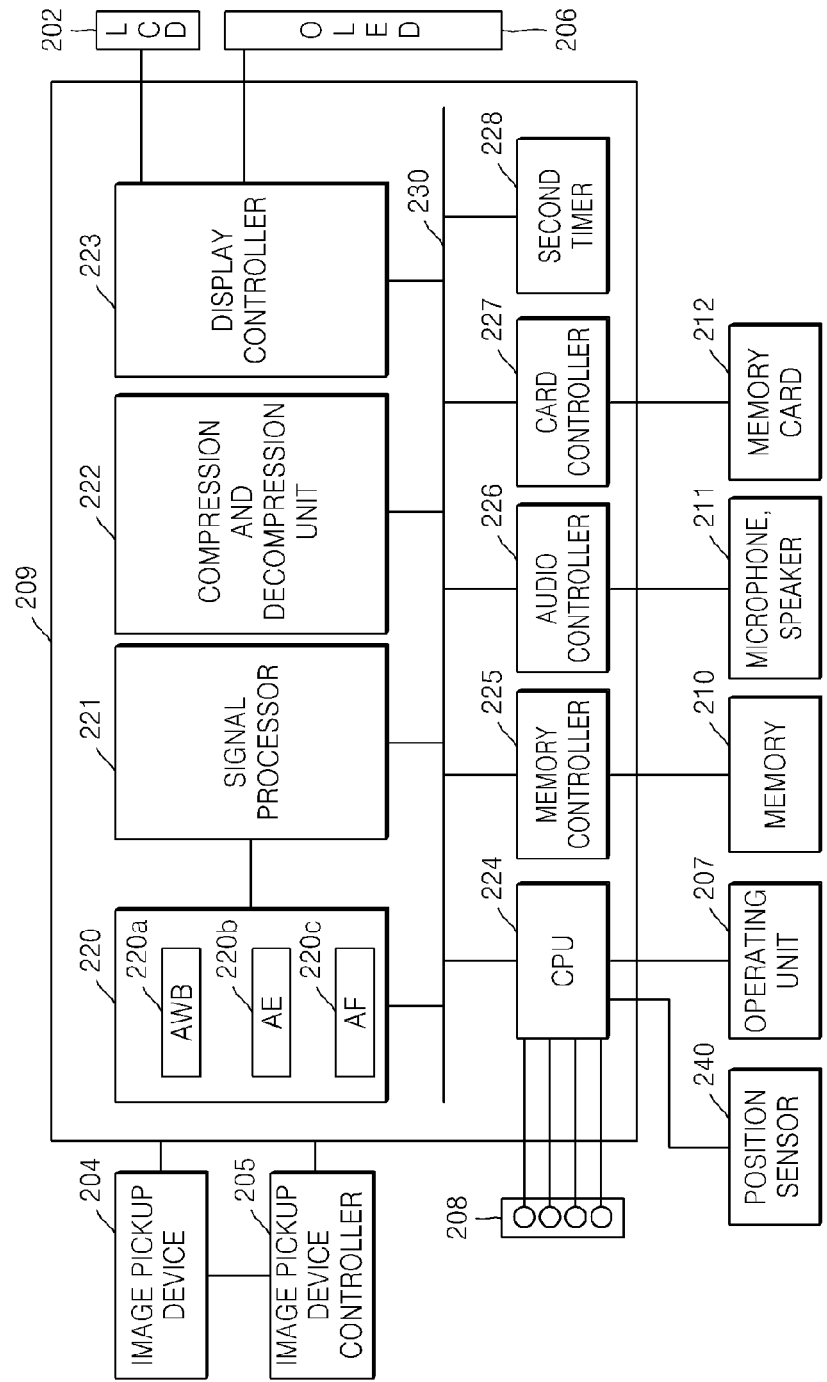
FIG. 3 is a block diagram of a camera controller of the digital capturing device illustrated in FIG. 1, according to an exemplary embodiment of the invention.

The captured image is image signal processed and compressed and recorded in a memory card 212 of FIG. 3. At the same time, the captured image is output to the view finder 201 and the display unit 206 for displaying a subject. Such an image is called a quick view image.

A series of capturing operations ends by the procedures described above.

Figure 2:
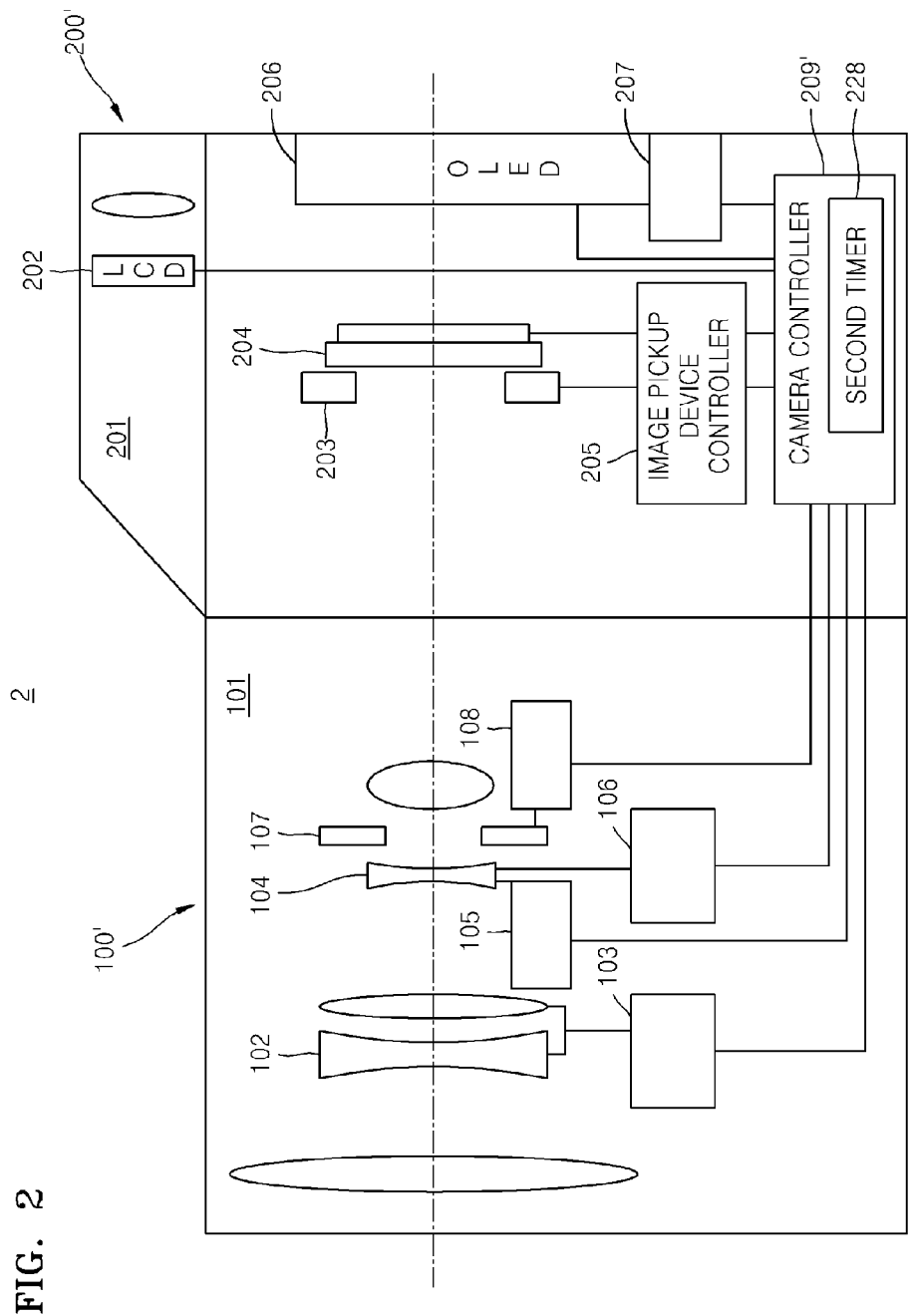
FIG. 2 is a diagram of a fixed-lens digital capturing device as another illustration of the focusing apparatus according to an exemplary embodiment of the invention.

FIG. 2 is a diagram of a fixed-lens digital capturing device 2 as another illustration of the focusing apparatus according to an exemplary embodiment of the invention. Since the digital capturing device 2 according to the current embodiment has similar configuration and functions to the digital capturing device 1 illustrated in FIG. 1, differences between them will be mainly described.

Since the digital capturing device 2 includes a lens 100' and a main body 200' as one body, an exchange of the lens 100' is impossible. Since the lens 100' and the main body 200' are one body, the lens mount 109 and the camera mount 208 illustrated in FIG. 1 do not exist. Thus, a camera controller 209' directly controls the lens driver 105 and the iris driver 108 to drive the zoom lens 102, the focus lens 104, and the iris 107. In addition, the camera controller 209' directly receives position information from the zoom lens position sensing unit 103 and the focus lens position sensing unit 106. That is, the camera controller 209' in the current embodiment further functions as the lens controller 110 illustrated in FIG. 1.

In the current embodiment, the AF evaluation value and the lens position are synchronized using the second timer 228

Since the other components having the same reference numerals as those illustrated in FIG. 1 perform the similar functions as those illustrated in FIG. 1, detailed description of them is omitted.

FIG. 3 is a block diagram of the camera controller 209 of the focusing apparatus illustrated in FIG. 1, according to an exemplary embodiment of the invention. FIG. 3 shows blocks of other components connected to the camera controller 209 together to describe the camera controller 209. Although the camera controller 209 of the focusing apparatus illustrated in FIG. 1 is described in the current embodiment, the invention is not limited to this and the description may also apply to the camera controller 209' of the focusing apparatus illustrated in FIG. 2.

Referring to FIG. 3, the camera controller 209 may include a pre-processing unit 220, a signal processor 221, a compression and decompression unit 222, a display controller 223, a Central Processing Unit (CPU) 224, a memory controller 225, an audio controller 226, a card controller 227, a second timer 228, and a main bus 230.

The camera controller 209 provides various kinds of instructions and data to each component via the main bus 230.

The pre-processing unit 220 receives an image signal generated by the image pickup device 204 and performs calculation of Auto White Balance (AWB), Auto Exposure (AE), and AF. That is, the pre-processing unit 220 calculates an AF evaluation value for focus adjustment, an AE evaluation value for exposure adjustment, and an AWB evaluation value for white balance adjustment. The AF evaluation value may include a horizontal AF evaluation value indicating a horizontal contrast and a vertical AF evaluation value indicating a vertical contrast. The horizontal AF evaluation value may be calculated by directly receiving a horizontal image signal when the horizontal image signal is read from the image pickup device 204. The vertical AF evaluation value may be calculated by temporarily recording the horizontal image signal in a memory 210 to be described later and reading the recorded image signal as a vertical image signal component. That is, the pre-processing unit 220 may be an example of an AF evaluation value calculator.

The signal processor 221 performs a series of image signal processing, such as gamma compensation, to generate a live view image or a captured image displayable on the display unit 206.

The compression and decompression unit 222 performs compression and decompression of an image signal on which image signal processing has been performed. In the case of compression, an image signal is compressed in a compression format such as, for example, Joint Photographic Experts Group (JPEG) compression format or H.264 compression format. An image file including image data generated by the compression processing is transmitted to and recorded in a memory card 212.

The display controller 223 controls an image output to a display screen such as the LCD 202 of the view finder 201 or the display unit 206.

The CPU 224 generally controls an operation of each component. In addition, in the case of the digital capturing device 1 illustrated in FIG. 1, the CPU 224 performs communication with the lens 100.

The memory controller 225 controls the memory 210 for temporarily recording data such as a captured image or associated information, and the audio controller 226 controls a microphone or speaker 211. The card controller 227 controls the memory card 212 for recording captured images.

When a horizontal image signal is read from the image pickup device 204, the memory controller 225 sequentially records the read horizontal image signal in the memory 210. At this time, a recording place of the horizontal image signal can be determined by the memory controller 225. In the current embodiment, a vertical image signal component is necessary to read an image signal corresponding to a focus area later. Thus, the memory controller 225 controls a horizontal image signal to be recorded in the memory 210 so as to easily read a vertical image signal.

The second timer 228 is simultaneously reset with the first timer 111, thereby measuring time.

A schematic operation of the camera controller 209 will now be described.

When the CPU 224 senses an operation of the operating unit 207, the CPU 224 enables the image pickup device controller 205 via the pre-processing unit 220. When an image signal is received from the image pickup device 204 to the pre-processing unit 220, AWB and AE calculation is performed. A result of the AWB and AE calculation is fed back to the image pickup device controller 205 for the image pickup device 204 to generate an image signal according to proper color output and proper exposure.

Meanwhile, a live view display is performed as an operation of the digital capturing device 1 starts. At this time, an image signal captured with proper exposure is received by the pre-processing unit 220, and the camera controller 209 can calculate an AE evaluation value and so on. An image signal for live view display is directly transmitted from the pre-processing unit 220 to the signal processor 221 without via the main bus 230, and the signal processor 221 may perform image signal processing on the image signal, such as interpolation processing of pixels. The image signal on which the image signal processing has been performed is transmitted to the LCD 202 and the display unit 206 via the main bus 230 and the display controller 223. The live view display may be basically updated in a period of 60 frames per second (fps) but is not limited to this. That is, the live view display may be updated in a period of 120 fps, 180 fps, or 240 fps. The updating period may be set by the CPU 224 based on a measured light result, an AF condition, or the like. However, the updating period may be set by changing a timing signal by the image pickup device controller 205.

When the shutter release button is pressed halfway, the CPU 224 senses the generation of a half-pressed signal S1 and instructs the lens controller 110 via the lens-side and the camera-side communication pins included in the camera mount 208 and the lens mount 109 to start driving the focus lens 104 for an AF operation. Alternatively, when the CPU 224 senses the generation of the half-pressed signal S1, the CPU 224 controls driving of the focus lens 104 for an AF operation. That is, the CPU 224 may function as a main controller.

The CPU 224 acquires an image signal from the image pickup device 204, and the pre-processing unit 220 calculates an AF evaluation value. The AF evaluation value is calculated according to the movement of the focus lens 104. A position of the focus lens 104 in which a contrast of an image of a subject is maximized (a position in which the AF evaluation value is maximized) is calculated from a change of the AF evaluation value, and the focus lens 104 is moved to the calculated position. The series of operations is called an AF operation, and live view images are continuously displayed during the AF operation. An image signal used for a live view image may be identical to an image signal used for calculating the AF evaluation value.

The digital capturing device 1, which uses the interchangeable lens 100, uses the camera-side and the lens-side communication pins included in the camera mount 208 and the lens mount 109 for communication between the lens 100 and the main body 200 during the AF operation. The communication pins may perform serial communication to deliver lens information or control information. Time delay occurs in the serial communication. However, if position information of the focus lens 104 regarding an AF evaluation value is not recorded without time delay, correct focusing cannot be performed. In order to reduce time for the main body 200 to inform the lens 100 of a timing of acquiring an AF evaluation value or a time for the lens 100 to transmit a position of the focus lens 104 to the main body 200, the time delay during the serial communication needs to be extremely short compared with a moving speed of the focus lens 104. However, making the time delay during the serial communication extremely short is not realistic. Thus, a method of establishing communication pins for synchronization may be taken into account. However, the use of communication pins only for synchronization may increase the number of communication pins, thereby increasing the sizes of the camera mount 208 and the lens mount 109 and increasing costs. Thus, in the current embodiment, a timer function for synchronization with the lens 100 and the main body 200 is prepared. In addition, predetermined communication pins are set to operate for realtime communication first and operate for serial communication that is non-realtime communication after the timer function of the lens 100 is reset by the realtime communication.

Meanwhile, the position of the focus lens 104 at the maximum contrast, i.e., a peak position of the AF evaluation value, may be calculated by the image pickup device 204 perceiving a position trace of the focus lens 104, which has acquired an image signal, and a changing transition of the AF evaluation value.

An AF area used to calculate the AF evaluation value in the AF operation will now be described.

Figure 4:
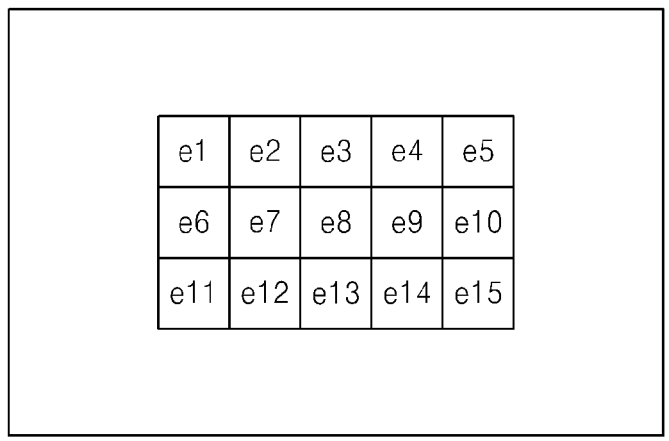
FIG. 4 is a diagram for describing multiple focus areas.
Figure 5:
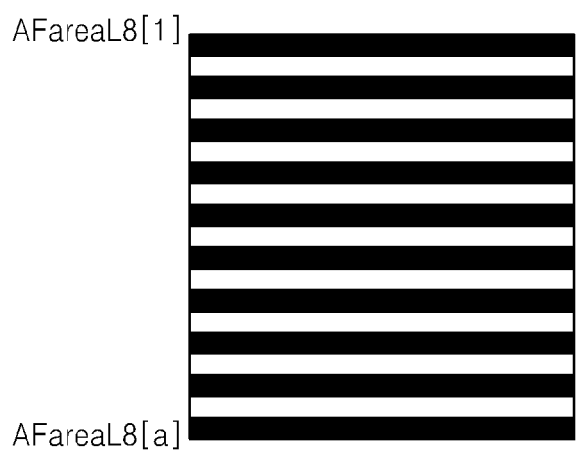
FIG. 5 is a diagram for describing scanning lines included in a focus area e8 among the focus areas shown in FIG. 4.

FIG. 4 is a diagram for describing multiple focus areas. FIG. 5 is a diagram for describing scanning lines included in the focus area e8 of FIG. 4, and FIG. 6 is a diagram for describing a vertical image signal divided from an image signal included in the focus area e8 among the focus areas shown in FIG. 4.

Referring to FIG. 4, in an example embodiment, focus areas are established with 15 areas divided on the center of a captured screen in the form of mirror symmetry. Hereinafter, in exemplary embodiments of the invention, it is assumed that the focus area e8 is an AF area.

The image pickup device 204 sequentially arranges a first scanning line to an $n^{th}$ scanning line from the top. Referring to FIG. 5, a plurality of scanning lines AFareaL8[1] to AFareaL8[a] are included in the focus area e8. The image pickup device controller 205 controls the image pickup device 204 to sequentially output a horizontal image signal of the first scanning line to a horizontal image signal of the $n^{th}$ scanning line.

Figure 6:
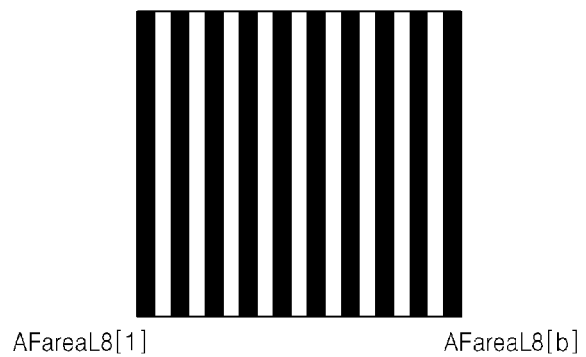
FIG. 6 is a diagram for describing a vertical image signal divided from an image signal included in the focus area e8 among the focus areas shown in FIG. 4.

Meanwhile, when an image signal of the focus area e8 is divided into vertical image signal components, b vertical image signals AFareaL8[1] to AFareaL8[b] can be formed as illustrated in FIG. 6. Since a vertical image signal cannot be directly read from the image pickup device 204, read horizontal image signals are temporarily recorded in the memory 210. If necessary, the memory controller 225 controls pre-recorded vertical image signals to be read from the memory 210.

Focusing a vertical image signal will be described in more detail with reference to the drawings below.

Figure 7:
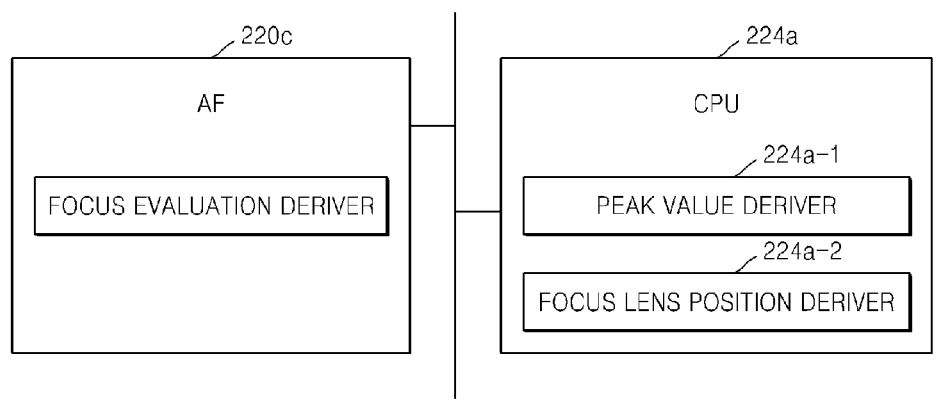
FIGS. 7 to 12 are block diagrams illustrating an AF and a CPU included in a camera controller of the digital capturing apparatus illustrated in FIG. 3, according to exemplary embodiments of the invention.

FIG. 7 is a block diagram illustrating an AF 220c and the CPU 224 (here, 224a) included in the camera controller 209 of the digital capturing device 1 illustrated in FIG. 3, according to an exemplary embodiment of the invention.

The AF 220c in the current embodiment includes an AF evaluation value deriver for deriving an AF evaluation value for an image signal provided from the memory 210. The AF evaluation value deriver can derive an AF evaluation value for an image signal provided from the memory 210, the image signal provided by the image pickup device 204 and stored in the memory 210.

The AF evaluation value deriver may derive an AF evaluation value for an image signal read in a direction different form a reading direction of the image pickup device 204. In detail, after an image signal provided from the image pickup device 204 is stored in the memory 210, the AF evaluation value deriver may derive an AF evaluation value for an image signal read from the memory 210 in a second direction different from a first direction in which the image signal is read from the image pickup device 204. For example, the first direction may be a horizontal direction that is a scanning line direction in the image pickup device 204, and the second direction may be a vertical direction that is a data line direction.

A peak value deriver 224a-1 of the CPU 224a may derive a peak value of the AF evaluation value, and a focus lens position deriver 224a-2 may derive a focus lens position corresponding to the peak value.

The AF evaluation value deriver may derive an AF evaluation value for an image signal provided by the image pickup device 204, too. In detail, the AF evaluation value deriver may derive an AF evaluation value for an image signal read in one direction from the image pickup device 204.

Thus, the peak value deriver 224a-1 may derive a first peak value of a first AF evaluation value or/and a second peak value of a second AF evaluation value, wherein the focus lens position deriver 224a-2 may derive a first focus lens position corresponding to the first peak value or/and a second focus lens position corresponding to the second peak value.

In the current embodiment, the one direction is a direction in which an image signal is read from the image pickup device 204 and may be the horizontal direction corresponding to the scanning lines AFareaL8[1] to AFareaL8[a] illustrated in FIG. 5, and the other direction may be the vertical direction corresponding to the data lines AFareaL8[1] to AFareaL8[b] illustrated in FIG. 6.

In the invention, a peak value is an AF evaluation value in an in-focus state and may be substantially a value corresponding to the maximum value, the minimum value, the greatest value, or the least value of the AF evaluation value. A detailed description on deriving of a peak value will be made with reference to FIG. 13 later.

Figure 8:
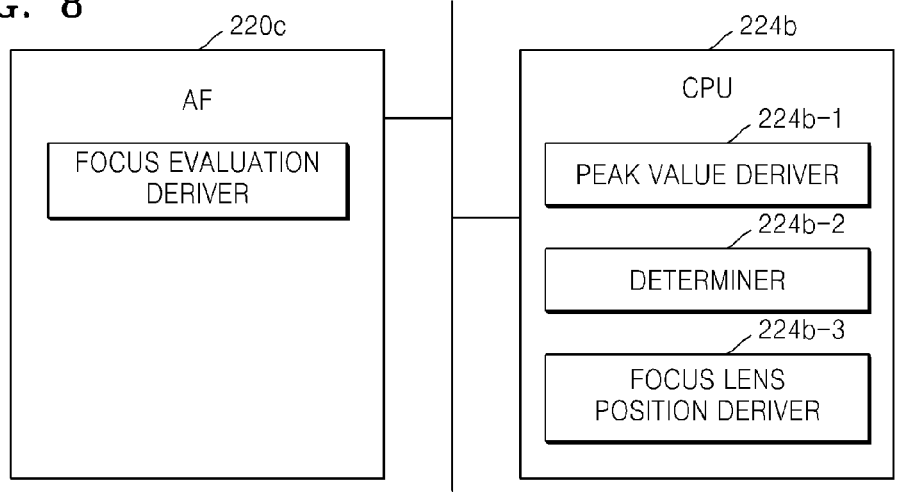

FIG. 8 is a block diagram illustrating the AF 220c and the CPU 224 (here, 224b) included in the camera controller 209 of the digital capturing device 1 illustrated in FIG. 3, according to another exemplary embodiment of the invention. The AF 220c in the current embodiment includes an AF evaluation value deriver. Since the AF evaluation value deriver is identical to that illustrated in FIG. 7, a detailed description is omitted, and since the embodiments below have the same AF evaluation value deriver as illustrated in FIG. 7, a description thereof will be omitted.

The CPU 224b includes a peak value deriver 224b-1, a determiner 224b-2, and a focus lens position deriver 224b-3.

The peak value deriver 224b-1 derives a peak value of the AF evaluation value. As described above, the peak value deriver 224b-1 may derive a first peak value of a first AF evaluation value or a second peak value of a second AF evaluation value.

The determiner 224b-2 compares the peak value to a reference peak value. As a result of the comparison, if the peak value is equal to or greater than (or exceeds) the reference peak value, the focus lens position deriver 224b-3 may derive a focus lens position corresponding to the peak value.

The determiner 224b-2 may compare the first peak value to a first reference peak value. In addition, the determiner 224b-2 may compare the second peak value to a second reference peak value. The first reference peak value may be equal to the second reference peak value.

The focus lens position deriver 224b-3 may derive a focus lens position corresponding to one of the first reference peak value and the second reference peak value exceeding the respective reference peak values according to the determination result of the determiner 224b-2. If both the first reference peak value and the second reference peak value exceed the respective reference peak values, a focus lens position corresponding to one of the first reference peak value and the second reference peak value can be derived.

Figure 9:
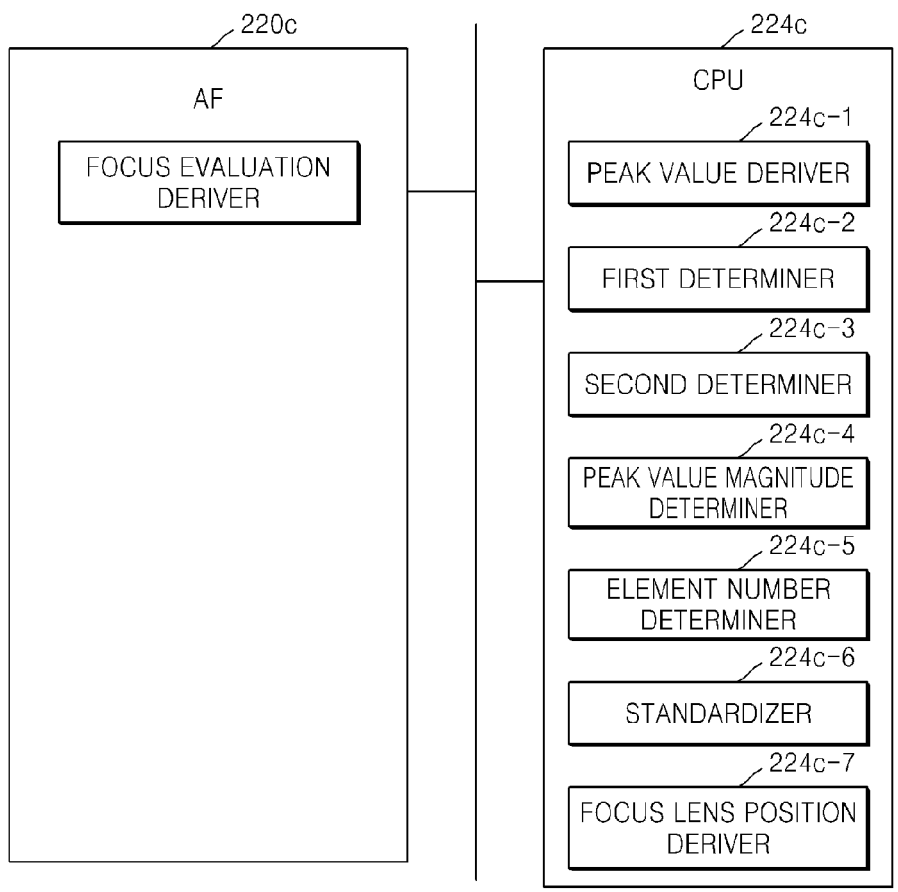

FIG. 9 is a block diagram illustrating the AF 220c and the CPU 224 (here, 224c) included in the camera controller 209 of the digital capturing device 1 illustrated in FIG. 3, according to another exemplary embodiment of the invention.

The AF 220c in the current embodiment includes an AF evaluation value deriver.

The AF evaluation value deriver may derive a first AF evaluation value for an image signal read in a first direction from the image pickup device 204 and derive a second AF evaluation value for an image signal read in a second direction different from the first direction from the memory 210. The image signal provided by the image pickup device 204 is stored in the memory 210 and provided from the memory 210, and the second AF evaluation value can be derived for the image signal read in the second direction different from the first direction in which the image signal is read from the image pickup device 204.

For example, the first AF evaluation value may be derived for an image signal read in the horizontal direction from the image pickup device 204, and the second AF evaluation value may be derived for an image signal read in the vertical direction from the memory 210.

The CPU 224c includes a peak value deriver 224c-1, a first determiner 224c-2, a second determiner 224c-3, a peak value magnitude determiner 224c-4, and a focus lens position deriver 224c-7.

The peak value deriver 224c-1 may derive a first peak value of a first AF evaluation value or/and a second peak value of a second AF evaluation value.

The first determiner 224c-2 compares the first peak value to a first reference peak value. The second determiner 224c-3 compares the second peak value to a second reference peak value.

If only one of the first peak value and the second peak value is greater than its corresponding reference peak value, the focus lens position deriver 224c-7 may derive a focus lens position corresponding to the peak value greater than its corresponding reference peak value.

If the first peak value is equal to or greater than the first reference peak value and the second peak value is equal to or greater than the second reference peak value, the peak value magnitude determiner 224c-4 may compare the first peak value to the second peak value. According to the comparison result, the focus lens position deriver 224c-7 may derive a focus lens position corresponding to the greater peak value. In the invention, it is determined that a peak value is in a correct focusing state as the peak value is greater, that is, the greater peak value is a value desired by a user. However, a less peak value may be a peak value in a correct focusing state according to types of images. In this case, the comparison in the current embodiment should be applied on the contrary. For example, a less one of the first peak value and the second peak value may be selected instead of the greater one.

The CPU 224c may further include an element number determiner 224c-5 and a standardizer 224c-6.

The element number determiner 224c-5 compares the first number of elements for deriving an AF evaluation value in the first direction for the image signal to the second number of elements for deriving an AF evaluation value in the second direction for the image signal. For example, the first number of elements in the horizontal direction is compared to the second number of elements in the vertical direction. In more detail, the number of elements is the number of pieces of data in a focus area for deriving an AF evaluation value.

When the first number of elements in the one direction is different from the second number of elements in the other direction, the standardizer 224c-6 standardizes the first number of elements and the second number of elements so as to show an effect in the same level as the numbers of elements are the same. If the first number of elements in the horizontal direction is different from the second number of elements in the vertical direction, frequency bands thereof are delicately different from each other, and thus an AF evaluation value tends to be output differently. Accordingly, the standardization can be performed. In the current embodiment, as an example of the standardization, a weight may be applied to at least one of the first peak value and the second peak value. In detail, a coefficient G may be multiplied by at least one of the first peak value and the second peak value.

Thereafter, the peak value magnitude determiner 224c-4 may compare the magnitudes of the standardized peak values to each other.

Then, the lens driver 105 may drive the focus lens 104 toward the derived focus lens position.

Figure 10:
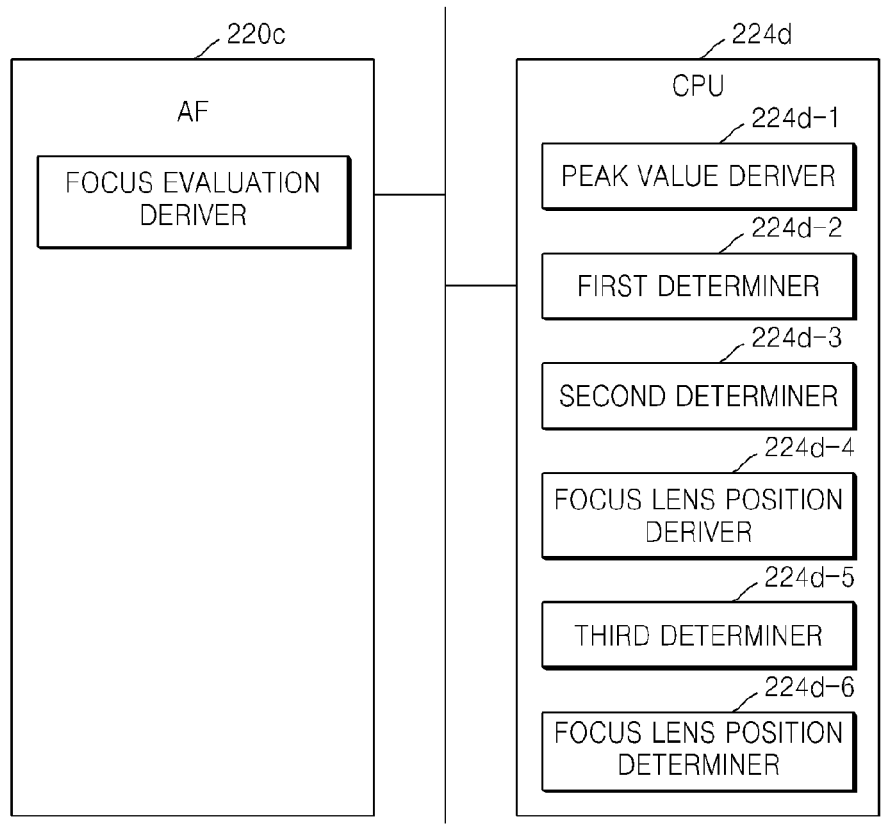

FIG. 10 is a block diagram illustrating the AF 220c and the CPU 224 (here, 224d) included in the camera controller 209 of the digital capturing device 1 illustrated in FIG. 3, according to another exemplary embodiment of the invention.

The AF 220c in the current embodiment includes an AF focus evaluation deriver. The CPU 224d includes a peak value deriver 224d-1, a first determiner 224d-2, a second determiner 224d-3, a focus lens position deriver 224d-4, a third determiner 224d-5, and a focus lens position determiner 224d-6. Since the components in the current embodiment are similar to those illustrated in FIG. 9, different parts will be mainly described.

The AF focus evaluation deriver derives the first AF evaluation value and the second AF evaluation value. The peak value deriver 224d-1 derives a first peak value of the first AF evaluation value and a second peak value of the second AF evaluation value.

The first determiner 224d-2 compares the first peak value to a first reference peak value. The second determiner 224d-3 compares the second peak value to a second reference peak value.

The focus lens position deriver 224d-4 may derive a first focus lens position corresponding to the first peak value. In particular, if the first peak value is greater than the first reference peak value, the focus lens position deriver 224d-4 may derive the first focus lens position. Preferably, if the second peak value is greater than the second reference peak value, the focus lens position deriver 224d-4 may derive a second focus lens position.

The third determiner 224d-5 may compare a difference between the first focus lens position and the second focus lens position to a reference difference. If the difference is less than the reference difference, the center between the first focus lens position and the second focus lens position may be determined as a target position. Thus, the lens driver 105 may drive the focus lens 104 based on the center.

If the difference is greater than the reference difference, the third determiner 224d-5 may compare the first focus lens position corresponding to the first peak value to the second focus lens position corresponding to the second peak value. If the first peak value is equal to or greater than (or exceeds) the first reference peak value, and if the second peak value is equal to or greater than (or exceeds) the second reference peak value, focus lens positions thereof may be compared to each other.

According to the comparison result, a focus lens position corresponding to the closer to a subject distance from among the first focus lens position and the second focus lens position may be determined as a final target position. In detail, the lens driver 105 may drive the focus lens 104 to a target position by determining a greater one of the first focus lens position and the second focus lens position as the target position. Since a greater focus lens position corresponds to the closer to the subject distance, the greater focus lens position can be determined as the target position.

Figure 11:
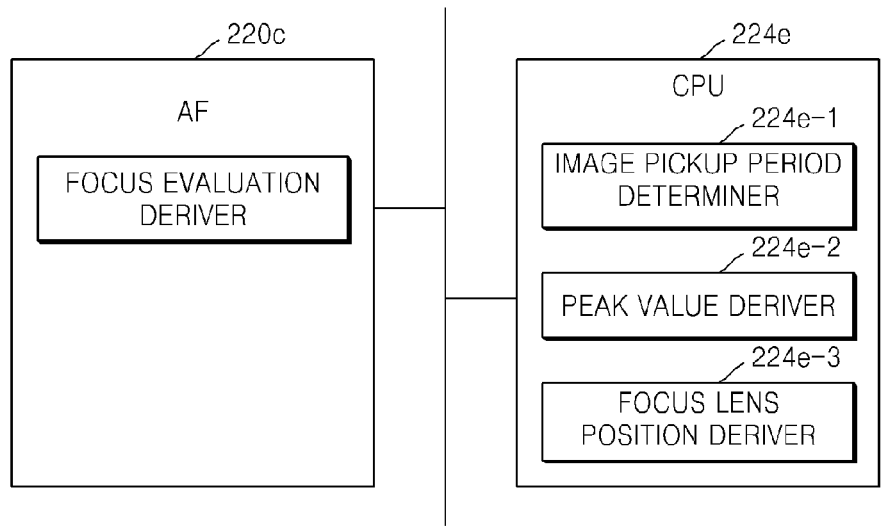

FIG. 11 is a block diagram illustrating the AF 220c and the CPU 224 (here, 224e) included in the camera controller 209 of the digital capturing device 1 illustrated in FIG. 3, according to another exemplary embodiment of the invention.

Referring to FIG. 11, the AF 220c in the current embodiment includes an AF evaluation value deriver. The CPU 224e includes an image pickup period determiner 224e-1, a peak value deriver 224e-2, and, a focus lens position deriver 224e-3.

The image pickup period determiner 224e-1 compares an image pickup period of the image pickup device 204 to a reference period. If the image pickup period is greater than the reference period, an image signal provided by the image pickup device 204 can be stored in the memory 210 in a predetermined period unit by which at least one image signal is skipped. That is, the memory controller 225 may control to store an image signal in the memory 210 in the predetermined period unit.

In the current embodiment, the AF evaluation value deriver may derive a first AF evaluation value for the image signal of the predetermined period unit, which has been read in the first direction from the image pickup device 204, and derive a second AF evaluation value for the image signal of the pre-determined period unit, which has been read in the second direction different form the first direction from the memory 210. The peak value deriver 224e-2 may derive a first peak value of the first AF evaluation value or/and a second peak value of the second AF evaluation value. The focus lens position deriver 224e-3 may derive a focus lens position corresponding to at the least one of the first peak value and the second peak value.

For example, the image signal of the predetermined period unit may be an image signal of a (2n−1) period from among image signals generated by the image pickup device 204.

Alternatively, the AF evaluation value deriver may derive the first AF evaluation value for the image signal of the predetermined period unit, which has been read in the first direction from the image pickup device 204, and derive a second AF evaluation value for an image signal of another period unit, which has been read in the second direction different form the first direction from the memory 210. At this time, the peak value deriver 224e-2 may derive a peak value of at least one of the first AF evaluation value and the second AF evaluation value, and the focus lens position deriver 224e-3 may derive a focus lens position corresponding to the derived peak value. For example, the image signal of the predetermined period unit may be an image signal of a (2n−1) period from among image signals generated by the image pickup device 204, and the image signal of another period unit may be an image signal of a (4n−1) period from among the image signals generated by the image pickup device 204.

Although not shown in the current embodiment, the CPU 224e may further include at least one of a first determiner for comparing the first peak value to a first reference peak value, a second determiner for comparing the second peak value to a second reference peak value, a peak value magnitude determiner for comparing the first peak value to the second peak value, and a focus lens position determiner for comparing a first focus lens position to a second focus lens position. Since the configurations described above are identical to those described in the above-described embodiments, a detailed description thereof is omitted.

Figure 12:
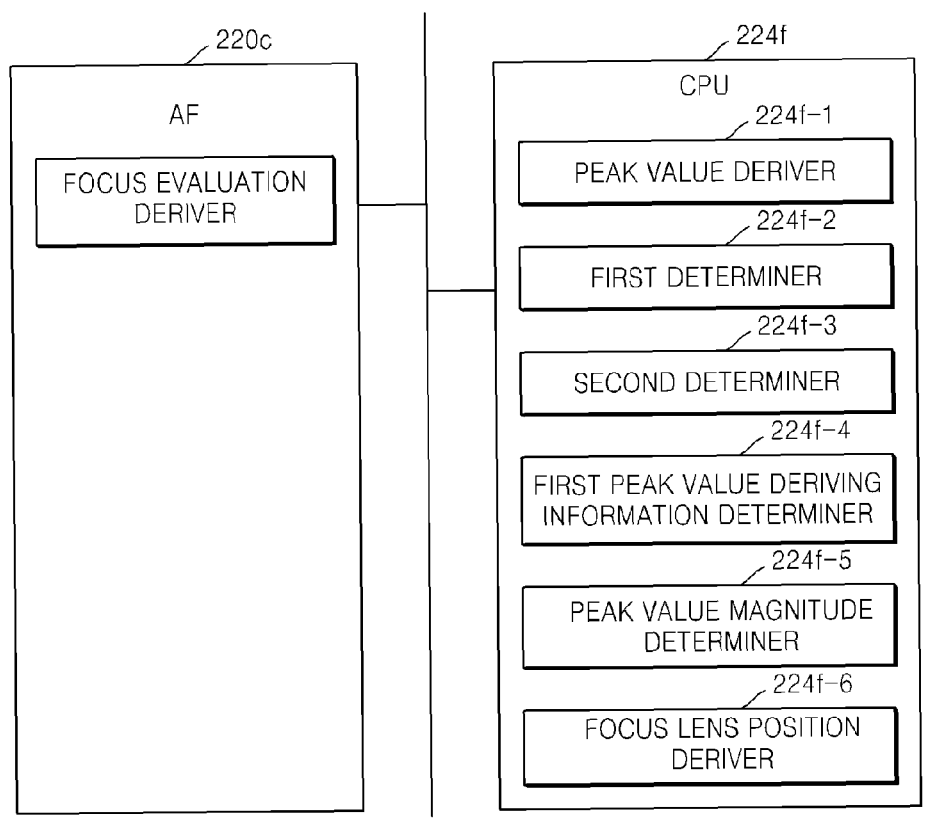

FIG. 12 is a block diagram illustrating the AF 220c and the CPU 224 (here, 224f) included in the camera controller 209 of the digital capturing device 1 illustrated in FIG. 3, according to another exemplary embodiment of the invention.

Referring to FIG. 12, the AF 220c in the current embodiment includes an AF focus evaluation deriver. The AF focus evaluation deriver derives a first AF evaluation value by reading a first image signal generated by the image pickup device 204 in the first direction while moving the focus lens 104 in one direction. The AF evaluation value deriver also derives a second AF evaluation value by storing a second image signal, which has been generated by the image pickup device 204 while moving the focus lens 104 in the other direction, in the memory 210 and reading the second image signal in the second direction different from the first direction from the memory 210. After deriving the first AF evaluation value, the second AF evaluation value may be derived. That is, after deriving the first AF evaluation value while moving the focus lens 104 in the one direction, the second AF evaluation value may be derived while moving the focus lens 104 in the other direction that is the opposite direction of the one direction. Thus, even in a case where the first AF evaluation value and the second AF evaluation value cannot be derived (refer to FIGS. 18 and 22), i.e., in a high-speed capturing mode, the first AF evaluation value can be derived in every frame, and the second AF evaluation value can be derived in every frame, too.

The number of frames for deriving the first AF evaluation value may be set to be identical to the number of frames for deriving the second AF evaluation value, or if the first AF evaluation value has been derived or the focus lens 104 has arrived at the end point by driving the focus lens 104 in the other direction, the focus lens 104 may be driven in the other direction to derive the second AF evaluation value. In the latter case, the number of frames for deriving the first AF evaluation value may be different from the number of frames for deriving the second AF evaluation value.

The CPU 224*f* includes a first peak value deriving information setup unit 224*f*-4 for setting first peak value deriving information when a first peak value of the first AF evaluation value has been derived. The first peak value deriving information setup unit 224*f*-4 sets information regarding whether the first peak value has been derived. For example, the first peak value deriving information setup unit 224*f*-4 may set 1 as a flag indicating that the first peak value has been derived and 0 as a flag indicating that the first peak value has not been derived. After deriving the second AF evaluation value and a second peak value thereof, or after driving the focus lens 104 in the other direction to derive the second peak value, it can be determined using the flag information that the first peak value exists.

The CPU 224*f* may further include a peak value magnitude determiner 224*f*-5 for comparing the magnitude of the first peak value to the magnitude of the second peak value according to the peak value deriving information, i.e., when the flag is 1.

A focus lens position deriver 224*f*-6 derives a focus lens position corresponding to a greater peak value.

The CPU 224*f* may further include a first determiner 224*f*-2 for determining whether the first peak value is greater than a first reference peak value and a second determiner 224*f*-3 for determining whether the second peak value is greater than a second reference peak value.

As a result of the determination of the first determiner 224*f*-2, if the first peak value is greater than the first reference peak value, the first peak value deriving information setup unit 224*f*-4 may set information indicating that the first peak value exists. If the first peak value is not greater than the first reference peak value, the first peak value deriving information setup unit 224*f*-4 may set information indicating that the first peak value has not been derived. Alternatively, if the focus lens 104 is driven to the end point without deriving the first peak value, the first peak value deriving information setup unit 224*f*-4 may set information indicating that the first peak value cannot be derived.

As a result of the determination of the second determiner 224*f*-3, if the second peak value is greater than the second reference peak value, and if the information indicating that the first peak value exists is stored, the peak value magnitude determiner 224*f*-5 may compare the magnitude of the first peak value to the magnitude of the second peak value.

If the first peak value deriving information setup unit 224*f*-4 has set the information indicating that the first peak value exists, and if the second determiner 224*f*-3 determines that the second peak value is less than the second reference peak value, the focus lens position deriver 224*f*-6 may derive a first focus lens position corresponding to the first peak value.

If the first peak value deriving information setup unit 224*f*-4 has set the information indicating that the first peak value does not exist, and if the second determiner 224*f*-3 determines that the second peak value is greater than the second reference peak value, the focus lens position deriver 224*f*-6 may derive a second focus lens position corresponding to the second peak value.

If the first peak value deriving information setup unit 224*f*-4 has set the information indicating that the first peak value does not exist, and if the second determiner 224*f*-3 determines that the second peak value is less than the second reference peak value, the focus lens position deriver 224*f*-6 may not derive any focus lens position by determining that focusing has failed.

Although not shown in the current embodiment, a focus lens position determiner may be included instead of the peak value magnitude determiner 224*f*-5. In this case, the first focus lens position to the second focus lens position respectively corresponding to the first peak value and the second peak value may be derived and compared to each other.

A focusing method according to an exemplary embodiment of the invention will now be described with reference to FIGS. 13 to 17.

Figure 13:
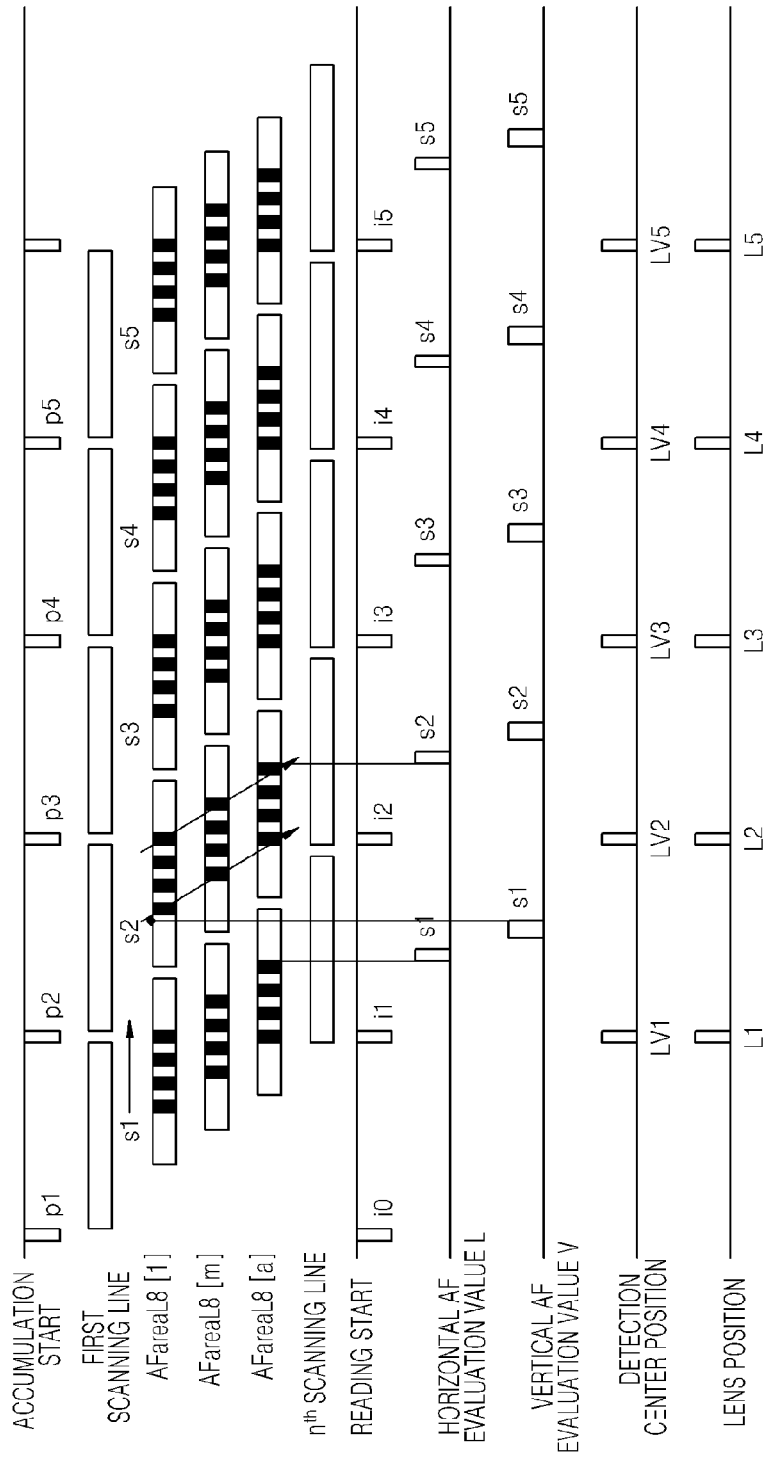
FIG. 13 is a timing diagram for an AF operation in a focusing method according to an exemplary embodiment of the invention.

FIG. 13 is a timing diagram for an AF operation in a focusing method according to an exemplary embodiment of the invention. FIG. 13 shows timings of an accumulation start signal, an electronic charge accumulation signal of a first scanning line, electronic charge accumulation signals of the scanning lines AFareaL8[1] to AFareaL8[a] of the focus area e8, an electronic charge accumulation signal of an $n^{th}$ scanning line, and a reading start signal in sequence from the top. FIG. 13 also shows a timing of calculating a horizontal AF evaluation value L that is a first AF evaluation value for an image signal read in the one direction from the image pickup device 204, a timing of calculating a vertical AF evaluation value V that is a second AF evaluation value for an image signal read in the other direction from the memory 210, an AF detection center position, and position information of the focus lens 104 corresponding to the AF detection center position.

When accumulation start signals p1 and p2 are applied, accumulation of an electronic charge by an optical signal incident to the first to $n^{th}$ scanning lines are performed. At the time when the electronic charge accumulation at the first scanning line ends, reading start signals i0 and i1 of an image signal are applied. By the reading start signals i0 and i1, a horizontal image signal is read in sequence from the first scanning line. The read horizontal image signal is applied to the camera controller 209. At the time when the electronic charge accumulation at the scanning lines AFareaL8[1] to AFareaL8[a] of the focus area e8 ends, a horizontal AF evaluation value L(s1), L(s2), . . . is calculated using the horizontal image signal read by the pre-processing unit 220. The focus lens 104 is being moved in a constant speed while the horizontal AF evaluation value is calculated.

In the current embodiment, not only the horizontal AF evaluation value but also a vertical AF evaluation value are calculated. Since an AF operation is performed with only an AF evaluation value acquired from scanning lines, i.e. the horizontal AF evaluation value, in a conventional contrast AF scheme, when a contrast of a subject is distributed in the horizontal direction, e.g., in a case of a horizontal stripe pattern, focusing is not easy. Thus, in the invention, a vertical AF evaluation value is calculated.

When the horizontal image signal of the scanning lines AFareaL8[1] to AFareaL8[a] is calculated, the horizontal image signal of the scanning lines AFareaL8[1] to AFareaL8[a] included in the focus area e8 is transmitted to not only the pre-processing unit 220 but also the memory 210.

A horizontal AF evaluation value L for the horizontal image signal included in the focus area e8 can be detected. The horizontal image signal is recorded in the memory 210 in sequence. A vertical AF evaluation value V can be calculated by sequentially reading a vertical image signal from the memory 210 and detecting a contrast existing in an orthogonal direction for the vertical image signal. Here, an image signal recorded in the memory 210 can be read in a Direct Memory Access (DMA) scheme. The time for reading the vertical image signal from the memory 210 can be made shorter than the time for sequentially reading the horizontal image signal from the image pickup device 204.

In the current embodiment, the vertical AF evaluation value V is calculated before a horizontal image signal of a focus area in the next period is read, and then AF detection in the horizontal direction in the next period is performed.

According to the above-described operation, the horizontal AF evaluation value L and the vertical AF evaluation value V can be calculated on a one-frame basis.

Meanwhile, in order to detect a peak value of an AF evaluation value, the horizontal AF evaluation value L(s1), L(s2), . . . is calculated on a one-frame basis. The time for deriving the horizontal AF evaluation value is assumed to be the center time of electronic charge accumulation time from AFareaL8[1] to AFareaL8[a]. That is, the center time between an electronic charge accumulation start time of AFareaL8[1] and an electronic charge accumulation end time of AFareaL8[a] is a timing of acquiring the image signal. In other words, a center position of detection corresponds to a time for acquiring an image signal.

A lens position corresponds to a position of the focus lens 104 corresponding to the center position of detection. The position of the focus lens 104 can be acquired by communication between the lens 100 and the main body 200.

A method of calculating a peak value of an AF evaluation value from the calculated horizontal AF evaluation value L and the calculated vertical AF evaluation value V will now be described.

Figure 14:
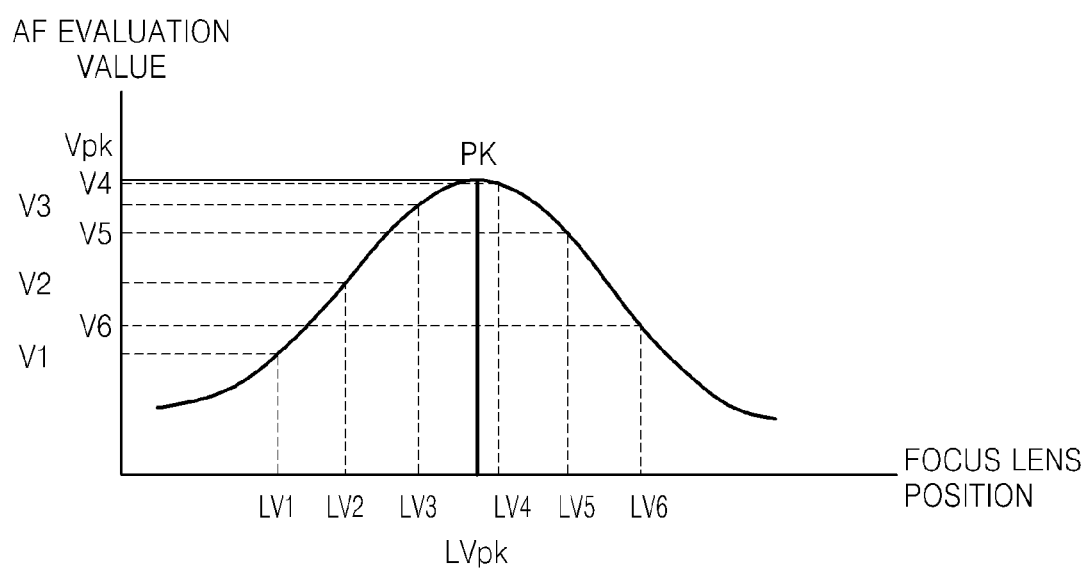
FIG. 14 is a graph for describing a method of deriving a peak value of an AF evaluation value.

FIG. 14 is a graph for describing a method of deriving a peak value of an AF evaluation value in a contrast AF scheme. In the graph shown in FIG. 14, a horizontal axis indicates a detection center position, and a vertical axis indicates an AF evaluation value.

Since horizontal AF evaluation values are discrete, an actual peak value can be calculated by performing an interpolation calculation of the horizontal AF evaluation values. The actual peak value is a horizontal AF evaluation value Vpk that is a vertical axis value of a point PK when the detection center position is LVpk. Here, the interpolation calculation for detecting the peak value can be performed using, for example, LV3, LV4, LV5 and 3 pieces of data, i.e., V3, V4 and V5', that are respectively corresponding horizontal AF evaluation values If a peak value of a horizontal AF evaluation value is calculated, a detection center position in the timing corresponding to the peak value is determined, and a lens position in the timing synchronized with the determined detection center position is detected. Then, the focus lens 104 may be driven to the detected lens position.

In the invention, a first peak value, which is a peak value of a horizontal AF evaluation value, can be derived using the above-described method, and a second peak value, which is a peak value of a vertical AF evaluation value, can also be derived using the same method.

Figure 15B:
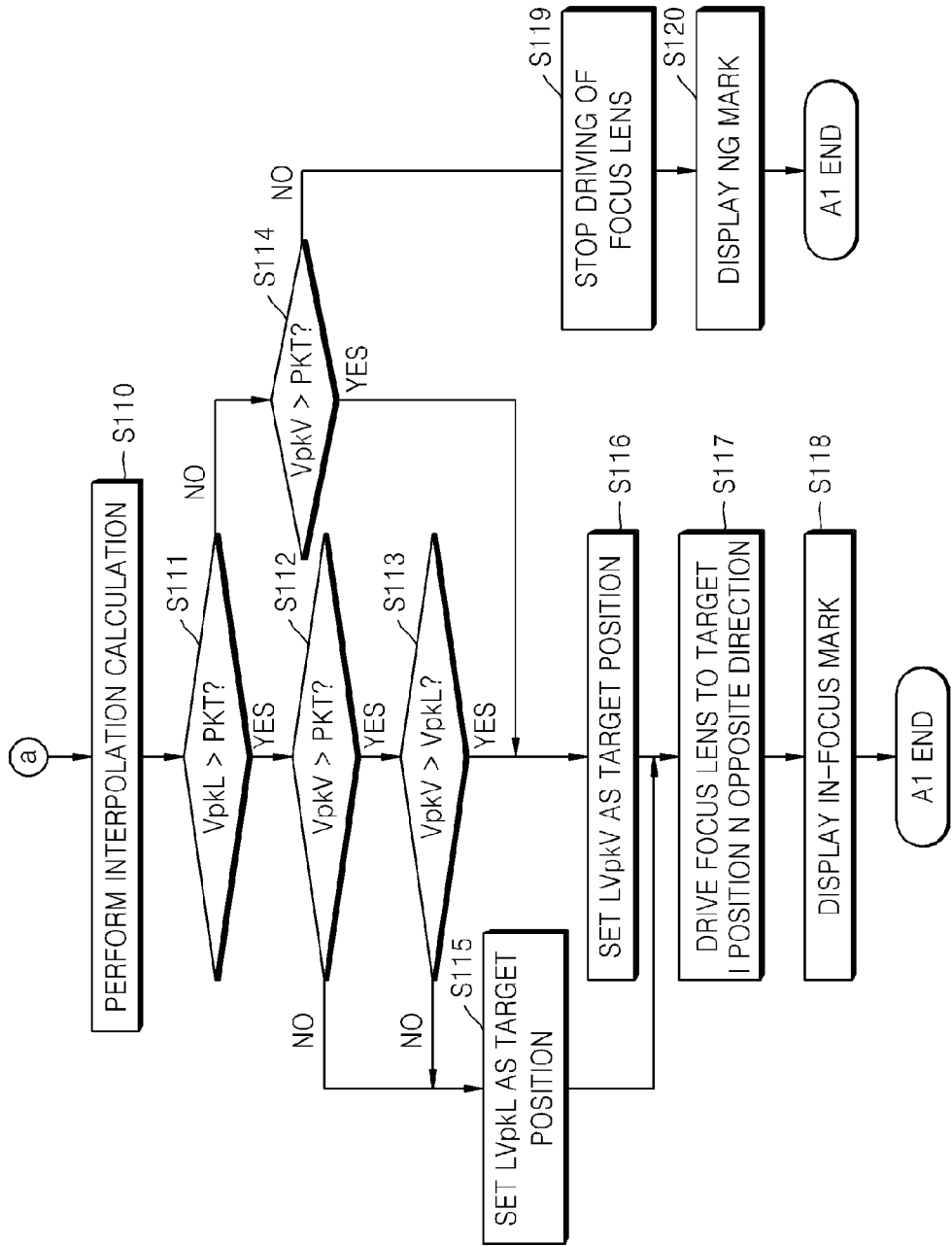
FIGS. 15 to 17 are flowcharts for describing a focusing method according to exemplary embodiments of the invention, to which the timing diagram shown in FIG. 13 is applied.

FIG. 15 is a flowchart for describing a focusing method according to an exemplary embodiment of the invention, to which the timing diagram shown in FIG. 13 is applied.

Referring to FIG. 15, first of all, an AF operation A1 is performed. In detail, if the digital capturing device 1 is turned on and a user pushes the shutter release button halfway, the AF operation A1 is performed.

The image pickup device 204 generates image signals by periodically capturing an image in operation S101. If the AF operation A1 is performed in the contrast AF scheme, the focus lens 104 is driven in operation S102. An image pickup timing signal is input to the CPU 224 in operation S103. The image pickup timing signal is a signal indicating a timing of starting AF detection. The image pickup timing signal can be generated in correspondence to an established focus area. The CPU 224 counts a driving signal generated by the image pickup device controller 205, and if a predetermined number of driving signals are counted, this can be determined as the timing of starting the AF detection.

If the image pickup timing signal is input, the AF detection is performed by inputting an image signal of a focus area from the image pickup device 204 to an AF detection circuit of the AF evaluation value deriver 220c. In addition, the image signal of the focus area is recorded in the memory 210 in operation S104. The AF evaluation value deriver 220c calculates a horizontal AF evaluation value L for an image signal read in a first direction from the image pickup device 204, e.g., a horizontal image signal, in operation S105. After calculating the horizontal AF evaluation value L, the image signal is sequentially read in a second direction V from the memory 210 in operation S106. The image signal can be read from the memory 210 using the DMA scheme. The image signal read in the second direction, e.g., a vertical image signal, is input to the AF detection circuit of the AF evaluation value deriver 220c. A vertical AF evaluation value V for the vertical image signal is calculated in operation S107. In the current embodiment, although the derivation of the vertical AF evaluation value V after the derivation of the horizontal AF evaluation value L is illustrated, the invention is not limited thereto, and the order may be changed.

Position information of the focus lens 104 at the AF detection timing is acquired and recorded together with AF evaluation values in operation S108.

It is determined in operation S109 whether each of the derived AF evaluation values L and V has passed a peak or whether the focus lens 104 is driven to the end point.

The determination on whether the peak has been passed is performed as follows. It is assumed that an initial value of an AF evaluation value is a virtual peak value, and if an AF evaluation value newly calculated by driving the focus lens 104 is greater than the virtual peak value, the virtual peak value is updated with the newly calculated AF evaluation value. If the newly calculated AF evaluation value is less than the virtual peak value, it is determined that a peak value of an AF evaluation value exists in the performed AF detection process. If a peak value is not detected without driving the focus lens 104 to the end point, the calculation of an AF evaluation value is performed again by going back to operation S103. If a peak value of an AF evaluation value exists, or if the focus lens 104 is driven to the end point, an actual peak value of the horizontal AF evaluation value L corresponding to a first AF evaluation value and an actual peak value of the vertical AF evaluation value V corresponding to a second AF evaluation value are calculated in operation S110. Since a peak value is not always detected in the timing of calculating an AF evaluation value, an actual peak value can be obtained by an interpolation calculation. If operation S110 is activated by driving the focus lens 104 to the end point, an AF evaluation value can be obtained by extrapolation.

It is determined in operation S111 whether a peak value VpkL of the horizontal AF evaluation value L is greater than a reference peak value PKT. In the invention, a first reference peak value corresponds to the reference peak value PKT. If it is determined in operation S111 that VpkL is greater than PKT, it is determined in operation S112 whether a peak value VpkV of the vertical AF evaluation value V is greater than a reference peak value PKT. The reference peak value PKT used to be compared with the peak value VpkV of the vertical AF evaluation value V corresponds to a second reference peak value. In the invention, the first reference peak value may be identical to or different from the second reference peak value. For example, if the first number of elements in the horizontal direction is different from the second number of elements in the vertical direction, standardization is performed. At this time, the standardization may be performed for at least one of the first reference peak value and the second reference peak value.

If it is determined in operation S112 that VpkV is greater than PKT, VpkV is compared to VpkL in operation S113. If VpkV is greater than VpkL in operation S113, a lens position LVpkV having a vertical peak is set as a target position in operation S116.

If it is determined in operation S111 that VpkL is less than PKT, it is determined in operation S114 whether VpkV is greater than PKT. If it is determined in operation S114 that VpkV is greater than PKT, the lens position LVpkV having a vertical peak is set as the target position in operation S116.

If it is determined in operation S112 that VpkV is not greater than PKT, a lens position LVpkL having a horizontal peak is set as the target position in operation S115.

In operation S117, the focus lens 104 is driven to the target position set in operation S115 or S116. The focus lens 104 may be driven to the target position by driving it in an opposite direction to an initially driven direction. A mark indicating in-focus of the AF operation is displayed in operation S118, and the AF operation A1 ends.

If it is determined in operation S114 that VpkV is not greater than PKT, it is determined that a contrast of the image signal is not clear in the horizontal direction and the vertical direction. Accordingly, the driving of the focus lens 104 is terminated in operation S119, and an NG mark indicating that the AF detection has failed can be displayed in operation S120. Then, the AF operation A1 ends.

Figure 16A:
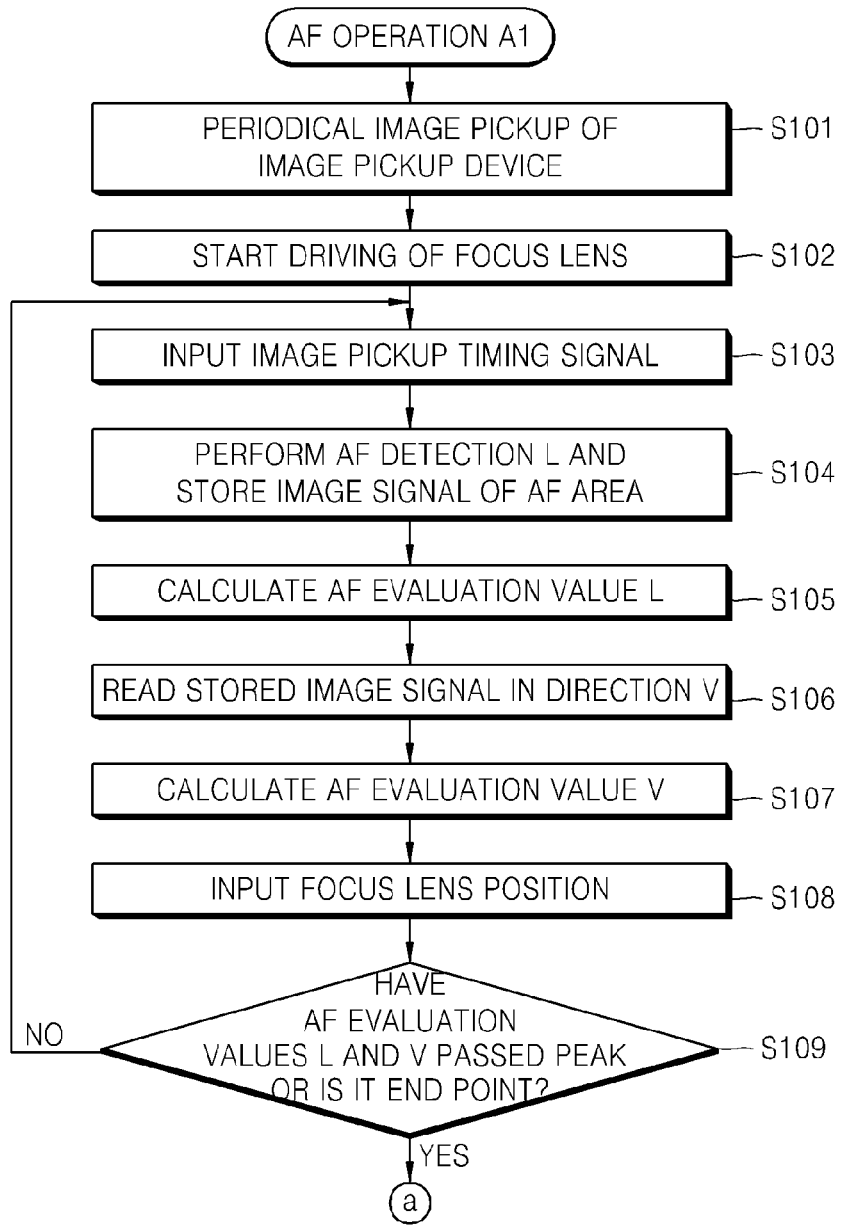
Figure 16B:
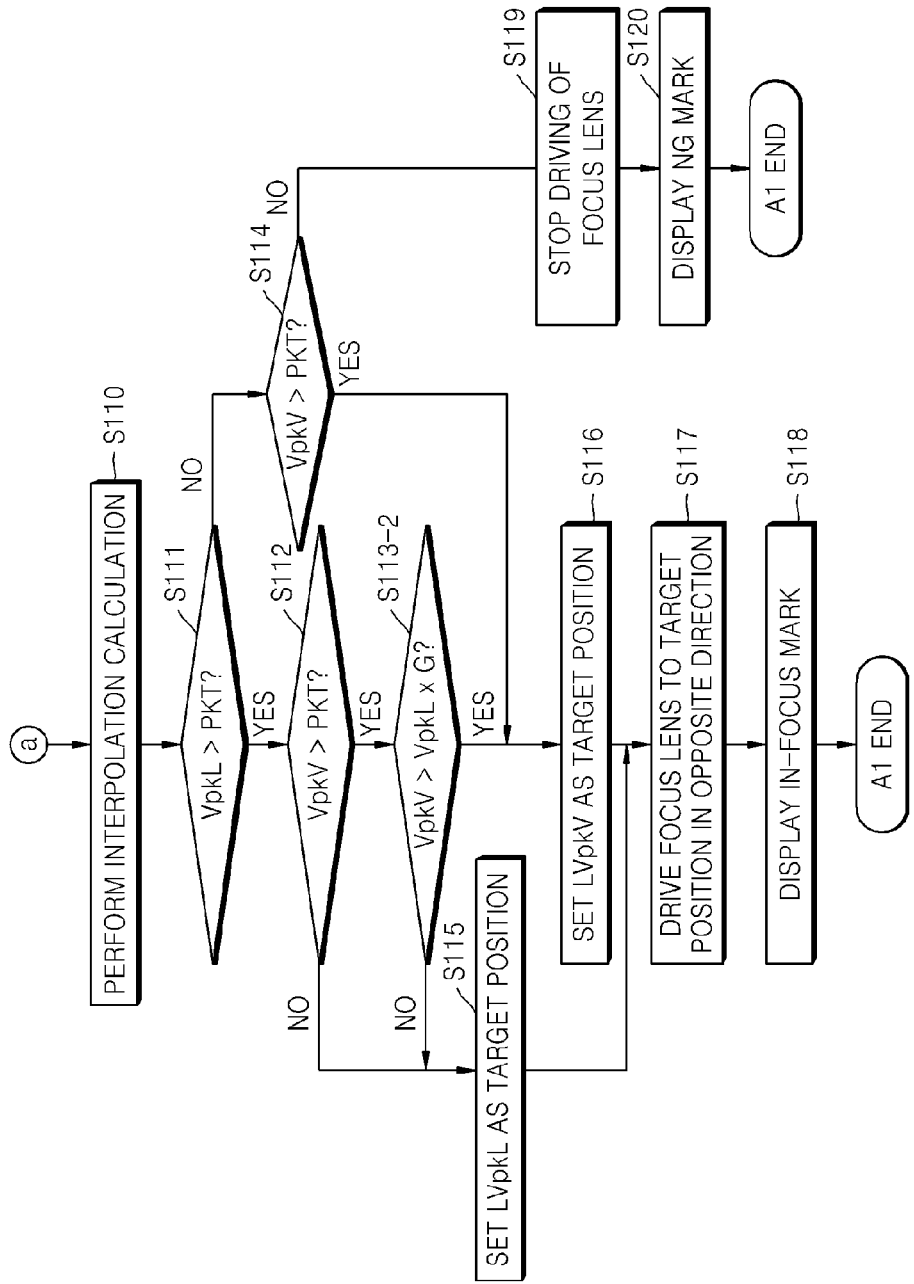

In the current embodiment, a focus area AFarea is formed so that the number of elements in the horizontal direction for deriving an AF evaluation value is the same as the number of elements in the vertical direction for deriving an AF evaluation value, thereby having the same frequency band. However, the invention is not limited thereto, and the number of elements in the horizontal direction of the focus area AFarea may be different from the number of elements in the vertical direction of the focus area AFarea. In this case, although a total number of elements are the same, frequency bands may be slightly different, thereby causing a different output tendency of an AF evaluation value. In this case, standardization is performed in operation S113-2 of FIG. 16. FIG. 16 is a flowchart for describing a focusing method according to another exemplary embodiment of the invention, to which the timing diagram shown in FIG. 13 is applied. The embodiment illustrated in FIG. 16 is identical to the embodiment illustrated in FIG. 15 except for operation S113. In detail, in the current embodiment, when VpkV is compared to VpkL, standardization is performed using a coefficient G, and the standardized peak values may be compared to each other.

In addition, although not shown in the current embodiment, comparing the first number of elements in the first direction (for example, the horizontal direction) to the second number of elements in the second direction (for example, the vertical direction) for a focus area before the standardization may be further included.

In addition, in the invention, the first direction is different from the second direction, but they are not definitely limited to the horizontal direction and the vertical direction. Nonetheless, in the invention, the "horizontal direction" may mean an extending direction of scanning lines of the image pickup device 204, and the "vertical direction" may mean an extending direction of data lines.

Figure 17A:
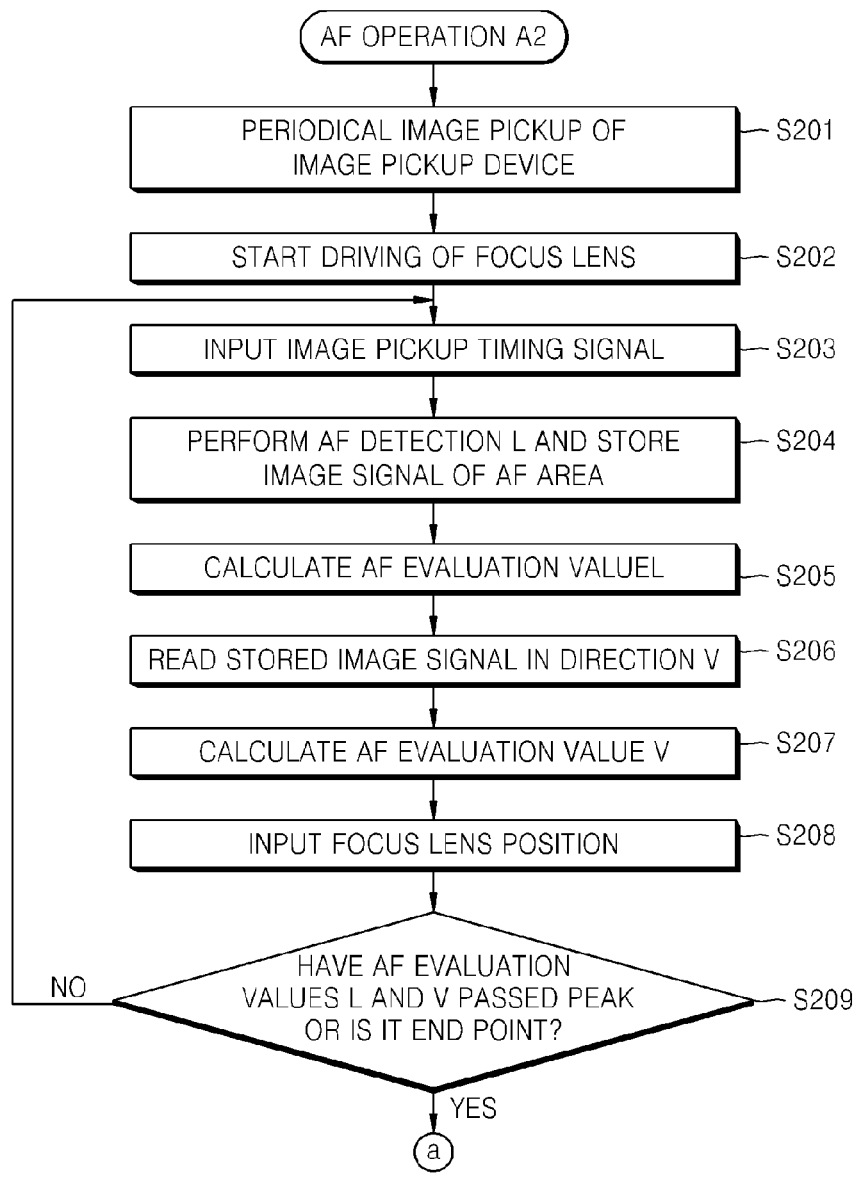
Figure 17B:
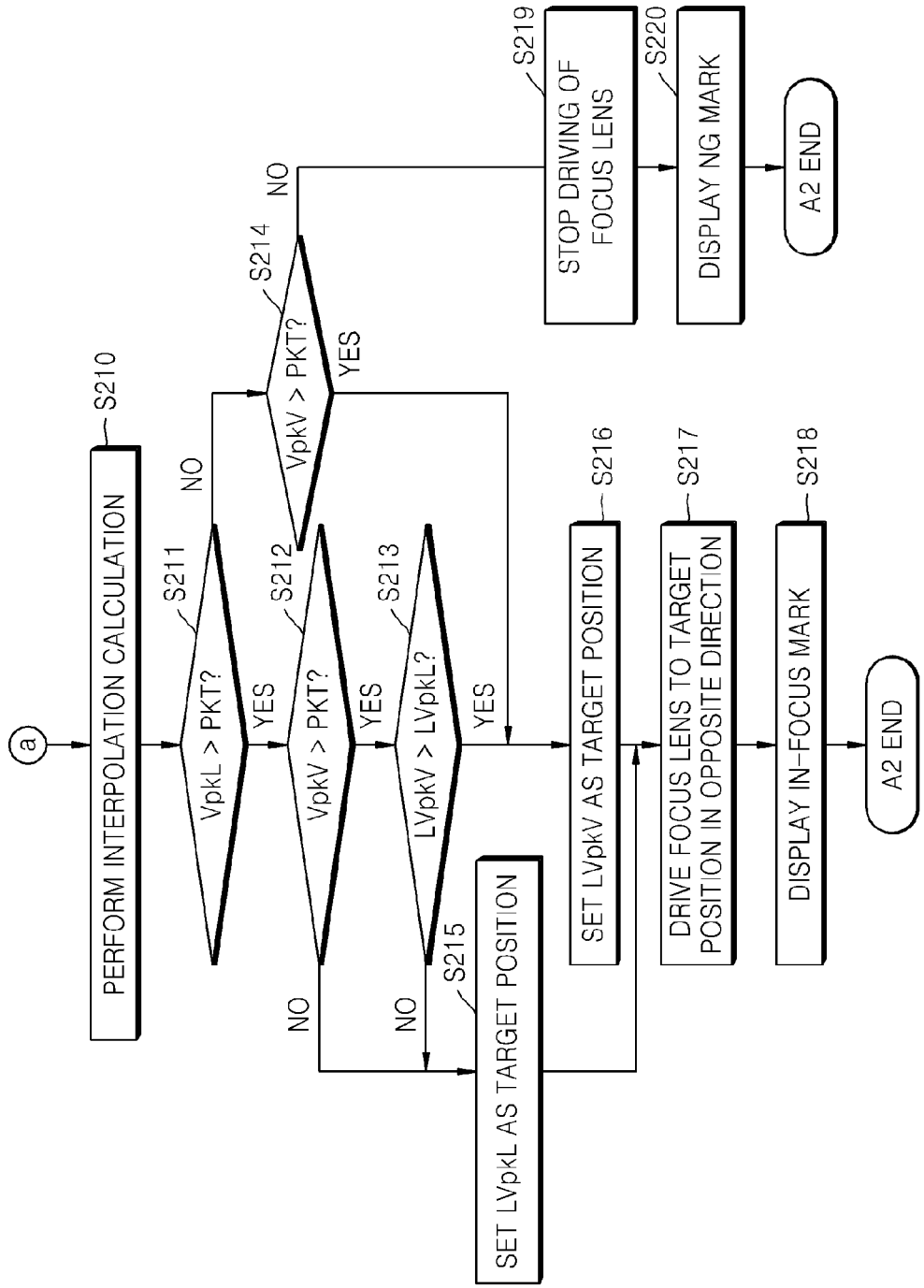

FIG. 17 is a flowchart for describing a focusing method according to another exemplary embodiment of the invention, to which the timing diagram shown in FIG. 13 is applied. In the current embodiment, it is illustrated as another embodiment of FIG. 13 that an AF operation A2 is performed.

In detail, although a focus lens position corresponding to one of peak values in the horizontal and vertical directions compared to each other is derived in the AF operation A1 described with reference to FIGS. 15 and 16, focus lens positions corresponding to the respective peak values are compared to each other in the current embodiment. Some differences from the AF operation A1 will now be described.

Instead of comparing the peak value VpkV of the vertical AF evaluation value to the peak value VpkL of the horizontal AF evaluation value, a focus lens position LVpkV corresponding to the peak value of the vertical AF evaluation value is compared to a focus lens position LVpkL corresponding to the peak value of the horizontal AF evaluation value in operation S213.

If LVpkV is greater than LVpkL, the process proceeds to operation S216, otherwise, the process proceeds to operation S215. A focus lens position relates to a subject distance, wherein the subject distance is greater as the focus lens position is less. That is, it can be determined that a subject is located far from a digital capturing device. On the contrary, the subject distance is less as the focus lens position is greater. That is, it can be determined that a subject is located near from a digital capturing device. Thus, since it can be determined that a subject is closer to a digital capturing device as a focus lens position corresponding to a peak value is greater, in the current embodiment, a first focus lens position corresponding to a first peak value and a second focus lens position corresponding to a second peak value are derived from an image of the same subject, and a focus lens position recognized as a closer subject among them can be used as a final target position.

Thus, if it is determined in operation S213 that a subject of a vertical image signal is closer, i.e., if a focus lens position LVpkV corresponding to a peak value for a vertical image signal is greater, the process proceeds to operation S216. If it is determined in operation S213 that a subject of a horizontal image signal is closer, i.e., if a focus lens position LVpkL corresponding to a peak value for a horizontal image signal is greater, the process proceeds to operation S215. Then, the focus lens 104 can be driven to the set target position.

Operations not described in the current embodiment are similar to those in the AF operation A1 described above.

A focusing method according to another exemplary embodiment of the invention will now be described with reference to FIGS. 18 to 21. In the current embodiment, a configuration and a basic operation of a digital capturing device are similar to those in the embodiment illustrated in FIG. 13. In the current embodiment, a configuration different from the embodiment illustrated in FIG. 13 will be mainly described. In addition, in the current embodiment, a case of capturing a subject in a higher speed compared with the embodiment illustrated in FIG. 13 is illustrated. For example, if a capturing period in the embodiment illustrated in FIG. 13 is 60 fps (frames per second), it is assumed that a capturing period in the current embodiment is 120 fps.

Figure 18:
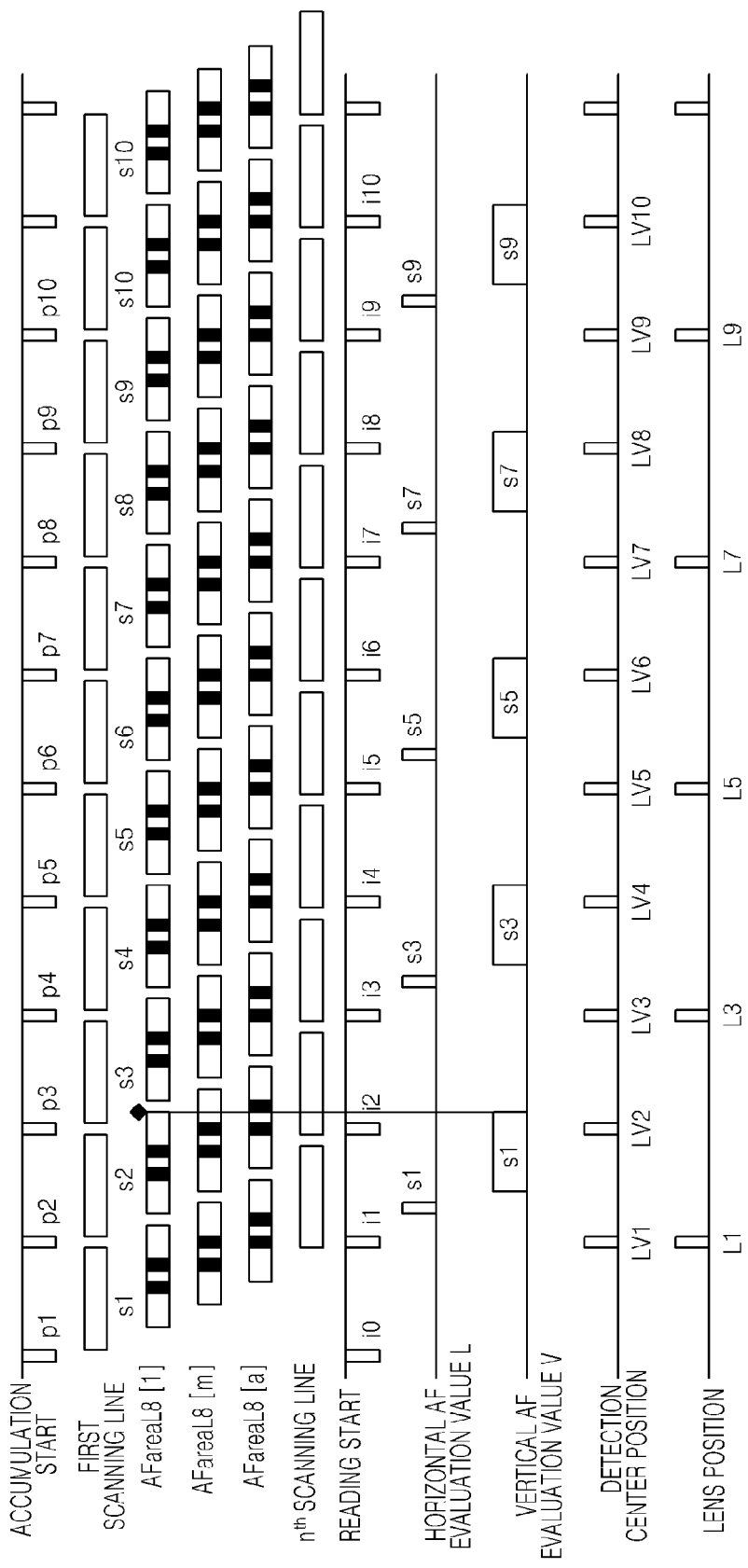
FIG. 18 is a timing diagram for an AF operation in a focusing method according to another exemplary embodiment of the invention.

FIG. 18 is a timing diagram for an AF operation in a focusing method according to another exemplary embodiment of the invention.

Referring to FIG. 18, according to an accumulation period of the image pickup device 204, a scanning time of a focus area is also shorter, thereby reading an image signal at a high speed. If reading of an image signal by a scanning signal of AFareaL8[1] ends, a horizontal AF evaluation value L(s1) is calculated. When an image signal for the horizontal AF evaluation value L(s1) is read, an image signal of the focus area e8 is simultaneously recorded in the memory 210. A vertical AF evaluation value V(s1) is calculated by the AF detection circuit of the AF evaluation deriver 220c of the pre-processing unit 220 by reading an image signal in the vertical direction for an image of the focus area e8.

In the current embodiment, when the calculation of the vertical AF evaluation value V(s1) ends, a scanning operation on a second frame has already started, so a horizontal AF evaluation value for the second frame cannot be detected. However, since a scanning operation on a third frame has not started, a horizontal AF evaluation value and a vertical AF evaluation value can be calculated for the third frame. Thus, the horizontal AF evaluation value and a vertical AF evaluation value are calculated for the third frame by skipping the second frame.

Although the accumulation period of the image pickup device 204 is changed from 60 fps to 120 fps, an AF detection period is 60 fps without any change. The change of the accumulation period of the image pickup device 204 may correspond to a case where a subject is bright and an accumulation time is short.

By calculating a horizontal AF evaluation value and a vertical AF evaluation value in the above-described method, the focus lens 104 can be driven to an in-focus position by calculating a peak value of an AF evaluation value as an exemplary embodiment described above.

In the current embodiment, a horizontal AF evaluation value and a vertical AF evaluation value are calculated for odd (2n−1) frames, whereas the AF detection operation is not performed for even frames. Thus, although timings of detection center positions LV1, LV2, . . . in the AF detection correspond to an image pickup period, detection center positions necessary to calculate a peak value of an AF evaluation value are only those for the odd (2n−1) frames. Accordingly, lens positions can also be sensed in timings synchronized with the detection center positions for the odd (2n−1) frames.

Figure 19A:
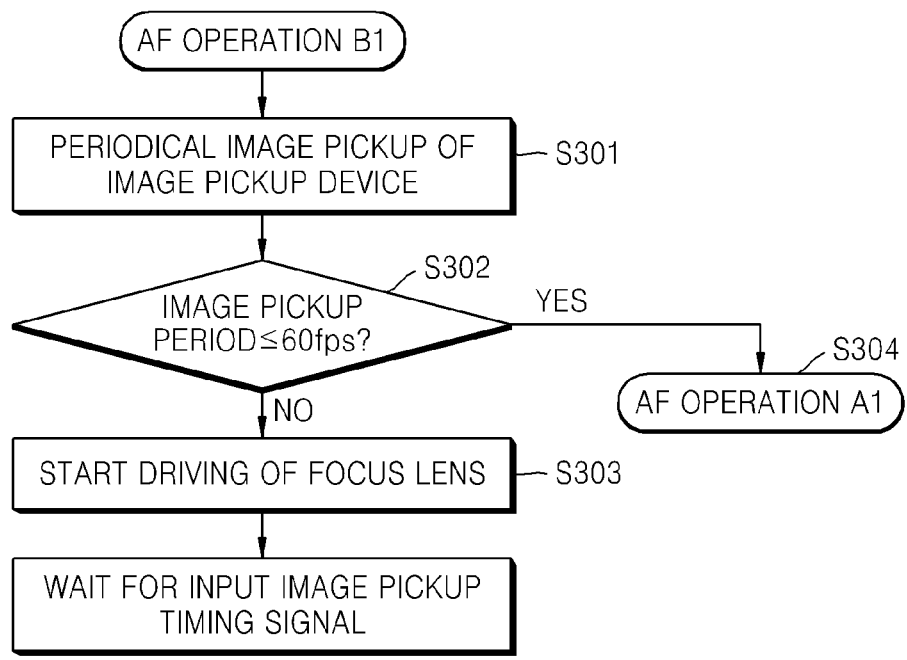
FIGS. 19A to 21 are flowcharts for describing a focusing method according to exemplary embodiments of the invention, to which the timing diagram shown in FIG. 18 is applied.
Figure 19B:
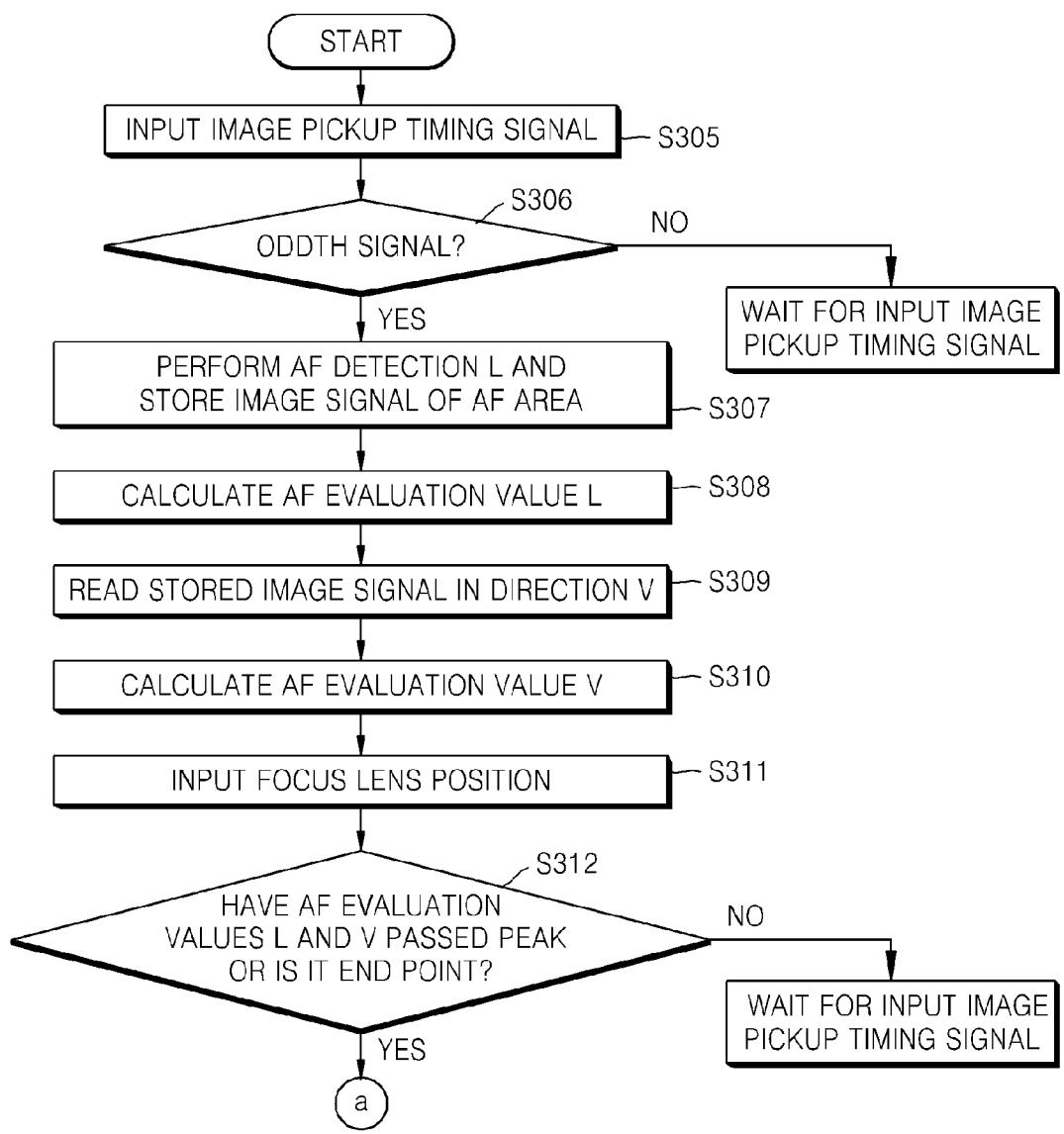

FIGS. 19A, 19B, and 19C are flowcharts for describing a focusing method according to an exemplary embodiment of the invention, to which the timing diagram shown in FIG. 18 is applied.

Referring to FIG. 19A, when the digital capturing device 1 is turned on and a user presses the shutter release button halfway, an AF operation B1 is performed.

The image pickup device 204 generates an image signal by periodically capturing an image in operation S301. It is determined in operation S302 whether a capturing period associated with an accumulation period of the image pickup device 204 is equal to or less than 60 fps. If the capturing period is equal to or less than 60 fps, the AF operation A1 according to the exemplary embodiment illustrated in FIGS. 13 to 16 is performed in operation S304.

If the capturing period is greater than 60 fps, the focus lens 104 is driven to the one direction in operation S303. Thereafter, an input of an image pickup timing signal is waited for.

The image pickup timing signal is a signal indicating a timing of starting the AF detection. When an interrupt signal by the image pickup timing signal is applied to the CPU 224, the CPU 224 controls to perform an AF operation. Although it is described in the current embodiment that the AF operation is performed by an interrupt control of the CPU 224, the invention is not limited thereto. For example, an AF detection timing can be waited for by the CPU 220 directly counting a driving signal generated by the image pickup device controller 205.

If the interrupt signal of the image pickup timing signal is input to the CPU 224, it is determined in operation S306 whether the input of the interrupt signal is an odd input. If the input of the interrupt signal is an even input, it is determined that this is a timing incapable of calculating an AF evaluation value as described with reference to FIG. 18, and an input of an interrupt signal by a next image pickup timing signal is waited for.

If the input of the interrupt signal is an odd input, the AF detection operation is performed, and an image signal of a focus area is stored in the memory 210 in operation S307. Operation S307 and operations thereafter are similar to the AF operation A1. A difference is that in some prior embodiments it is determined whether a horizontal peak value is greater than the reference peak value and then whether a vertical peak value is greater than the reference peak value, while in the current embodiment it is determined whether a vertical peak value is greater than the reference peak value first. This is only about an exemplary embodiment, and even if it is determined as the AF operation A1, it does not matter.

Meanwhile, if each of the horizontal AF evaluation value L and the vertical AF evaluation value V has not passed a peak or if the focus lens 104 has not been driven to the end point, an input of an interrupt signal is waited for.

By performing the above-described operations, the AF operation according to the current embodiment ends.

Figure 20A:
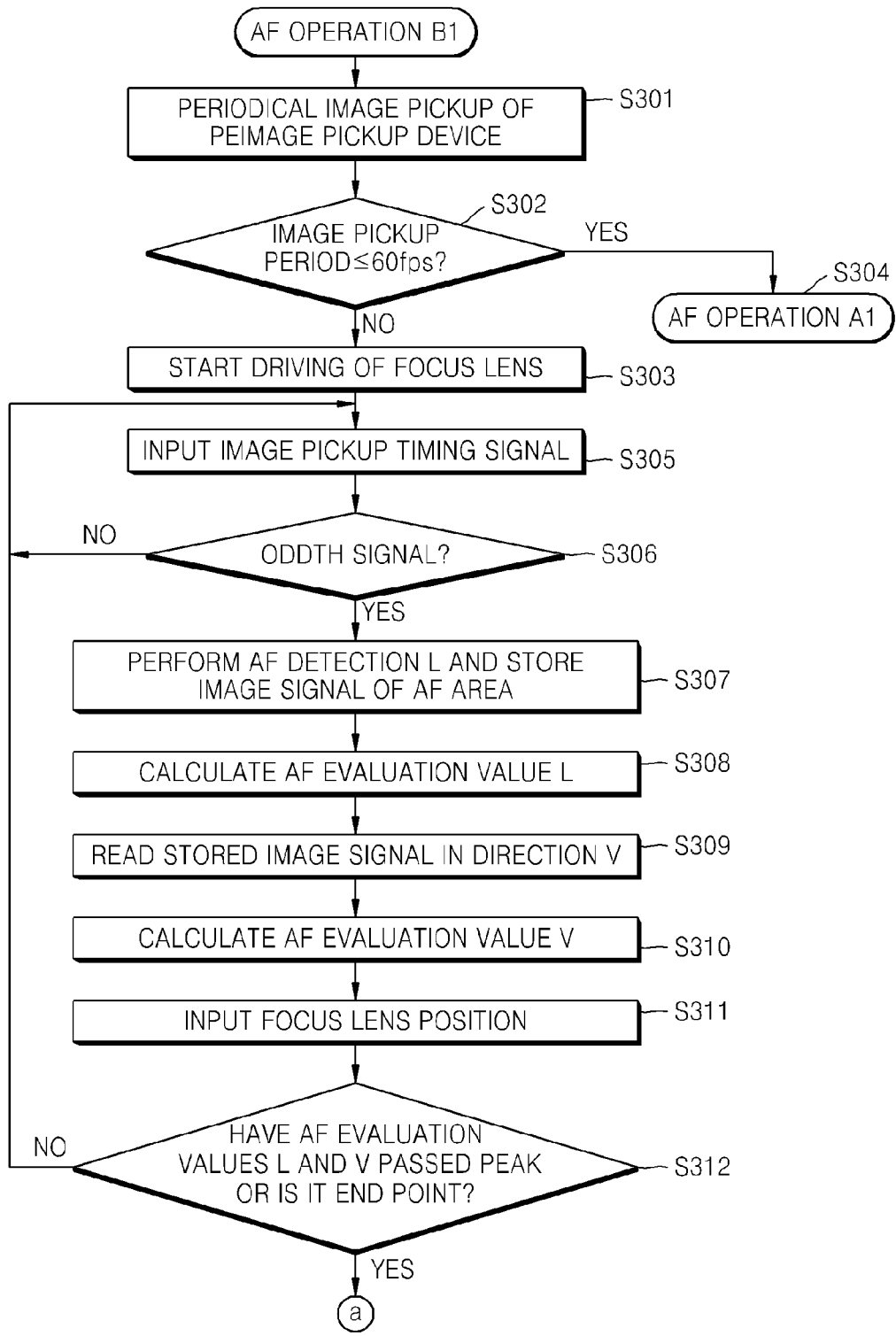
Figure 20B:
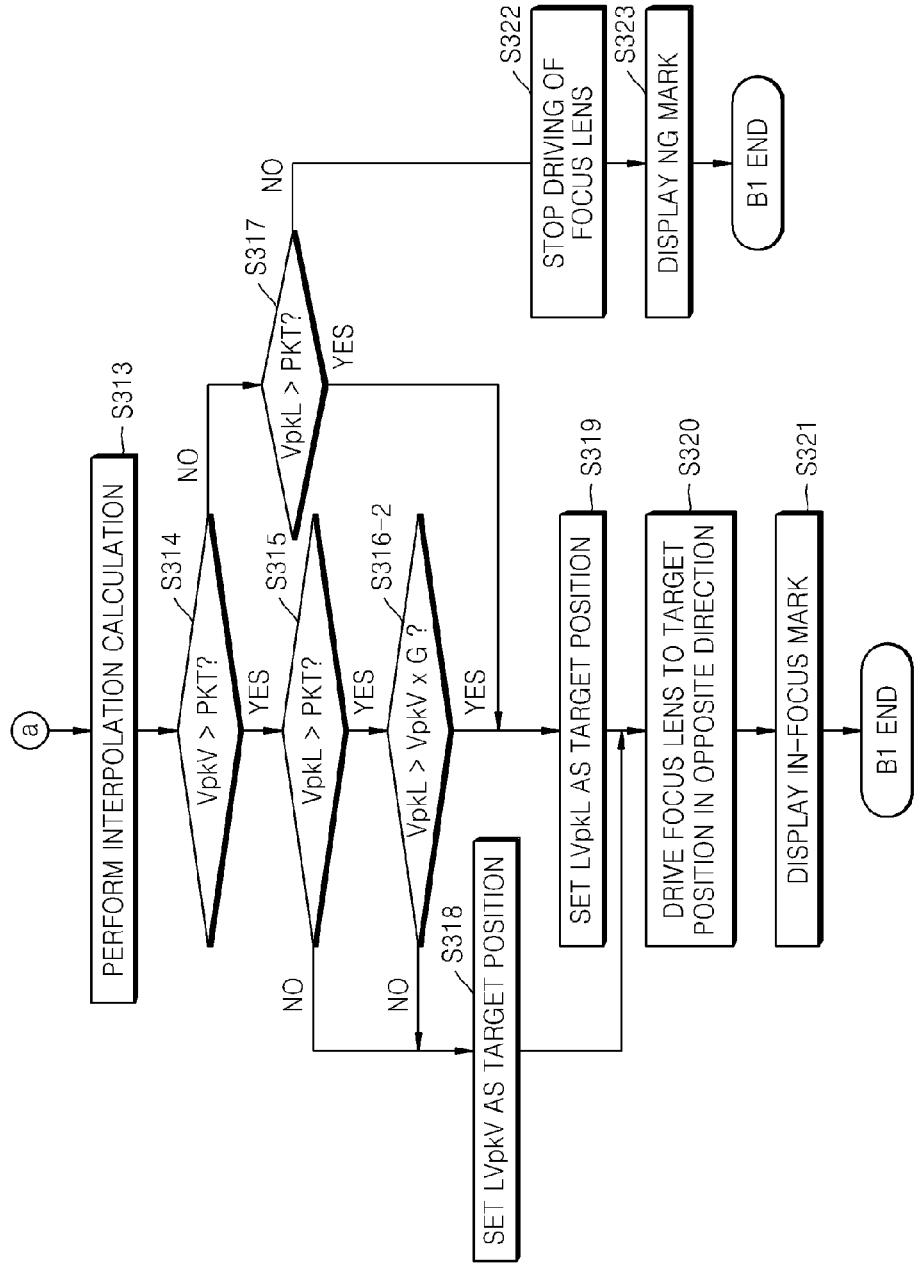

FIG. 20 is a flowchart for describing a focusing method including standardization of an AF evaluation value according to another exemplary embodiment of the embodiment illustrated in FIG. 19. In detail, standardization is performed by applying a coefficient G to a first AF evaluation value and a second AF evaluation value. Description on the standardization is similar to that of FIG. 16.

Figure 21B:
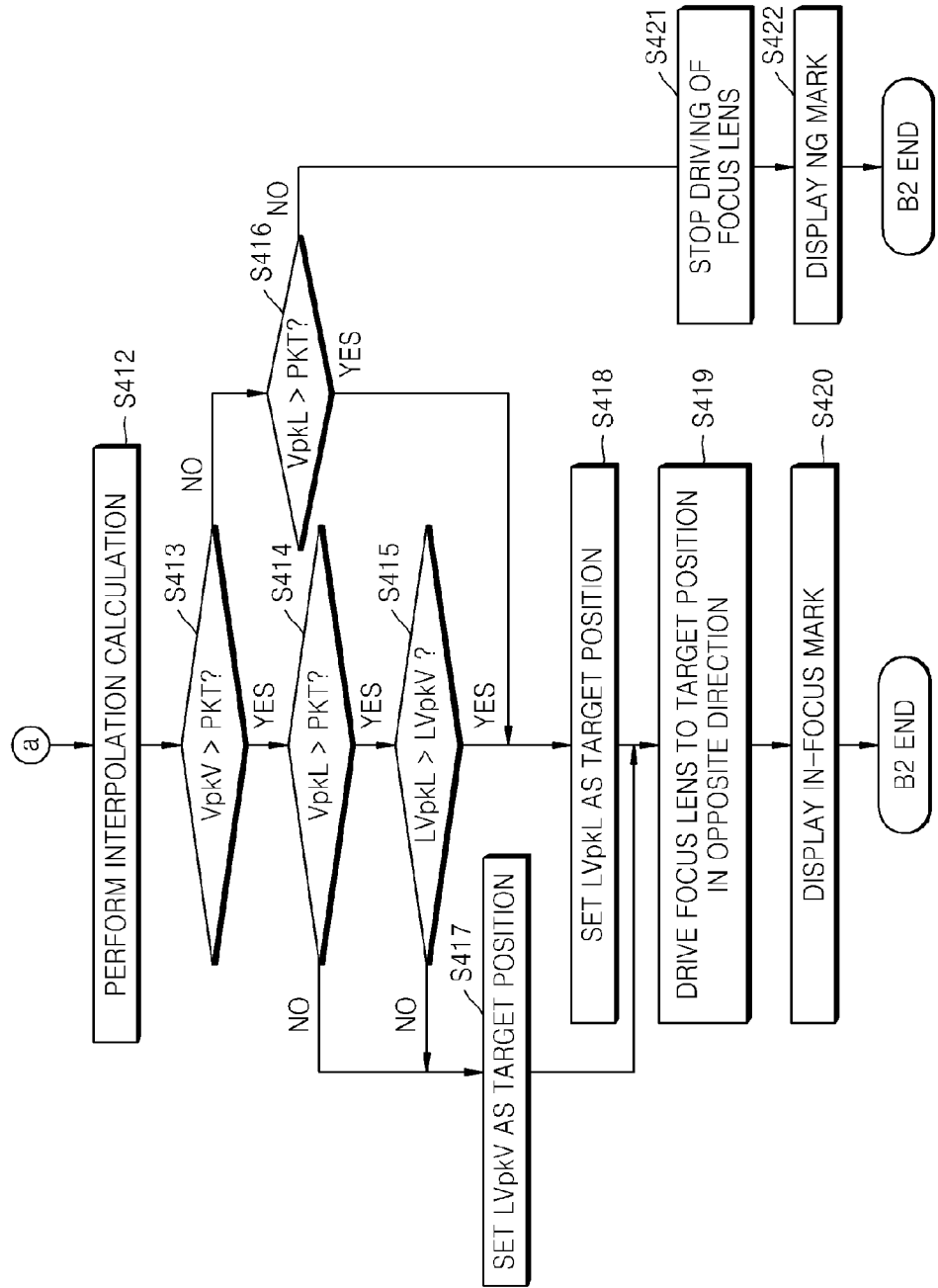

FIG. 21 is a flowchart for describing a focusing method according to another exemplary embodiment of the invention, to which the timing diagram shown in FIG. 18 is applied. The focusing method in the current embodiment is similar to the focusing method illustrated in FIG. 19. However, while a horizontal peak value is compared to a vertical peak value and a focus lens position corresponding to one of them is derived in the AF operation B1, focus lens positions respectively corresponding to the horizontal and vertical peak values are compared to each other in the current embodiment.

In detail, a focus lens position LVpkL corresponding to a peak value VpkL of a horizontal AF evaluation value is compared to a focus lens position LVpkV corresponding to a peak value VpkV of a vertical AF evaluation value in operation S415, and a greater focus lens position is set as a target position. That is, if LVpkV is greater than LVpkL, the process proceeds to operation S417, otherwise the process proceeds to operation S418. This is similar to the AF operation A2.

For operations not described in the current embodiment, the AF operation B1 and furthermore the AF operation A1 may apply.

A focusing method according to another exemplary embodiment of the invention will now be described with reference to FIGS. 22 to 24. A configuration and a basic operation of a digital capturing device are identical to those in the embodiment described above. Thus, in the current embodiment, differences from the embodiment described above are mainly described. It is assumed in the current embodiment that a capturing period is 240 fps. The current embodiment can be applied to a case where a time taken to perform AF detection from a vertical image signal and calculate a vertical AF evaluation value is longer than that in the other embodiments described above even if a capturing period is shorter than 240 fps.

Figure 22:
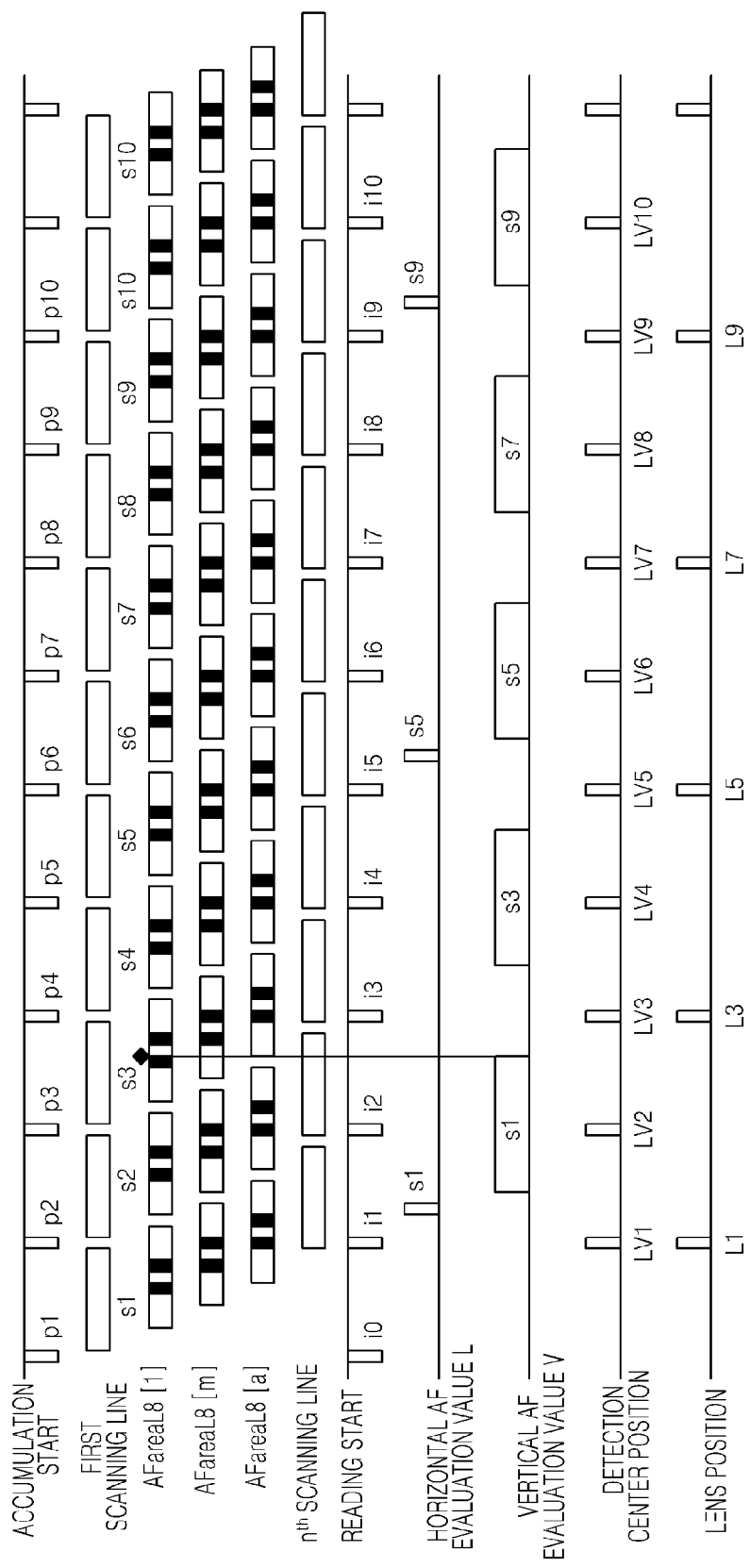
FIG. 22 is a timing diagram for an AF operation in a focusing method according to another exemplary embodiment of the invention.

FIG. 22 is a timing diagram for an AF operation in a focusing method according to another exemplary embodiment of the invention.

Referring to FIG. 22, an accumulation period of the image pickup device 204 is a half of the accumulation period in the embodiment of FIG. 18. According to the accumulation period, a scanning time of a focus area is also shorter, thereby reading an image signal at a high speed. If reading of an image signal by a scanning signal of AFareaL8[1] ends, a horizontal AF evaluation value L(s1) is calculated. At the same time or independently, an image signal of the focus area e8 is recorded in the memory 210. Thereafter, a vertical AF evaluation value V(s1) is calculated by the AF detection circuit of the AF evaluation deriver 220c by reading an image signal in the vertical direction for an image of the focus area e8.

In the current embodiment, when the calculation of the vertical AF evaluation value V(s1) ends, a scanning operation on second and third frames has already started, so horizontal AF evaluation values for the second and third frame cannot be detected. However, since there is a spare time before a scanning operation on a fourth frame starts, a vertical AF evaluation value can be additionally calculated. That is, after an image signal of the third frame is stored in the memory 210, a vertical AF evaluation value for the image signal of the third frame can be derived. For a horizontal AF evaluation value, after deriving the vertical AF evaluation value for the third frame, a horizontal AF evaluation value for a fifth frame can be derived. According to the above-described method, a horizontal AF evaluation value can be calculated in a period of 60 fps, and a vertical AF evaluation value can be calculated in a period of 120 fps. Thus, in the high-speed image capturing period as in the current embodiment, a period of capturing a horizontal AF evaluation value can be different from a period of capturing a vertical AF evaluation value.

In the current embodiment, a horizontal AF evaluation value and/or a vertical AF evaluation value are calculated for odd (2n−1) frames, whereas the AF detection operation is not performed for even frames. Thus, although timings of detection center positions in the AF detection are derived as LV1, LV2, ..., detection center positions necessary to calculate a peak value of an AF evaluation value are only those for the odd (2n−1) frames. Accordingly, focus lens positions can also be sensed in timings synchronized with the detection center positions for the odd (2n−1) frames.

Figure 23B:
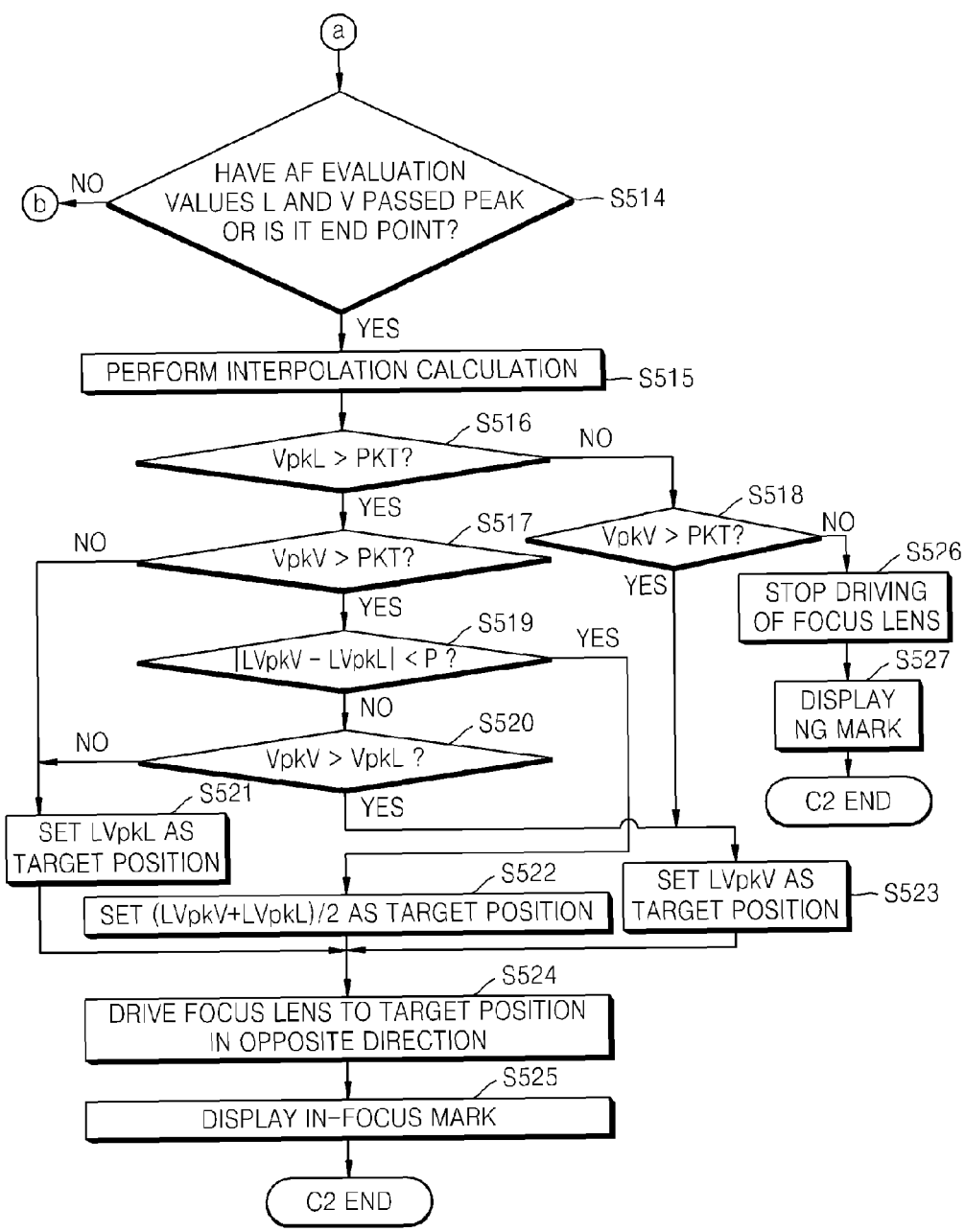
FIGS. 23 and 24 are flowcharts for describing a focusing method according to exemplary embodiments of the invention, to which the timing diagram shown in FIG. 22 is applied.

FIG. 23 is a flowchart for describing a focusing method according to an exemplary embodiment of the invention, to which the timing diagram shown in FIG. 22 is applied.

Referring to FIG. 23, when the digital capturing device 1 is turned on and a user presses the shutter release button halfway, an AF operation C1 is performed. Once the AF operation C1 starts, the image pickup device 204 generates an image signal by periodically capturing an image in operation S501. It is determined in operation S502 whether a capturing period associated with an accumulation period of the image pickup device 204 is equal to or less than 60 fps. If the capturing period is equal to or less than 60 fps, the AF operation A1 or A2 is performed. If the capturing period is greater than 60 fps, it is determined in operation S503 whether the capturing period is equal to or less than 120 fps. If the capturing period is equal to or less than 120 fps, the AF operation B1 or B2 is performed.

If the capturing period is greater than 120 fps, the focus lens 104 is driven to the one direction in operation S504. Thereafter, an input of an image pickup timing signal to the CPU 224 is waited for in operation S505.

If the image pickup timing signal is input to the CPU 224, it is determined in operation S506 whether the input of the image pickup timing signal is an odd input.

If the input of the image pickup timing signal is an even input, it is determined that this is a timing incapable of calculating an AF evaluation value as described with reference to FIG. 22, and an input of a next image pickup timing signal is waited for.

If the input of the interrupt signal is an odd input, it is determined in operation S507 whether the input of the image pickup timing signal is a $(4X+1)^{th}$ input (X=0, 1, 2, ...)

If the input of the image pickup timing signal is a $(4X+1)^{th}$ input (X=0, 1, 2, ...), the AF detection operation is performed by inputting an image signal of a focus area from the image pickup device 204 to the AF detection circuit. At the same time or independently, the image signal of the focus area is stored in the memory 210 in operation S508. A horizontal AF evaluation value L is calculated by the AF detection in operation S509.

If the input of the image pickup timing signal is not a $(4X+1)^{th}$ input (X=0, 1, 2, ...), it is determined that this is a timing incapable of calculating an AF evaluation value as described with reference to FIG. 22, and an image signal of a focus area of a corresponding frame is recorded in the memory 210 in operation S510. Thereafter, by reading the image signal recorded in the memory in the vertical direction V in operation S511, a vertical AF evaluation value V is calculated in operation S512.

Thereafter, position information of the focus lens 104 in the AF detection timing is acquired, and the acquired position information is recorded with the AF evaluation values L and V in operation S513.

It is determined in operation S514 whether each of the derived AF evaluation values L and V has passed a peak or whether the focus lens 104 is driven to the end point. The determination on whether the peak has been passed is the same as described in the AF operation A1.

If each of the derived AF evaluation values L and V has passed a peak or if the focus lens 104 is driven to the end point, actual peak values VpkL and VpkV are derived using an interpolation calculation in operation S515. It is determined in operation S516 whether the peak value VpkL of the horizontal AF evaluation value L is greater than the reference peak value PKT, and it is determined in operation S517 or S518 whether the peak value VpkV of the vertical AF evaluation value V is greater than the reference peak value PKT. The order of operations S517 and S518 can be exchanged.

If VpkL is greater than PKT, and if VpkV is greater than PKT, it is determined in operation S519 whether lens positions having horizontal and vertical peak values are closer to each other. That is, it is determined whether the absolute value of (LVpkV−LVpkL) is less than a predetermined reference value P. If the absolute value of (LVpkV−LVpkL) is less than P, a mean (LVpkV+LVpkL)/2 of the focus lens position LVpkL corresponding to the peak value VpkL of the horizontal image signal and the focus lens position LVpkV corresponding to the peak value VpkV of the vertical image signal can be set as a target position in operation S522.

In the current embodiment, the predetermined reference value P can be set to be equal to or less than a value of a focus deviation amount, e.g., 1 Fδ (F denotes an iris value, and δ denotes a value determined with an image pickup pocket), corresponding to disarrangement allowable in the digital capturing device 1. This may be to perform mean processing only for a case within the allowable disarrangement by analyzing a case where the absolute value of (LVpkV−LVpkL) is less than P as an error due to a calculation disparity.

If the absolute value of (LVpkV−LVpkL) is equal to or greater than P, the peak value VpkV of the vertical AF evaluation value V is compared to the peak value VpkL of the horizontal AF evaluation value L in operation S520. As a result of the comparison, if VpkV is greater than VpkL, the focus lens position LVpkV corresponding to the peak value VpkV in the vertical direction is set as the target position in operation S523. If VpkL is equal to or greater than VpkV, the focus lens position LVpkL corresponding to the peak value VpkL in the horizontal direction is set as the target position in operation S521.

In operation S524, the focus lens 104 is driven to the target position determined in operation S521, S522, or S523. The focus lens 104 is driven to the target position by driving it in an opposite direction to an initially driven direction in operation S524. A mark indicating in-focus of the AF operation is displayed in operation S525, and the AF operation C1 ends.

If it is determined in operation S518 that VpkV is not greater than PKT, it is determined that a contrast of the subject is not clear in the horizontal direction and the vertical direction. Accordingly, the driving of the focus lens 104 is terminated in operation S526, and an NG mark indicating that the AF detection has failed is displayed in operation S527. Then, the AF operation C1 ends.

Figure 24A:
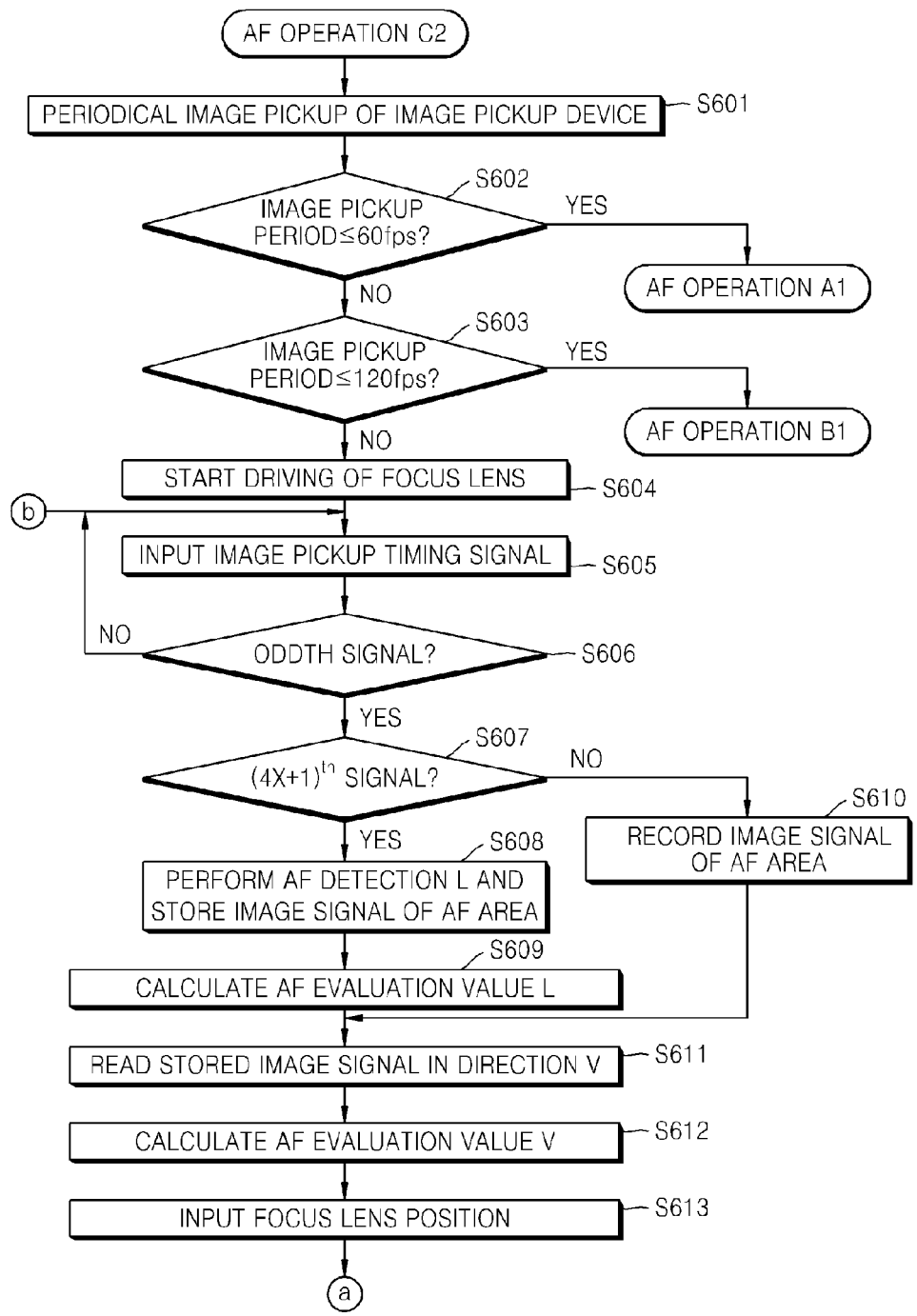
Figure 24B:
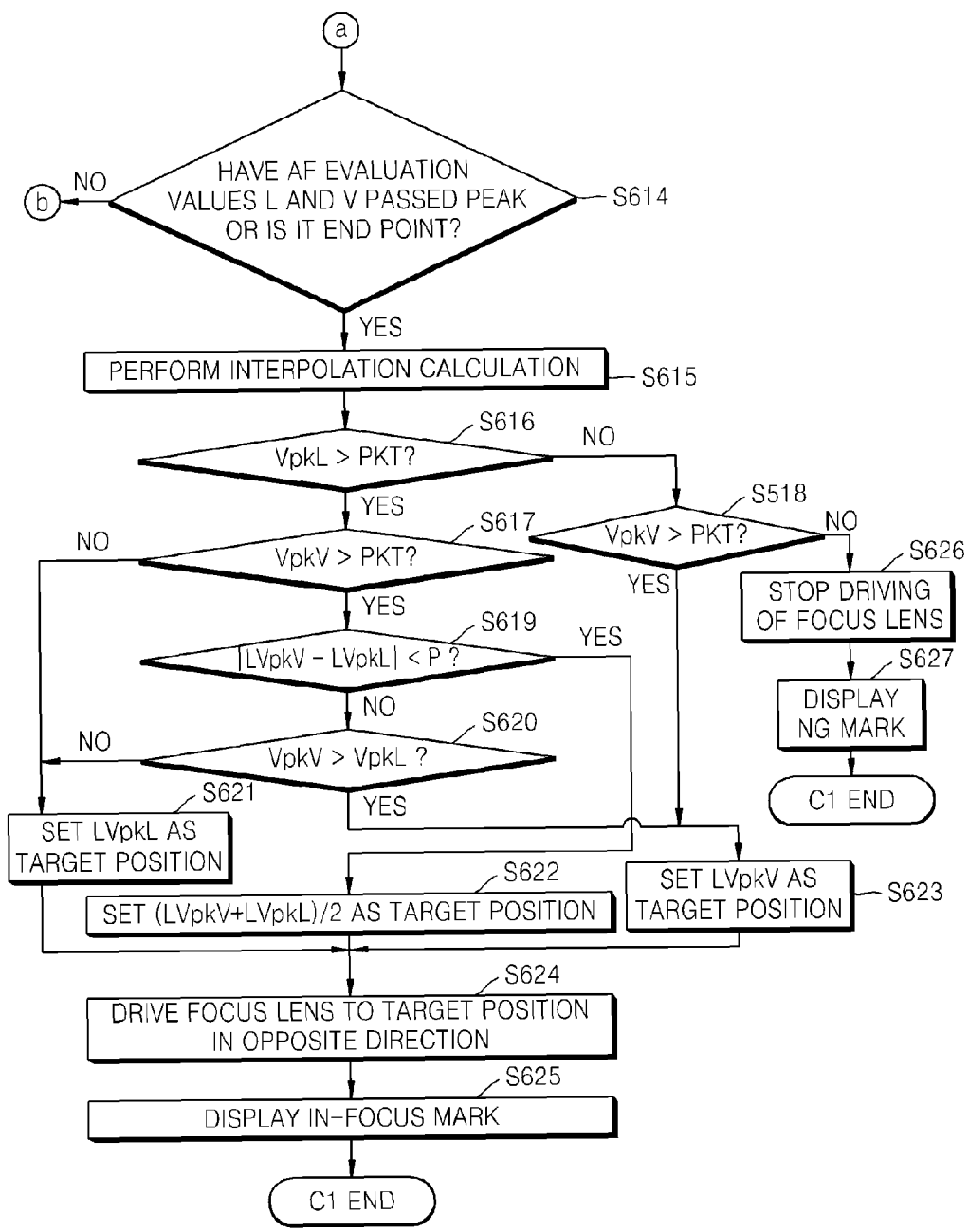

FIG. 24 is a flowchart for describing a focusing method according to another exemplary embodiment of the invention, to which the timing diagram shown in FIG. 22 is applied. An AF operation C2 according to the current embodiment is generally similar to the AF operation C1 described with reference to FIG. 23 except for operation S620. In detail, a focus lens position LVpkL corresponding to a horizontal peak value is compared to a focus lens position LVpkV corresponding to a vertical peak value in operation, and a greater focus lens position is determined as a target position. That is, a result closer to a subject distance is selected as an AF target position. This is the same as the AF operation A2 or B2.

FIGS. 25 to 28 describe another exemplary embodiment of the invention. In the current embodiment, a configuration and a basic operation of a digital capturing device are identical to those in the AF operation A1 or A2 according to an exemplary embodiment of the invention. Accordingly, in the current embodiment, differences from the AF operation A1 or A2 are mainly described. It is assumed in the current embodiment that a capturing period is 240 fps. The current embodiment can be applied to a case where a time taken to perform AF detection using a vertical image signal and calculate a vertical AF evaluation value is longer than a time taken to perform the AF operation B1 or B2 according to the other embodiment described above even if a capturing period is shorter than 240 fps.

Figure 25:
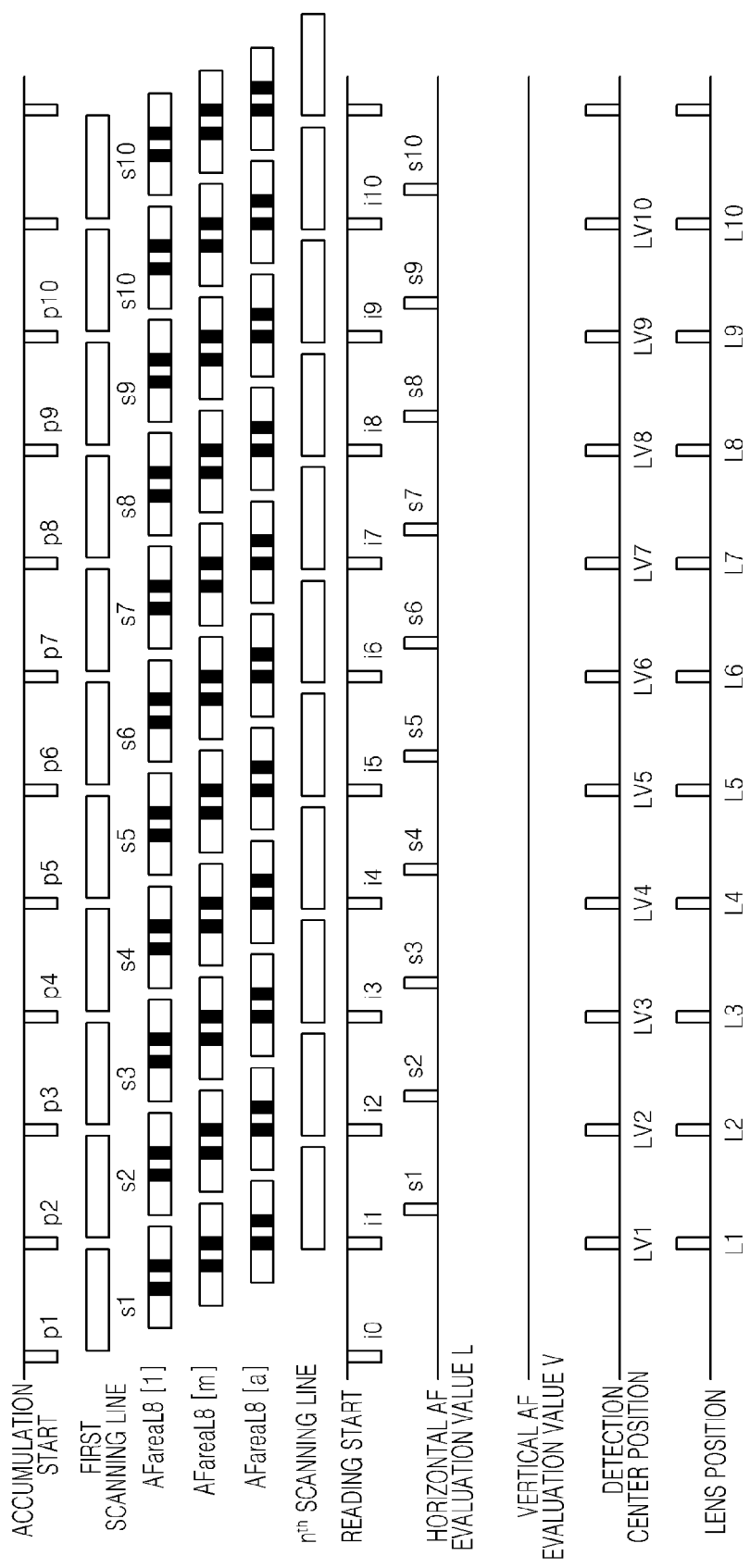
FIGS. 25 and 26 are timing diagrams for an AF operation in a focusing method according to another exemplary embodiment of the invention.
Figure 26:
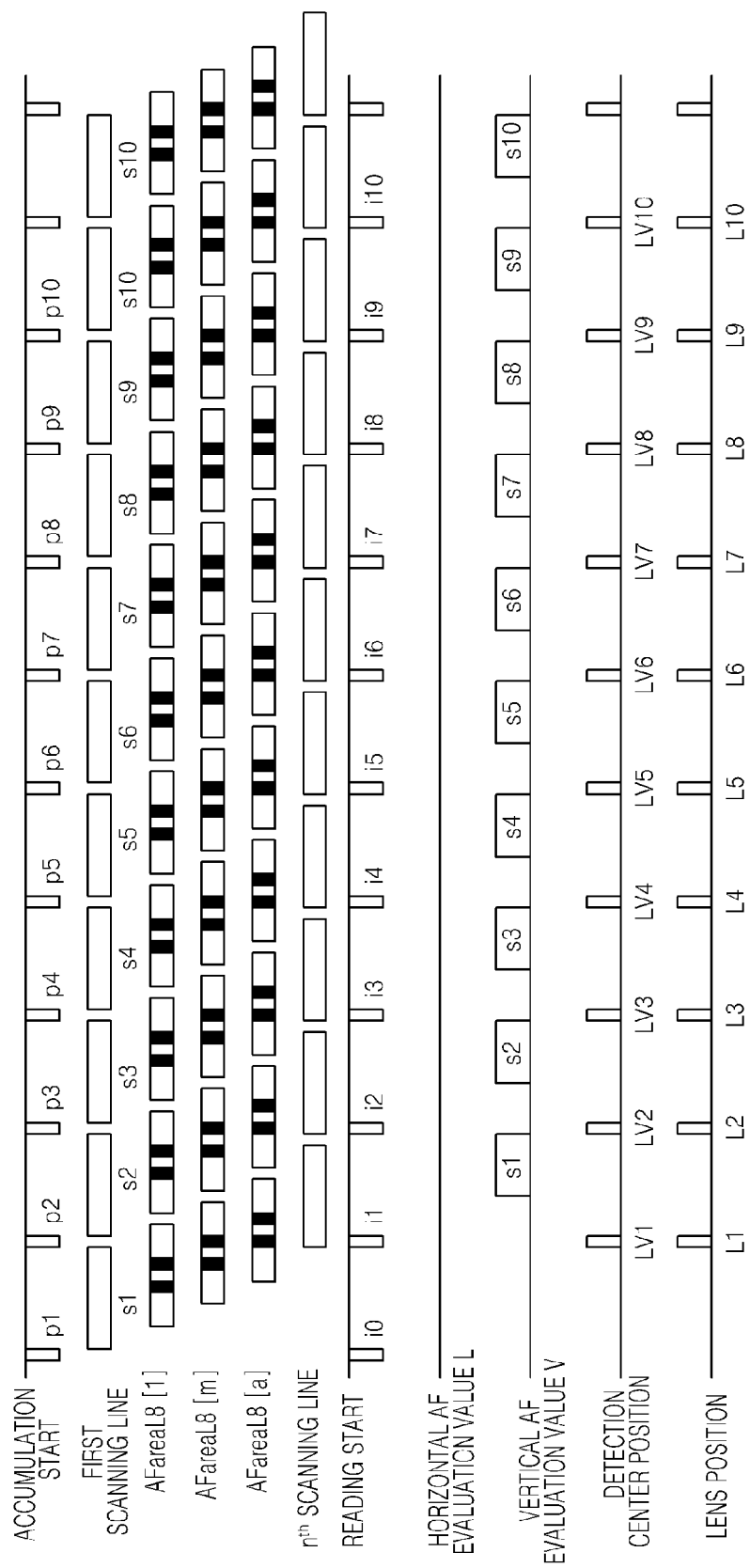

FIGS. 25 and 26 are timing diagrams for an AF operation in a focusing method according to another exemplary embodiment of the invention.

Referring to FIG. 25, an accumulation period of the image pickup device 240 is a half of the accumulation period in the AF operation B1 or B2 according to another exemplary embodiment of the invention. According to the accumulation period, a scanning time of a focus area is also shorter, thereby reading an image signal at a high speed. If reading of an image signal by a scanning signal of AFareaL.8[1] ends, a horizontal AF evaluation value L(s1) is calculated. Unlike the other embodiments, subsequent horizontal AF evaluation values L(s2), L(s3), . . . are sequentially calculated using image signals of subsequent frames. Here, since any vertical AF evaluation value is not calculated, any image signal does not have to be stored in the memory 210. A target position of the focus lens 104 can be calculated using the calculated horizontal AF evaluation values.

FIG. 26 is a timing diagram for describing an illustration of calculating vertical AF evaluation values without calculating any horizontal AF evaluation value. In detail, an image signal read from the image pickup device 204 is recorded in the memory 201 without calculating a horizontal AF evaluation value for the image signal, and a vertical AF evaluation value V(s1) is calculated by reading the image signal recorded in the memory 210 in the vertical direction. Continuously, only vertical AF evaluation values V(s2), V(s3), . . . are calculated. Although an image signal of a next frame is read while a vertical AF evaluation value for a first frame is being calculated, the image signal of the next frame is temporarily stored in the memory 210 and used to calculate a vertical AF evaluation value for the next frame, so a vertical AF evaluation value for each frame can be calculated. A target position of the focus lens 104 can be calculated using the calculated vertical AF evaluation values.

In an AF operation, one of a horizontal AF evaluation value and a vertical AF evaluation value is calculated by driving the focus lens 104 in the one direction from one side to the other side, and then the other one AF evaluation value can be calculated by driving the focus lens 104 in the opposite direction.

According to the current embodiment, by deriving a horizontal AF evaluation value and a vertical AF evaluation value in every frame even in a high speed capturing mode, improved AF operation can be performed.

Figure 27A:
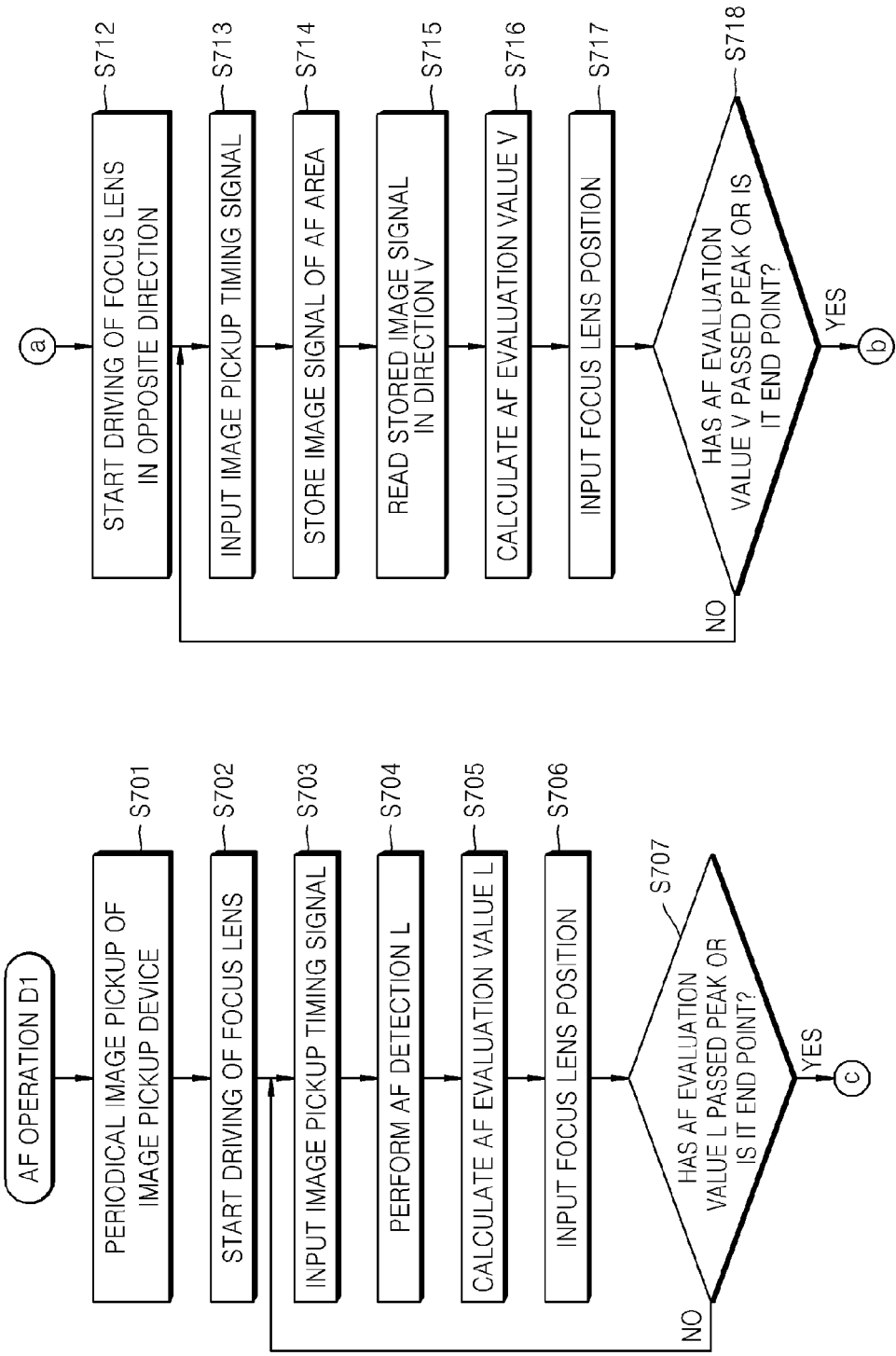
FIGS. 27 and 28 are flowcharts for describing a focusing method according to another exemplary embodiment of the invention, to which the timing diagrams shown in FIGS. 25 and 26 are applied.
Figure 27B:
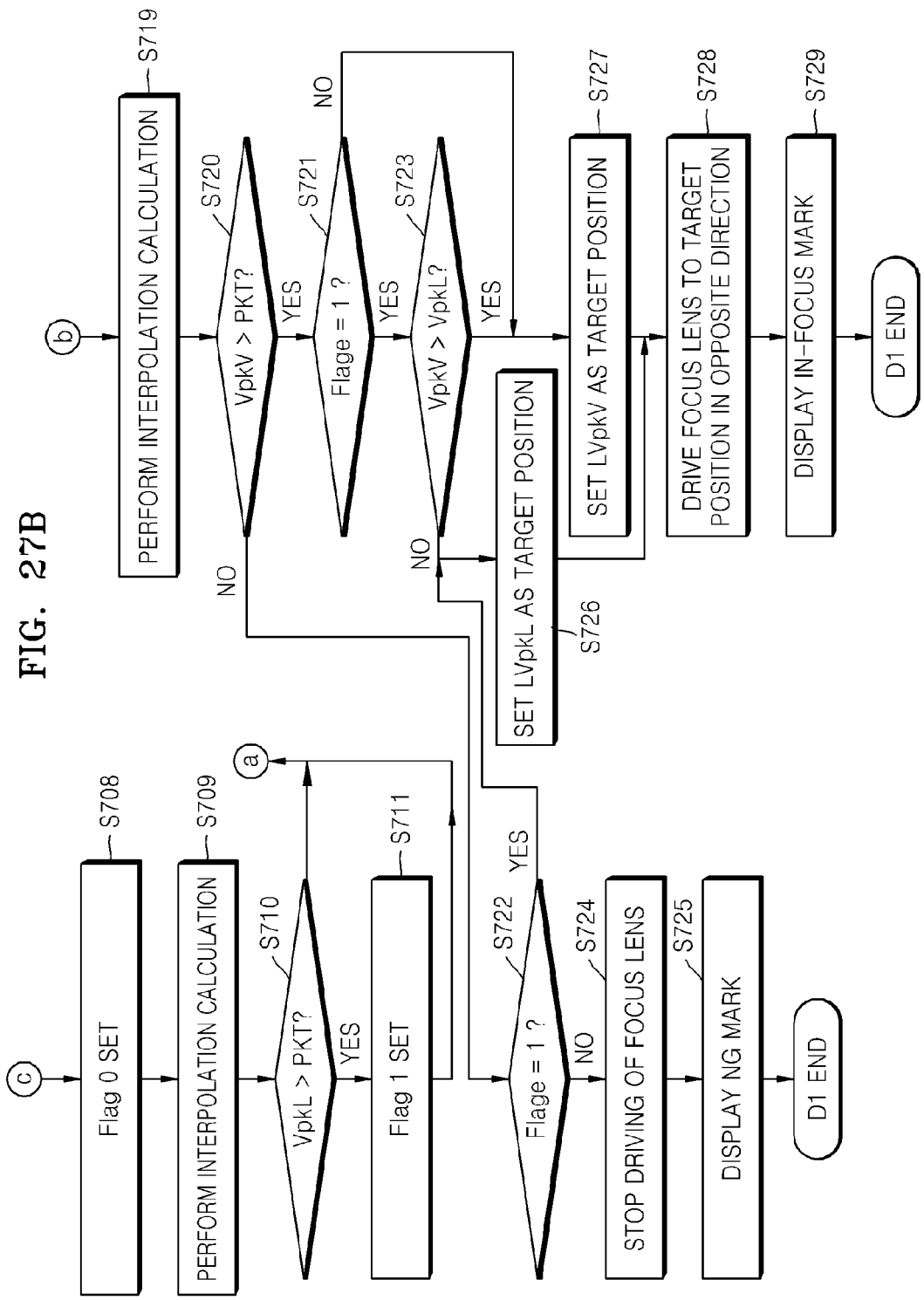
Figure 28B:
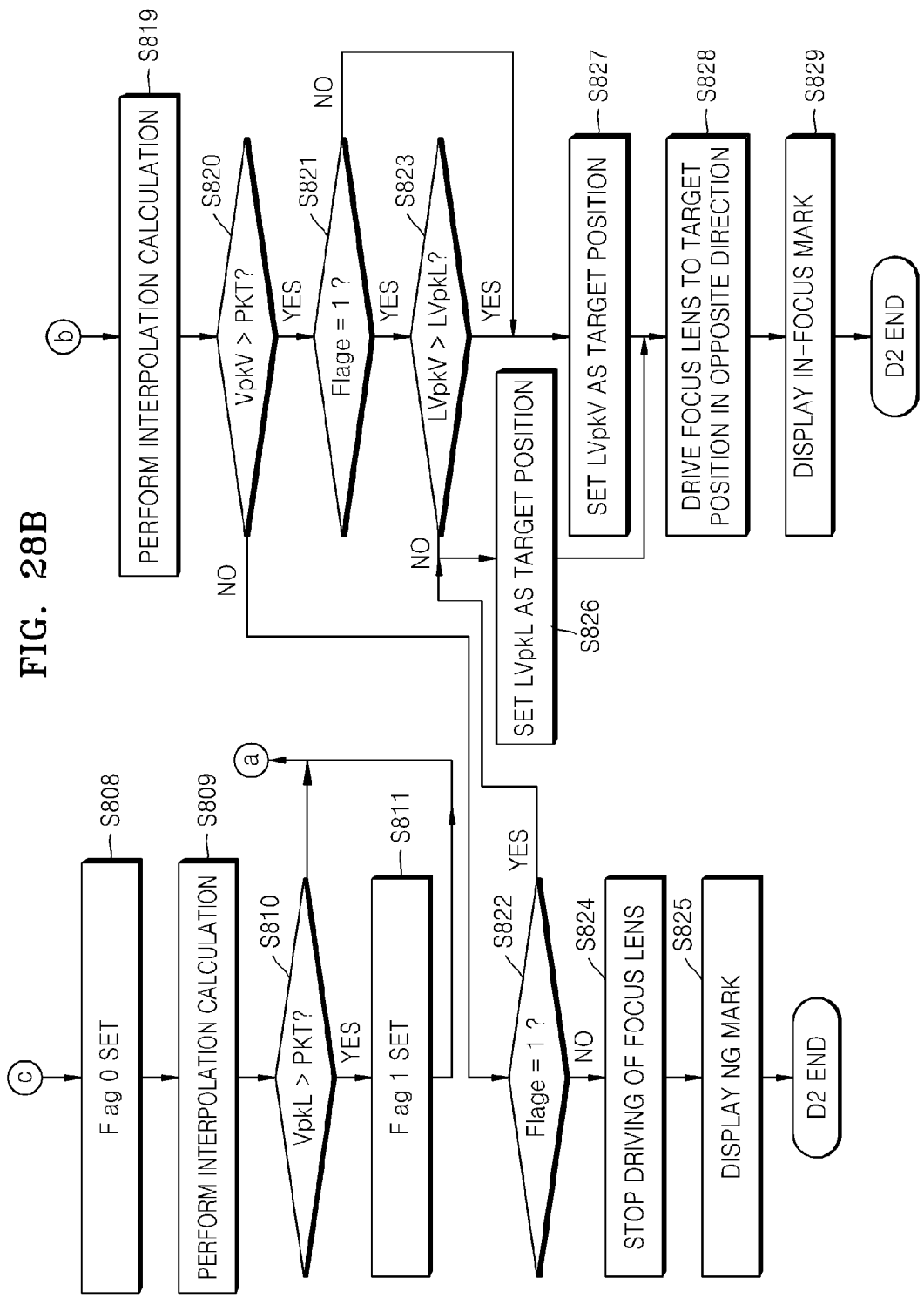

FIGS. 27 and 28 are flowcharts for describing the focusing method according to exemplary embodiments of the invention, to which the timing diagrams shown in FIGS. 25 and 26 are applied.

Referring to FIG. 27, when the digital capturing device 1 is turned on and a user presses the shutter release button halfway, an AF operation D1 is performed. The image pickup device 204 generates an image signal by periodically capturing an image in operation S701. Since the AF operation is performed in the contrast scheme, the focus lens 104 is driven to the one direction in operation S702. An image pickup timing signal is input to the CPU 224 in operation S703. The image pickup timing signal is a signal indicating a timing of starting AF detection. The image pickup timing signal can be generated in correspondence to an established focus area. The CPU 224 counts a driving signal generated by the image pickup device controller 205, and if a predetermined number of driving signals are counted, this can be determined as the timing of starting the AF detection, and the AF detection can be controlled.

If the image pickup timing signal is input, the AF detection is performed by inputting an image signal of a focus area from the image pickup device 204 to the AF detection circuit of the AF evaluation value deriver 220c in operation S704. The AF detection is performed for an image signal of a focus area, which is read in the horizontal direction from the image pickup device 204. Accordingly, a horizontal AF evaluation value L is calculated in operation S705. Position information of the focus lens 104 at the AF detection timing is acquired and recorded together with AF evaluation values as a set in operation S706.

It is determined in operation S707 while calculating the horizontal AF evaluation value L whether the derived horizontal AF evaluation value L has passed a peak or whether the focus lens 104 is driven to the end point. Since the determination on whether the peak has been passed has been described in the AF operation A1, detailed description thereof is omitted in the current embodiment. If the focus lens 104 has not been driven to the end point, and if a peak has not been detected, the process returns to operation S703 to calculate a horizontal AF evaluation value L.

If the derived horizontal AF evaluation value L has passed a peak or if the focus lens 104 is driven to the end point, a flag regarding information on presence/absence of a peak value of a horizontal AF evaluation value is reset to 0 in operation S708. In addition, when the derived horizontal AF evaluation value L has passed a peak, an actual peak value of the horizontal AF evaluation value is derived using an interpolation calculation in operation S709. Meanwhile, if the process enters into operation S709 in a case where the focus lens 104 is driven to the end point, an AF evaluation value can be obtained by an extrapolation calculation.

It is determined in operation S710 whether a peak value VpkL of the horizontal AF evaluation value L is greater than PKT. If VpkL is greater than PKT, it is determined that AF adjustment in the horizontal direction can be performed, and the flag regarding information on presence/absence of a peak value of a horizontal AF evaluation value is set to 1 in operation S711 and the process proceeds to operation S712.

If VpkL is not greater than PKT, the process proceeds to operation S712 with the flag reset to 0. The focus lens 104 is driven to the opposite direction in operation S712. An image pickup timing signal is input in operation S713.

An image signal captured while driving the focus lens 104 in the opposite direction is sequentially stored in the memory 210 in operation S714. In the current embodiment, although it is illustrated that image signals included in a focus area are stored, the invention is not limited thereto, and all image signals may be stored.

If all image signals included in the focus area are stored, an image signal of the focus area is sequentially read in the vertical direction from the memory 210 in operation S715. The reading of the image signal may be performed in the DMA scheme. A vertical AF evaluation value V is calculated by inputting the read vertical image signal to the AF detection circuit in operation S716. Position information of the focus lens 104 at the AF detection timing is acquired and recorded together with AF evaluation values as a set in operation S717.

It is determined in operation S718 while calculating the vertical AF evaluation value V whether the derived vertical AF evaluation value V has passed a peak or whether the focus lens 104 is driven to the end point. The determination on whether the peak has been passed has been described above. If the focus lens 104 has not been driven to the end point, and if a peak has not been detected, the process returns to operation S713 to calculate a vertical AF evaluation value V.

If the derived vertical AF evaluation value V has passed a peak or if the focus lens 104 is driven to the end point, an actual peak value is calculated in operation S719. Since a peak value does not always exist at the timing of calculating the vertical AF evaluation value V, an actual peak value can be calculated using an interpolation calculation. Meanwhile, if the process enters into operation S720 in a case where the focus lens 104 is driven to the end point, an AF evaluation value can be obtained by an extrapolation calculation. It is determined in operation S720 whether a peak value VpkV of the vertical AF evaluation value V is greater than PKT.

If VpkV is greater than PKT, it is determined that AF adjustment in the vertical direction can be performed, and it is determined in operation S721 whether the flag regarding information on presence/absence of a peak value of a horizontal AF evaluation value is set to 1, to check whether the AF adjustment in the horizontal direction can be performed. If the flag is set to 1, it is determined that both horizontal and vertical peak values exist, and the peak value VpkL of the horizontal AF evaluation value L is compared to the peak value VpkV of the vertical AF evaluation value V in operation S723. If VpkL is equal to or greater than VpkV, a lens position LVpkL corresponding to the peak value VpkL is set as a target position in operation S726. If VpkV is greater than VpkL, a lens position LVpkV corresponding to the peak value VpkV is set as a target position in operation S727. If the flag is not set to 1, it is determined that only a vertical peak value exists, and the lens position LVpkV corresponding to the peak value VpkV is set as a target position in operation S727.

If it is determined in operation S720 that VpkV is not greater than PKT, it is determined in operation S722 whether the flag regarding information on presence/absence of a peak value of a horizontal AF evaluation value is set to 1. If the flag is set to 1, it is determined that only a horizontal peak value exists, and the lens position LVpkL corresponding to the peak value VpkL is set as a target position in operation S726. If the flag is not set to 1, it is determined that any of horizontal and vertical peak values does not exist, and driving of the focus lens 104 is terminated in operation S724. An NG mark indicating AF failure is displayed in operation S725, and the AF operation D1 ends.

Meanwhile, in operation S728, the focus lens 104 is driven in an opposite direction to an initially driven direction toward the target position established in operation S726 or S727. An in-focus mark indicating that the AF operation has succeeded is displayed in operation S729. As described above, the AF operation D1 according to the current embodiment ends.

FIG. 28 is a flowchart for describing an embodiment different from the focusing method illustrated in FIG. 27. Since the current embodiment is generally similar to the AF operation D1 illustrated in FIG. 27, different parts are mainly described. When both horizontal and vertical peak values are detected, a focus lens position LVpkL corresponding to the peak value of the horizontal AF evaluation value is compared to a focus lens position LVpkV corresponding to the peak value of the vertical AF evaluation value in operation S823. According to the comparison result, a target position can be set to a greater focus lens position value, and the focus lens 104 can be driven to the target position. Setting the greater focus lens position value as the target position has been described in the above embodiments.

According to the embodiments of the invention, by deriving AF evaluation values for not only an image signal read in the horizontal direction but also an image signal read in the vertical direction and performing the focus adjustment, a focus can be correctly detected for various subject images. In detail, even for a subject image having a contrast difference in the vertical direction, a focus can be effectively adjusted.

Embodiments of the invention provide the advantage that a good peak value is obtained for an image obtained from a subject with a small change in a horizontal direction and a larger change in a vertical direction. For such an image, a correct peak value of a focus evaluation value cannot be derived by using the conventional focusing method.

An apparatus according to the invention can include a processor, a memory for storing and executing program data, a permanent storage such as a disk drive, a communication port communicating with an external device, and a user interface, such as a touch panel, a key, and a button.

Methods of the invention embodied as a software module or algorithm can be stored in a computer readable recording medium as computer readable codes or programs instructions, which can be executed on the processor. The computer readable recording medium can be distributed over network coupled computer systems so that the computer readable code is stored and executed in a distributed fashion. The medium can be read by a computer, stored in the memory, and executed in the processor.

All documents cited in the invention including public documents, patent applications, and patents can be merged to the invention in the same way as what is individually and concretely merged and indicated by each Cited Reference or what is generally merged and indicated in the invention.

For the explanation of the invention, reference numerals are disclosed in the exemplary embodiments illustrated in the drawings, and specific terms are used to describe the exemplary embodiments. However, the invention is not limited by the specific terms, and the invention can include all components generally thinkable by those of ordinary skill in the art.

The invention can be represented by functional block configurations and various processing operations. These function blocks can be implemented with a various number of hardware or/and software configurations for executing specific functions. For example, the invention can adopt direct circuit configurations, such as a memory, processing, a logic, and a look-up table, for executing various functions under a control of one or more microprocessors or by other control devices. In a similar way that the components of the invention can be executed with software programming or software elements, the invention can include various algorithms implemented by assembling a data structure, processors, routines and other programming configurations and can be embodied with programming or scripting languages, such as C, C++, Java, and assembler. Functional parts can be embodied with an algorithm executed in one or more processors. In addition, the invention can adopt conventional technology for electronic environment setup, signal processing, and/or data processing. Terms, such as "mechanism", "element", "means", and "configuration", can be widely used and are not limited to mechanical and physical structures. The terms can include the meaning of a series of routines of software in association with a processor, etc.

Specific executions described in the invention are exemplary embodiments and do not limit the scope of the invention even in any method. For the compactness of the specification, disclosure of conventional electronic configurations, control systems, software, and other functional parts of the systems can be omitted. In addition, connected lines or connection members between components shown in drawings are illustrations of functional connections and/or physical or circuit connections and can be represented as replaceable or additional various functional connections, physical connections, or circuit connections in an actual device. In addition, if there is not a concrete mention such as "requisite" or "important" for a component, the component may be not a surely necessary component for an application of the invention.

In the specification (particularly, claims) of the invention, the use of the term "the or said" and its similar instruction term may correspond to both the singular and the plural. In addition, when a range is disclosed in the invention, inventions to which individual values belonging to the range are applied are included (if there is no disclosure against this), and it is admitted that the individual values composing the range are disclosed in detailed description of the invention. Finally, if there is no clear disclosure of an order of operations constituting a method according to the invention or disclosure against this, the operations can be performed in an appropriate order. The invention is not necessarily limited to the disclosed order of the operations. In the invention, the use of all examples or illustrative terms (for example, etc.) is simply to describe the invention in detail, and the scope of the invention is not limited due to the examples or illustrative terms unless the scope of the invention is limited by claims. In addition, it can be understood by those of ordinary skill in the art that various modifications, combinations, and changes can be configured according to design conditions and factors within the scope of the attached claims or equivalents.

What is claimed is:

1. A focusing apparatus comprising:
a focus lens;
a focus lens driver configured to drive the focus lens in an optical axis direction;
an image pickup device configured to generate an image signal by converting image light incident through the focus lens to an electrical signal;
a memory configured to store the image signal provided by the image pickup device;
a focus evaluation value deriver configured to derive respective focus evaluation values for the image signal read from the memory in at least two directions;
an element number determiner configured to determine whether respective numbers of elements for deriving the focus evaluation values which correspond to the respective directions of the image signal are different from each other;
a peak value deriver configured to derive respective peak values of the focus evaluation values;
a standardizer configured to standardize the peak values to eliminate effects from differences of the numbers of elements if it is determined that the numbers of elements are different from each other; and
a focus lens position deriver configured to derive a focus lens position corresponding to one of the peak values.

2. The focusing apparatus of claim 1, further comprising a determiner configured to compare the peak values with a reference peak value,
wherein the focus lens position deriver is configured to derive a focus lens position corresponding to one of the peak values which are greater than the reference peak value.

3. The focusing apparatus of claim 1, wherein
the focus evaluation value deriver is configured to derive a first focus evaluation value for an image signal read in a first direction from the image pickup device and to derive a second focus evaluation value for an image signal read in a second direction from the memory,
the peak value deriver is configured to derive a first peak value of the first focus evaluation value and a second peak value of the second focus evaluation value,
the standardizer is configured to standardize the first peak value and the second peak value to eliminate the effects from differences of the numbers of elements if it is determined that the numbers of elements are different from each other, and
the focus lens position deriver is configured to derive a focus lens position corresponding to one of the first peak value and the second peak value.

4. The focusing apparatus of claim 3, further comprising a peak value magnitude determiner configured to compare the magnitude of the first peak value to the magnitude of the second peak value,
    wherein the focus lens position deriver is configured to derive a focus lens position corresponding to one of the first peak value and the second peak value according to the determination result of the peak value magnitude determiner.

5. The focusing apparatus of claim 3, further comprising:
    a first determiner configured to compare the first peak value to a first reference peak value; and
    a second determiner configured to compare the second peak value to a second reference peak value,
    wherein the focus lens position deriver is further configured to derive a first focus lens position corresponding to the first peak value if the first peak value is greater than the first reference peak value and the second peak value is less than the second reference peak value and derives a second focus lens position corresponding to the second peak value if the first peak value is less than the first reference peak value and the second peak value is greater than the second reference peak value.

6. The focusing apparatus of claim 3, wherein the focus lens position deriver is configured to derive a first focus lens position corresponding to the first peak value and a second focus lens position corresponding to the second peak value, and the focusing apparatus further comprises
    a focus lens position determiner configured to compare the first focus lens position to the second focus lens position, and
    the focus lens driver is configured to drive the focus lens to a focus lens position corresponding to the closer to a subject distance according to the comparison result.

7. The focusing apparatus of claim 6, further comprising a third determiner configured to compare a difference between the first focus lens position and the second focus lens position to a reference difference,
    wherein the focus lens driver is configured to drive the focus lens to the center of the first focus lens position and the second focus lens position if the difference is less than the reference difference.

8. The focusing apparatus of claim 1, further comprising an image pickup period determiner configured to compare an image pickup period of the image pickup device to a reference period,
    wherein the memory stores an image signal provided by the image pickup device in a predetermined period unit by which at least one image signal is skipped if the image pickup period is greater than the reference period.

9. The focusing apparatus of claim 8, wherein the image signal of the predetermined period unit is an image signal of a (2n−1) period from among image signals generated by the image pickup device.

10. The focusing apparatus of claim 8, wherein the focus evaluation value deriver is further configured to derive the first focus evaluation value for an image signal of the predetermined period unit, which has been read in the first direction from the image pickup device, and to derive the second focus evaluation value for an image signal of another period unit, which has been read in the second direction different form the first direction from the memory.

11. The focusing apparatus of claim 10, wherein the image signal of the predetermined period unit is an image signal of a (2n−1) period from among image signals generated by the image pickup device, and the image signal of another period unit is an image signal of a (4n−1) period from among the image signals generated by the image pickup device.

12. The focusing apparatus of claim 1, wherein the focus evaluation value deriver is further configured to derive a first focus evaluation value by reading a first image signal generated by the image pickup device in the first direction while moving the focus lens in one direction and to derive a second focus evaluation value by storing a second image signal in the memory and reading the second image signal in the second direction different from the first direction from the memory, wherein the second image signal is generated by the image pickup device while moving the focus lens in the other direction.

13. The focusing apparatus of claim 12, wherein the focus evaluation value deriver is further configured to derive the second focus evaluation value after deriving the first focus evaluation value.

14. The focusing apparatus of claim 13, wherein the peak value deriver is configured to derive a peak value of one of the first focus evaluation value and the second focus evaluation value, and
    the focusing apparatus further comprises a first peak value deriving information setup unit configured to set information that the first peak value has been derived, if a first peak value of the first focus evaluation value has been derived.

15. The focusing apparatus of claim 14, further comprising a peak value magnitude determiner configured to compare the magnitude of the first peak value to the magnitude of a second peak value of the second focus evaluation value if the first peak value has been derived according to the information,
    wherein the focus lens position deriver is configured to derive a focus lens position corresponding to one of the first peak value and the second peak value according to the determination result of the peak value magnitude determiner.

16. The focusing apparatus of claim 14, wherein the focus lens position deriver is configured to derive a first focus lens position corresponding to the first peak value and a second focus lens position corresponding to the second peak value when the first peak value has been derived according to the information, and
    the focusing apparatus further comprises a focus lens position determiner configured to compare the first focus lens position to the second focus lens position.

17. An focusing method comprising:
    generating an image signal;
    storing the image signal;
    deriving respective focus evaluation values for the image signal read from a memory in at least two directions;
    determining whether respective numbers of elements for deriving the focus evaluation values which correspond to the respective directions of the image signal are different from each other;
    deriving respective peak values of the focus evaluation values;
    standardizing the peak values to eliminate effects from differences of the numbers of elements if it is determined that the numbers of elements are different from each other; and
    deriving a focus lens position corresponding to one of the peak values.

18. The focusing method of claim 17, further comprising comparing the peak values with a reference peak value, wherein, a focus lens position corresponding to one of the peak values which are greater than the reference peak value is derived.

19. The focusing method of claim 17, further comprising:
deriving a first focus evaluation value for an image signal read in a first direction from the image pickup device;
deriving a second focus evaluation value for an image signal read in a second direction different from the first direction from the stored image signal;
deriving a first peak value of the first focus evaluation value and a second peak value of the second focus evaluation value; and
standardizing the first peak value and the second peak value to eliminate effects from differences of the numbers of elements if it is determined that the numbers of elements are different from each other.

20. The focusing method of claim 19, further comprising comparing the magnitude of the first peak value of the first focus evaluation value to the magnitude of the second peak value of the second focus evaluation value,
wherein a focus lens position corresponding to one of the first peak value and the second peak value is derived according to the comparison result.

21. The focusing method of claim 19, further comprising:
comparing the first peak value to a first reference peak value; and
comparing the second peak value to a second reference peak value,
wherein if the first peak value is greater than the first reference peak value and the second peak value is less than the second reference peak value, a first focus lens position corresponding to the first peak value is derived, and if the first peak value is less than the first reference peak value and the second peak value is greater than the second reference peak value, a second focus lens position corresponding to the second peak value is derived.

22. The focusing method of claim 19, further comprising:
deriving a first focus lens position corresponding to the first peak value;
deriving a second focus lens position corresponding to the second peak value; and
comparing the first focus lens position to the second focus lens position,
wherein the focus lens is driven to a focus lens position corresponding to the closer to a subject distance according to the comparison result.

23. The focusing method of claim 22, further comprising comparing a difference between the first focus lens position and the second focus lens position to a reference difference,
wherein if the difference is less than the reference difference, the focus lens is driven to the center of the first focus lens position and the second focus lens position.

24. The focusing method of claim 17, further comprising comparing an image pickup period of the image pickup device to a reference period,
wherein if the image pickup period is greater than the reference period, an image signal provided by the image pickup device is stored in a predetermined period unit by which at least one image signal is skipped.

25. The focusing method of claim 24, wherein the image signal of the predetermined period unit is an image signal of a (2n−1) period from among image signals generated by the image pickup device.

26. The focusing method of claim 24, further comprising:
deriving the first focus evaluation value for an image signal of the predetermined period unit, which has been read in the first direction from the image pickup device, and
deriving the second focus evaluation value by reading the stored image signal of another period unit in the second direction different form the first direction.

27. The focusing method of claim 26, wherein the image signal of the predetermined period unit is an image signal of a (2n−1) period from among image signals generated by the image pickup device, and
the image signal of another period unit is an image signal of a (4n−1) period from among the image signals generated by the image pickup device.

28. The focusing method of claim 17, further comprising deriving the first focus evaluation value by reading a first image signal generated by the image pickup device in the first direction while moving the focus lens in one direction,
wherein the second focus evaluation value is derived by storing a second image signal, which has been generated by the image pickup device while moving the focus lens in the other direction, and reading the stored second image signal in the second direction different from the first direction.

29. The focusing method of claim 28, wherein the second focus evaluation value is derived after deriving the first focus evaluation value.

30. The focusing method of claim 29, further comprising:
deriving a peak value of one of the first focus evaluation value and the second focus evaluation value; and
if a first peak value of the first focus evaluation value has been derived, setting information that the first peak value has been derived.

31. The focusing method of claim 30, further comprising comparing the magnitude of the first peak value to the magnitude of a second peak value of the second focus evaluation value when the first peak value has been derived according to the information,
wherein a focus lens position corresponding to one of the first peak value and the second peak value is derived according to the comparison result.

32. The focusing method of claim 30, further comprising:
if it is determined that the first peak value has been derived according to the information, deriving a first focus lens position corresponding to the first peak value and a second focus lens position corresponding to the second peak value; and
comparing the first focus lens position to the second focus lens position.

33. A non-transitory computer program product, comprising a computer usable medium having a computer readable program code embodied therein, said computer readable program code adapted to be executed to implement a method of focusing, said method comprising:
generating an image signal;
storing the image signal;
deriving respective focus evaluation values for the image signal read from a memory in at least two directions;
determining whether respective numbers of elements for deriving the focus evaluation values which correspond to the respective directions of the image signal are different from each other;
deriving respective peak values of the focus evaluation values;
standardizing the peak values to eliminate effects from differences of the numbers of elements if it is determined that the numbers of elements are different from each other; and deriving a focus lens position corresponding to one of the peak values.

\* \* \* \* \*